「12」 United States Patent
Marinier et al.

(10) Patent No.: US 10,798,684 B2
(45) Date of Patent: Oct. 6, 2020

(54) MULTIPOINT TRANSMISSION IN WIRELESS COMMUNICATION

(71) Applicant: INTERDIGITAL PATENT HOLDINGS, INC., Wilmington, DE (US)

(72) Inventors: Paul Marinier, Brossard (CA); Ghyslain Pelletier, Laval (CA); Diana Pani, Montreal (CA); J. Patrick Tooher, Montreal (CA); Lujing Cai, Morganville, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/348,866

(22) PCT Filed: Sep. 30, 2012

(86) PCT No.: PCT/US2012/058186
§ 371 (c)(1),
(2) Date: Mar. 31, 2014

(87) PCT Pub. No.: WO2013/049769
PCT Pub. Date: Apr. 4, 2013

(65) Prior Publication Data
US 2014/0321406 A1 Oct. 30, 2014

Related U.S. Application Data

(60) Provisional application No. 61/542,145, filed on Sep. 30, 2011, provisional application No. 61/591,789, (Continued)

(51) Int. Cl.
H04W 72/04 (2009.01)
H04W 52/14 (2009.01)
(Continued)

(52) U.S. Cl.
CPC ........ *H04W 72/0413* (2013.01); *H04B 7/024* (2013.01); *H04W 52/146* (2013.01); *H04B 7/0802* (2013.01); *H04W 52/365* (2013.01)

(58) Field of Classification Search
CPC ... H04B 7/024; H04B 7/0802; H04W 52/365; H04W 52/242; H04W 72/0413
See application file for complete search history.

(56) References Cited

U.S. PATENT DOCUMENTS 5,491,837 A 2/1996 Haartsen
5,687,171 A 11/1997 Shin et al.
(Continued)

FOREIGN PATENT DOCUMENTS

CN 1589541 A 3/2005
CN 1716837 A 1/2006
(Continued)

OTHER PUBLICATIONS

Nokia Siemens Networks et al: "Uplink OM RS performance evaluation from CoMP viewpoint", 3GPP Draft; R1-093307, Aug. 18, 2009 (Aug. 18, 2009).*

(Continued)

Primary Examiner — Sulaiman Nooristany
(74) Attorney, Agent, or Firm — Yin Shao

(57) ABSTRACT

Embodiments contemplate wireless transmit/receive unit (WTRU) transmissions of different types of uplink channels and/or signals in a system deployment where multiple destination points may exist. Some embodiments contemplate that a WTRU may select the destination point of a transmission on a dynamic basis. In one or more systems where destination point selection from among multiple potential destination points may be possible for a WTRU transmission, some embodiments contemplate the determination of the handling of hybrid automatic repeat request (Continued)

(HARQ) retransmissions and for different power headroom reporting mechanisms. Embodiments also contemplate the reduction and/or inhibition of WTRU transmissions to destination points to which the WTRU may have lost connectivity.

20 Claims, 11 Drawing Sheets

Related U.S. Application Data filed on Jan. 27, 2012, provisional application No. 61/604,399, filed on Feb. 28, 2012, provisional application No. 61/616,256, filed on Mar. 27, 2012, provisional application No. 61/644,827, filed on May 9, 2012, provisional application No. 61/678,437, filed on Aug. 1, 2012.

(51) Int. Cl.
    H04B 7/024    (2017.01)
    H04W 52/36    (2009.01)
    H04B 7/08     (2006.01)

(56) References Cited

U.S. PATENT DOCUMENTS

| | | |
|---|---|---|
| 5,845,212 A | 12/1998 | Tanaka |
| 5,991,518 A | 11/1999 | Jardine et al. |
| 5,991,618 A | 11/1999 | Hall |
| 6,587,697 B2 | 7/2003 | Terry et al. |
| 6,937,584 B2 | 8/2005 | Chaponniere et al. |
| 7,054,633 B2 | 5/2006 | Seo et al. |
| 7,403,791 B2 | 7/2008 | Oki et al. |
| 7,590,095 B2 | 9/2009 | Chen et al. |
| 7,751,847 B2 | 7/2010 | Karlsson |
| 7,903,818 B2 | 3/2011 | Park et al. |
| 8,014,454 B2 | 9/2011 | Yoshi |
| 8,165,081 B2 | 4/2012 | Papasakellariou et al. |
| 8,228,855 B2 | 7/2012 | Sambhwani et al. |
| 8,315,320 B2 | 11/2012 | Zhang et al. |
| 8,335,466 B2 | 12/2012 | Cai et al. |
| 8,355,388 B2 | 1/2013 | Womack et al. |
| 8,402,334 B2 | 3/2013 | Yu et al. |
| 8,427,988 B2 | 4/2013 | Pelletier et al. |
| 8,446,856 B2 | 5/2013 | Womack et al. |
| 8,457,042 B2 | 6/2013 | Prakash et al. |
| 8,494,572 B2 | 7/2013 | Chen et al. |
| 8,509,836 B2 | 8/2013 | Shin et al. |
| 8,605,614 B2 | 12/2013 | Nishio et al. |
| 8,670,394 B2 | 3/2014 | Damnjanovic |
| 8,682,369 B2 | 3/2014 | Yang |
| 8,699,391 B2 | 4/2014 | Yeon et al. |
| 8,711,722 B2 | 4/2014 | Zhu et al. |
| 8,731,088 B2 | 5/2014 | Ko et al. |
| 8,811,249 B2 | 8/2014 | Seo et al. |
| 8,971,222 B2 | 3/2015 | Barriac |
| 9,019,903 B2 | 4/2015 | Palanki et al. |
| 9,077,496 B2 | 7/2015 | Zhou et al. |
| 9,084,201 B2 | 7/2015 | Athalye et al. |
| 9,179,350 B2 | 11/2015 | Yao et al. |
| 9,392,553 B2 | 7/2016 | Haim et al. |
| 9,451,589 B2 | 9/2016 | Nishio et al. |
| 9,629,097 B2 * | 4/2017 | Ahn .................. H04W 52/146 |
| 9,655,032 B2 | 5/2017 | Takano |
| 2002/0196766 A1 | 12/2002 | Hwang et al. |
| 2003/0117980 A1 | 6/2003 | Kim et al. |
| 2003/0232622 A1 | 12/2003 | Seo et al. |
| 2004/0223455 A1 | 11/2004 | Fong et al. |
| 2005/0085191 A1 | 4/2005 | Pinheiro et al. |
| 2005/0111391 A1 | 5/2005 | Oki et al. |
| 2005/0169293 A1 | 8/2005 | Zhang et al. |
| 2006/0003787 A1 | 1/2006 | Heo et al. |
| 2006/0270431 A1 | 11/2006 | Yoshi |
| 2007/0010269 A1 | 1/2007 | Azuma |
| 2007/0149146 A1 | 6/2007 | Hwang et al. |
| 2008/0039057 A1 | 2/2008 | Worrall et al. |
| 2008/0055068 A1 | 3/2008 | Van Wageningen et al. |
| 2008/0096566 A1 | 4/2008 | Brunner et al. |
| 2008/0198800 A1 | 8/2008 | Zhang et al. |
| 2008/0220806 A1 | 9/2008 | Shin et al. |
| 2009/0046642 A1 | 2/2009 | Damnjanovic |
| 2009/0131027 A1 | 5/2009 | Breuer et al. |
| 2009/0175187 A1 | 7/2009 | Jersenius et al. |
| 2009/0191910 A1 | 7/2009 | Athalye et al. |
| 2009/0213805 A1 | 8/2009 | Zhang et al. |
| 2009/0227278 A1 | 9/2009 | Cho et al. |
| 2009/0239590 A1 | 9/2009 | Parkvall |
| 2009/0290538 A1 | 11/2009 | Kim et al. |
| 2010/0041428 A1 | 2/2010 | Chen et al. |
| 2010/0098012 A1 | 4/2010 | Bala et al. |
| 2010/0113004 A1 | 5/2010 | Cave et al. |
| 2010/0113057 A1 | 5/2010 | Englund et al. |
| 2010/0120446 A1 | 5/2010 | Gaal |
| 2010/0158147 A1 | 6/2010 | Zhang et al. |
| 2010/0195575 A1 | 8/2010 | Papasakellariou et al. |
| 2010/0197341 A1 | 8/2010 | Terry |
| 2010/0238892 A1 | 9/2010 | Dahlman et al. |
| 2010/0246561 A1 | 9/2010 | Shin et al. |
| 2010/0254329 A1 | 10/2010 | Pan et al. |
| 2010/0255868 A1 | 10/2010 | Lee et al. |
| 2010/0296470 A1 | 11/2010 | Heo et al. |
| 2010/0297993 A1 | 11/2010 | Heo et al. |
| 2010/0317343 A1 | 12/2010 | Krishnamurthy et al. |
| 2010/0331037 A1 | 12/2010 | Jen |
| 2011/0038271 A1 | 2/2011 | Shin et al. |
| 2011/0039568 A1 | 2/2011 | Zhang et al. |
| 2011/0064159 A1 | 3/2011 | Ko et al. |
| 2011/0075675 A1 | 3/2011 | Koodli et al. |
| 2011/0105173 A1 | 5/2011 | Haim et al. |
| 2011/0111788 A1 | 5/2011 | Damnjanovic et al. |
| 2011/0134968 A1 | 6/2011 | Han et al. |
| 2011/0141928 A1 | 6/2011 | Shin et al. |
| 2011/0141938 A1 | 6/2011 | Miller et al. |
| 2011/0182201 A1* | 7/2011 | Pajukoski ............ H04W 52/22 370/252 |
| 2011/0195735 A1 | 8/2011 | Irmer et al. |
| 2011/0207415 A1 | 8/2011 | Luo et al. |
| 2011/0280169 A1 | 11/2011 | Seo et al. |
| 2012/0034927 A1 | 2/2012 | Papasakellariou et al. |
| 2012/0093020 A1 | 4/2012 | Iwai et al. |
| 2012/0113831 A1 | 5/2012 | Pelletier et al. |
| 2012/0115520 A1 | 5/2012 | Rossel et al. |
| 2012/0134288 A1 | 5/2012 | Fang et al. |
| 2012/0149428 A1 | 6/2012 | Yang |
| 2012/0201163 A1 | 8/2012 | Jongren et al. |
| 2012/0213189 A1* | 8/2012 | Choi ................ H04W 72/1231 370/329 |
| 2012/0275398 A1 | 11/2012 | Chen et al. |
| 2012/0295611 A1* | 11/2012 | Amirijoo ............ H04W 52/146 455/424 |
| 2013/0010706 A1 | 1/2013 | Kela et al. |
| 2013/0028231 A1 | 1/2013 | Zhang et al. |
| 2013/0100842 A1* | 4/2013 | Nishikawa .......... H04W 52/146 370/252 |
| 2013/0114562 A1 | 5/2013 | Seo et al. |
| 2013/0170423 A1 | 7/2013 | Abe et al. |
| 2013/0194951 A1 | 8/2013 | Kim et al. |
| 2013/0208675 A1* | 8/2013 | Shen .................. H04W 52/365 370/329 |
| 2013/0235830 A1 | 9/2013 | Pelletier et al. |
| 2013/0308575 A1 | 11/2013 | Chen et al. |
| 2013/0322260 A1 | 12/2013 | Yao et al. |
| 2014/0087720 A1 | 3/2014 | Takano |
| 2014/0177601 A1 | 6/2014 | Nishio et al. |
| 2014/0293843 A1 | 10/2014 | Papasakellariou et al. |
| 2016/0029239 A1 | 1/2016 | Sadeghi et al. |

(56) References Cited

U.S. PATENT DOCUMENTS

| | | | |
|---|---|---|---|
| 2016/0309426 A1 | 10/2016 | Shin et al. | |
| 2018/0103491 A1* | 4/2018 | Sundman | H04W 74/0816 |

FOREIGN PATENT DOCUMENTS

| | | |
|---|---|---|
| CN | 1792066 A | 6/2006 |
| CN | 1989703 A | 6/2007 |
| CN | 101005289 A | 7/2007 |
| CN | 101030795 A | 9/2007 |
| CN | 101080878 A | 11/2007 |
| CN | 101099304 A | 1/2008 |
| CN | 101176317 A | 5/2008 |
| CN | 101340622 A | 1/2009 |
| CN | 101359937 A | 2/2009 |
| CN | 101404527 A | 4/2009 |
| CN | 101505498 A | 8/2009 |
| CN | 101610102 A | 12/2009 |
| CN | 102595465 A | 7/2012 |
| EP | 0631397 A2 | 12/1994 |
| EP | 1367739 A1 | 12/2003 |
| EP | 1605605 A2 | 12/2005 |
| EP | 1811683 A2 | 7/2007 |
| EP | 1811685 A2 | 7/2007 |
| EP | 1912345 A1 | 4/2008 |
| EP | 2184863 A | 5/2010 |
| EP | 2293618 A1 | 3/2011 |
| EP | 2536087 | 12/2012 |
| EP | 2741550 A | 6/2014 |
| JP | 2005-167963 A | 6/2005 |
| JP | 2006-014304 A | 1/2006 |
| JP | 2008-236675 A | 10/2008 |
| JP | 2008-306674 A | 12/2008 |
| JP | 2009-514360 A | 4/2009 |
| JP | 2011-514035 A | 4/2011 |
| JP | 2011-515997 A | 5/2011 |
| JP | 2012-005079 A | 1/2012 |
| JP | 2012-511295 A | 5/2012 |
| JP | 2012-516608 A | 7/2012 |
| JP | 2012-526425 A | 10/2012 |
| JP | 2012525030 A | 10/2012 |
| JP | 2012-531128 A | 12/2012 |
| JP | 2013-021379 A | 1/2013 |
| JP | 2013-021380 A | 1/2013 |
| JP | 2013-34113 A | 2/2013 |
| JP | 2013-504921 A | 2/2013 |
| JP | 5205456 B2 | 6/2013 |
| JP | 2013-533648 A | 8/2013 |
| JP | 2014-233073 | 12/2014 |
| JP | 5993901 B2 | 9/2016 |
| KR | 10-2009-0085549 A | 8/2009 |
| KR | 10-2009-0097805 A | 9/2009 |
| KR | 10-0917209 B1 | 9/2009 |
| RU | 2251220 C2 | 4/2005 |
| RU | 2267222 C2 | 12/2005 |
| RU | 2006-108531 A | 7/2006 |
| RU | 2297733 C2 | 4/2007 |
| RU | 2010-109404 A | 9/2011 |
| RU | 2011-102436 A | 7/2012 |
| TW | 200618508 A | 6/2006 |
| TW | 2006-37207 A | 10/2006 |
| TW | 200838188 A | 9/2008 |
| TW | 2009-17711 A | 4/2009 |
| WO | WO 2001/061884 A1 | 8/2001 |
| WO | WO 2003/003593 A2 | 1/2003 |
| WO | WO-2003/043237 A1 | 5/2003 |
| WO | WO 2003/043237 A1 | 5/2003 |
| WO | WO 2004/056009 A1 | 7/2004 |
| WO | WO 2005/018125 A1 | 2/2005 |
| WO | WO 2006/095224 A1 | 9/2006 |
| WO | WO 2006/096789 A1 | 9/2006 |
| WO | WO 2007/050729 A1 | 5/2007 |
| WO | WO 2008/029700 A1 | 3/2008 |
| WO | WO 2008/042187 A2 | 4/2008 |
| WO | WO 2008/055235 A2 | 5/2008 |
| WO | WO 2008/101053 A2 | 8/2008 |
| WO | WO 2008/109162 A2 | 9/2008 |
| WO | WO 2008/115660 A1 | 9/2008 |
| WO | WO 2008/155469 A1 | 12/2008 |
| WO | WO 2009/099271 A1 | 8/2009 |
| WO | WO-2010/065759 | 6/2010 |
| WO | WO 2010/077690 A1 | 7/2010 |
| WO | WO-2010/091425 | 8/2010 |
| WO | WO 2010107885 A2 * | 9/2010 | H04W 52/146 |
| WO | WO 2010/121708 A1 | 10/2010 |
| WO | WO 2010/135697 A2 | 11/2010 |
| WO | WO 2010/148319 A1 | 12/2010 |
| WO | WO 2010/148532 A1 | 12/2010 |
| WO | WO 2010/150552 A1 | 12/2010 |
| WO | WO-2011/041666 | 4/2011 |
| WO | WO 2011/055943 A2 | 5/2011 |
| WO | WO 2012/008773 A2 | 1/2012 |
| WO | WO 2012/094933 A1 | 7/2012 |
| WO | WO 2013/021531 A1 | 2/2013 |
| WO | WO-2013/049769 | 4/2013 |

OTHER PUBLICATIONS

Research in Motion et al: "PRACH Enhancement and UL Power Control for CoMP Scenario 4", 3GPP Draft; R1-112372, Aug. 16, 2011 (Aug. 16, 2011).*

"3rd Generation Partnership Project; Technical Specification Group Radio Access Network; Evolved Universal Terrestrial Radio Access (E-UTRA); Radio Resource Control (RRC); Protocol specification (Release 1 O)", 3GPP Standard; 3GPP TS 36.331 V10.2.0, Jun. 24, 2011 (Year: 2011).*

3rd Generation Partnership Project (3GPP), R1-105238, "Further Discussion on HeNB Downlink Power Setting in HetNet", MediaTek Inc., TSG-RAN WG1 #62bis, Xi'an, China, Oct. 11-15, 2010, pp. 1-5.

3rd Generation Partnership Project (3GPP), R1-112085, "Potential Enhancements for SRS in Rel-11", TSG RAN WG1 Meeting #66, Ericsson, ST-Ericsson, Athens, Greece, Aug. 22-26, 2011, 8 pages.

3rd Generation Partnership Project (3GPP), R1-112426, "Standardization Support for UL CoMP", TSG RAN WG1 Meeting #66, Ericsson, ST-Ericsson, Athens, Greece, Aug. 22-26, 2011, 3 pages.

3rd Generation Partnership Project (3GPP), RP-111365, "Coordinated Multi-Point Operation for LTE—Uplink Core Part", Sep. 2011, 6 pages.

3rd Generation Partnership Project (3GPP), TR 36.819 V1.2.0, "Technical Specification Group Radio Access Network, Coordinated Multi-Point Operation for LTE Physical Layer Aspects (Release 11)", Sep. 2011, pp. 1-70.

3rd Generation Partnership Project (3GPP), TS 36.211 V10.3.0, "Technical Specification Group Radio Access Network, Evolved Universal Terrestrial Radio Access (E-UTRA), Physical Channels and Modulation (Release 10)", Sep. 2011, pp. 1-103.

3rd Generation Partnership Projects (3GPP), R1-091780, "PUSCH Power Control for LTE-Advanced", Nokia Siemens Networks, Nokia, TSG RAN WG1, Meeting #57, San Francisco, USA, May 4-8, 2009, 4 pages.

3rd Generation Partnership Project (3GPP), R1-130290, "Power Control in Flexible Subframes for eIMTA", Samsung, 3GPP TSG RAN WG1 #72, St Julian's, Malta, Jan. 28-Feb. 1, 2013, 3 pages.

3rd Generation Partnership Project (3GPP), R1-130586, "Interference Mitigation Schemes", Qualcomm Incorporated, 3GPP TSG RAN WG1 Meeting #72, St Julian's, Malta, Jan. 28-Feb. 1, 2013, 5 pages.

3rd Generation Partnership Project (3GPP), R1-131340, "Tx Power Control for eIMTA", InterDigital, 3GPP TSG-RAN WG1 Meeting #72bis, Chicago, USA, Apr. 15-19, 2013, 3 pages.

3rd Generation Partnership Project (3GPP), R1-134556, "On Remaining Details for UL Power Control with eIMTA", InterDigital, 3GPP TSG-RAN WG1 Meeting #74bis, Guangzhou, China, Oct. 7-11, 2013, 5 pages.

3rd Generation Partnership Project (3GPP), R1-135598, "On Remaining Details for UL Power Control with eIMTA", InterDigital, 3GPP TSG-RAN WG1 Meeting #75, San Francisco, USA, Nov. 11-15, 2013, 6 pages.

(56) References Cited

OTHER PUBLICATIONS

3rd Generation Partnership Project (3GPP), R2-110460, "Use of Configured ABS Pattern After HO Failure and RLF", LG Electronics Inc., 3GPP TSG-RAN WG2 #72bis, Dublin, Ireland, Jan. 17-21, 2011, 3 pages.
3rd Generation Partnership Project (3GPP), Tdoc R2-134228, "eIMTA Configuration and Operation", InterDigital Communications, 3GPP TSG-RAN WG2 #84, San Francisco, USA, Nov. 11-15, 2013, 3 pages.
3rd Generation Partnership Project (3GPP), TS 36.211 V10.7.0, "Technical Specification Group Radio Access Network, Evolved Universal Terrestrial Radio Access (E-UTRA), Physical Channels and Modulation (Release 10)", Feb. 2013, pp. 1-101.
3rd Generation Partnership Project (3GPP), TS 36.211 V11.2.0, "Technical Specification Group Radio Access Network, Evolved Universal Terrestrial Radio Access (E-UTRA), Physical Channels and Modulation (Release 11)", Feb. 2013, pp. 1-109.
3rd Generation Partnership Project (3GPP), TS 36.211 V11.5.0, "Technical Specification Group Radio Access Network, Evolved Universal Terrestrial Radio Access (E-UTRA), Physical channels and Modulation (Release 11)", Feb. 2013, pp. 1-120.
3rd Generation Partnership Project (3GPP), TS 36.211 V12.1.0, "Technical Specification Group Radio Access Network, Evolved Universal Terrestrial Radio Access (E-UTRA), Physical Channels and Modulation (Release 12)", Mar. 2014, pp. 1-120.
3rd Generation Partnership Project (3GPP), TS 36.211 V8.9.0, "Technical Specification Group Radio Access Network, Evolved Universal Terrestrial Radio Access (E-UTRA), Physical Channels and Modulation (Release 8)", Dec. 2009, pp. 1-83.
3rd Generation Partnership Project (3GPP), TS 36.211 V9.1.0, "Technical Specification Group Radio Access Network, Evolved Universal Terrestrial Radio Access (E-UTRA), Physical Channels and Modulation (Release 9)", Mar. 2010, pp. 1-85.
3rd Generation Partnership Project (3GPP), TS 36.212 V10.7.0, "Technical Specification Group Radio Access Network, Evolved Universal Terrestrial Radio Access (E-UTRA), Multiplexing and Channel Coding (Release 10)", Dec. 2012, pp. 1-79.
3rd Generation Partnership Project (3GPP), TS 36.212 V10.8.0, "Technical Specification Group Radio Access Network, Evolved Universal Terrestrial Radio Access (E-UTRA), Multiplexing and Channel Coding (Release 10)", Jun. 2013, pp. 1-79.
3rd Generation Partnership Project (3GPP), TS 36.212 V11.2.0, "Technical Specification Group Radio Access Network, Evolved Universal Terrestrial Radio Access (E-UTRA), Multiplexing and Channel Coding (Release 11)", Feb. 2013, pp. 1-82.
3rd Generation Partnership Project (3GPP), TS 36.212 V11.4.0, "Technical Specification Group Radio Access Network, Evolved Universal Terrestrial Radio Access (E-UTRA), Multiplexing and Channel Coding (Release 11)", Dec. 2013, pp. 1-84.
3rd Generation Partnership Project (3GPP), TS 36.212 V12.0.0, "Technical Specification Group Radio Access Network, Evolved Universal Terrestrial Radio Access (E-UTRA), Multiplexing and Channel Coding (Release 12)", Dec. 2013, pp. 1-88.
3rd Generation Partnership Project (3GPP), TS 36.212 V8.8.0, "Technical Specification Group Radio Access Network, Evolved Universal Terrestrial Radio Access (E-UTRA), Multiplexing and Channel Coding (Release 8)", Dec. 2009, pp. 1-60.
3rd Generation Partnership Project (3GPP), TS 36.212 V9.4.0, "Technical Specification Group Radio Access Network, Evolved Universal Terrestrial Radio Access (E-UTRA), Multiplexing and Channel Coding (Release 9)", Sep. 2011, pp. 1-61.
3rd Generation Partnership Project (3GPP), TS 36.213 V10.12.0, "Technical Specification Group Radio Access Network, Evolved Universal Terrestrial Radio Access (E-UTRA), Physical Layer Procedures (Release 10)", Mar. 2014, pp. 1-127.
3rd Generation Partnership Project (3GPP), TS 36.213 V10.9.0, "Technical Specification Group Radio Access Network, Evolved Universal Terrestrial Radio Access (E-UTRA), Physical Layer Procedures (Release 10)", Feb. 2013, pp. 1-126.
3rd Generation Partnership Project (3GPP), TS 36.213 V11.2.0, "Technical Specification Group Radio Access Network, Evolved Universal Terrestrial Radio Access (E-UTRA), Physical Layer Procedures (Release 11)", Feb. 2013, pp. 1-173.
3rd Generation Partnership Project (3GPP), TS 36.213 V11.6.0, "Technical Specification Group Radio Access Network, Evolved Universal Terrestrial Radio Access (E-UTRA), Physical Layer Procedures (Release 11)", Mar. 2014, pp. 1-182.
3rd Generation Partnership Project (3GPP), TS 36.213 V12.1.0, "Technical Specification Group Radio Access Network, Evolved Universal Terrestrial Radio Access (E-UTRA), Physical Layer Procedures (Release 12)", Mar. 2014, pp. 1-186.
3rd Generation Partnership Project (3GPP), TS 36.213 V8.8.0, "Technical Specification Group Radio Access Network, Evolved Universal Terrestrial Radio Access (E-UTRA), Physical Layer Procedures (Release 8)", Sep. 2009, pp. 1-77.
3rd Generation Partnership Project (3GPP), TS 36.213 V9.3.0, "Technical Specification Group Radio Access Network, Evolved Universal Terrestrial Radio Access (E-UTRA), Physical Layer Procedures (Release 9)", Sep. 2010, pp. 1-80.
3rd Generation Partnership Project (3GPP), TS 36.331 V10.12.0, "Technical Specification Group Radio Access Network, Evolved Universal Terrestrial Radio Access (E-UTRA), Radio Resource Control (RRC), Protocol Specification (Release 10)", Dec. 2013, pp. 1-310.
3rd Generation Partnership Project (3GPP), TS 36.331 V10.9.0, "Technical Specification Group Radio Access Network, Evolved Universal Terrestrial Radio Access (E-UTRA), Radio Resource Control (RRC), Protocol Specification (Release 10)", Mar. 2013, pp. 1-307.
3rd Generation Partnership Project (3GPP), TS 36.331 V11.3.0, "Technical Specification Group Radio Access Network, Evolved Universal Terrestrial Radio Access (E-UTRA), Radio Resource Control (RRC), Protocol Specification (Release 11)", Mar. 2013, pp. 1-344.
3rd Generation Partnership Project (3GPP), TS 36.331 V11.7.0, "Technical Specification Group Radio Access Network, Evolved Universal Terrestrial Radio Access (E-UTRA), Radio Resource Control (RRC), Protocol Specification (Release 11)", Mar. 2014, pp. 1-350.
3rd Generation Partnership Project (3GPP), TS 36.331 V12.1.0, "Technical Specification Group Radio Access Network, Evolved Universal Terrestrial Radio Access (E-UTRA); Radio Resource Control (RRC), Protocol Specification (Release 12)", Mar. 2014, pp. 1-356.
3rd Generation Partnership Project (3GPP), TS 36.331 V8.19.0, "Technical Specification Group Radio Access Network, Evolved Universal Terrestrial Radio Access (E-UTRA), Radio Resource Control (RRC), Protocol Specification (Release 8)", Mar. 2013, pp. 1-216.
3rd Generation Partnership Project (3GPP), TS 36.331 V8.20.0, "Technical Specification Group Radio Access Network, Evolved Universal Terrestrial Radio Access (E-UTRA), Radio Resource Control (RRC), Protocol Specification (Release 8)", Jun. 2013, pp. 1-216.
3rd Generation Partnership Project (3GPP), TS 36.331 V9.14.1, "Technical Specification Group Radio Access Network, Evolved Universal Terrestrial Radio Access (E-UTRA), Radio Resource Control (RRC), Protocol Specification (Release 9)", Mar. 2013, pp. 1-262.
3rd Generation Partnership Project (3GPP), TS 36.331 V9.17.0, "Technical Specification Group Radio Access Network, Evolved Universal Terrestrial Radio Access (E-UTRA), Radio Resource Control (RRC), Protocol Specification (Release 9)", Dec. 2013, pp. 1-262.
"3GPP™ Work Item Description, Coordinated Multi-Point Operation for LTE", CoMP Feature, 3GPP Tdoc RP-111365, Fukuoka, Japan, Sep. 13-16, 2011, 5 pages.
"3GPP™ Work Item Description, Coordinated Multi-Point Operation for LTE—Downlink Core Part", DL Core, 3GPP RP-111365, Fukuoka, Japan, Sep. 13-16, 2011, 6 pages.

(56) References Cited

OTHER PUBLICATIONS

"3GPP™ Work Item Description, Coordinated Multi-Point Operation for LTE—Downlink Performance Part", DL Performance, 3GPP RP-111365, Fukuoka, Japan, Sep. 13-16, 2011, 5 pages.
"3GPP™ Work Item Description, Coordinated Multi-Point Operation for LTE—Uplink Core Part", CoMP UL Core, 3GPP RP-111365, Fukuoka, Japan, Sep. 13-16, 2011, 6 pages.
"3GPP™ Work Item Description, Coordinated Multi-Point Operation for LTE—Uplink Performance Part", CoMP UL Performance, RP-111365, Fukuoka, Japan, Sep. 13-16, 2011, 5 pages.
"3rd Generation Partnership Project; Technical Specification Group Radio Access Network; Coordinated multi-point operation for LTE physical layer aspects (Release 11)", 3GPP TR 36.819 V11.1.0, Dec. 2011, 69 pages.
"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.2.0, Mar. 2013, 56 pages.
"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.5.0, Mar. 2014, 57 pages.
"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.1.0, Mar. 2014, 57 pages.
"3rd Generation Partnership Project; Technical Specification Group Radio Access Network; Evolved Universal Terrestrial Radio Access (E-UTRA); Requirements for support of radio resource management (Release 11)", 3GPP TS 36.133 V11.4.0, Mar. 2013.
"3rd Generation Partnership Project; Technical Specification Group Radio Access Network; Evolved Universal Terrestrial Radio Access (E-UTRA); Requirements for support of radio resource management (Release 11)", 3GPP TS 36.133 V11.8.0, Mar. 2014, 792 pages.
"3rd Generation Partnership Project; Technical Specification Group Radio Access Network; Evolved Universal Terrestrial Radio Access (E-UTRA); Requirements for support of radio resource management (Release 12)", 3GPP TS 36.133 V12.3.0, Mar. 2014, 820 pages.
"3rd Generation Partnership Project; Technical Specification Group Radio Access Network; User Equipment (UE) radio transmission and reception (FDD) (Release 11)", 3GPP TS 25.101 V11.5.0, Mar. 2013, 330 pages.
"3rd Generation Partnership Project; Technical Specification Group Radio Access Network; User Equipment (UE) radio transmission and reception (FDD) (Release 11)", 3GPP TS 25.101 V11.9.0, Mar. 2014, 363 pages.
"3rd Generation Partnership Project; Technical Specification Group Radio Access Network; User Equipment (UE) radio transmission and reception (FDD) (Release 12)", 3GPP TS 25.101 V12.3.0, Mar. 2014, 363 pages.
"3rd Generation Partnership Project; Technical Specification Group Radio Access Network; Evolved Universal Terrestrial Radio Access (E-UTRA); Physical Layer Procedures (Release 9)", 3GPP TS 36.213 V9.3.0, Sep. 2010, 80 pages.
"3rd Generation Partnership Project; Technical Specification Group Radio Access Network; Evolved Universal Terrestrial Radio Access (E-UTRA); Requirements for support of radio resource management (Release 9)", 3GPP TS 36.133 V9.1.0, Sep. 2009, 317 pages.
"International Preliminary Report on Patentability", International Application No. PCT/US2009/066618, dated Mar. 11, 2011, 10 pages.
"International Preliminary Report on Patentability", International Application No. PCT/US2010/051106, dated Mar. 19, 2012, 14 pages.
"International Search Report and Written Opinion", International Application No. PCT/US2010/051106, dated Oct. 18, 2011, 13 pages.

Ericsson, et al., "On remaining details for uplink power control with carrier aggregation", 3GPP Tdoc R1-100846, 3GPP TSG RAN WG1 Meeting #60. San Francisco, USA, Feb. 22-26, 2010, 4 pages.
Ericsson, et al., "Standardization Impact of CoMP", 3GPP Tdoc R1-112094; 3GPP TSG-RAN WG1 #66, Athens, Greece, Aug. 22-26, 2011, 5 pages.
ETRI, "Uplink power control for CoMP Scenarios 3 and 4", 3GPP Tdoc R1-112212; 3GPP TSG RAN WG1 Meeting #66, Athens, Greece, Aug. 22-26, 2011, 3 pages.
R2-110460, "3rd Generation Partnership Project (3GPP)", "Use of Configured ABS Pattern after HO Failure and RLF", Jan. 17-21, 2011, 3 pages.
Samsung, "PUCCH/PUSCH power headroom reporting", 3GPP Tdoc R1-102179; 3GPP TSG RAN WG1 Meeting #60bis, Beijing, China, Apr. 12-16, 2010, 2 pages.
Sharp, "Considerations on power headroom reporting in LTE-A", 3GPP Tdoc R1-102397; 3GPP TSG-RAN WG1#60bis, Beijing, China, Apr. 12-16, 2010, 2 pages.
TR 36.819 V11.2.0, "3rd Generation Partnership Project (3GPP), TR 36.819 V11.2.0", Technical Specification Group Radio Access Network, Coordinated Multi-Point Operation for LTE Physical Layer Aspects (Release 11), Sep. 2011, 1-70 pages.
ZTE, "Power Headroom Reporting for Carrier Aggregation in LTE-Advanced", 3GPP Tdoc R1-101814, 3GPP TSG RAN WG1 Meeting #60bis, Beijing, China, Apr. 12-16, 2010, 4 pages.
"3rd Generation Partnership Project; Technical Specification Group Radio Access Network; Evolved Universal Terrestrial Radio Access (E-UTRA); Physical layer procedures (Release 8)", 3GPP TS 36.213 V8.5.0, Dec. 2008, 74 pages.
"3rd Generation Partnership Project; Technical Specification Group Radio Access Network; Evolved Universal Terrestrial Radio Access (E-UTRA); Physical layer procedures (Release 9)", 3GPP TS 36.213 V9.0.1, Dec. 2009, 79 pages.
"International Preliminary Report on Patentability", International Patent Application No. PCT/US2010/023669, dated Aug. 9, 2011, 12 pages.
"International Search Report", International Patent Application No. PCT/US2009/066618, dated Jul. 12, 2010, 4 pages.
"International Search Report", International Patent Application No. PCT/US2010/023669, dated Apr. 5, 2011, 5 pages.
"Written Opinion", International Patent Application No. PCT/US2010/023669, dated Apr. 5, 2011, 11 pages.
"Written Opinion", International Patent Application No. PCT/US2009/066618, dated Jul. 12, 2010, 6 pages.
3rd Generation Partnership Project (3GPP), R1-092265, "Clarification on RNTI for TPC Command", 3GPP TSG-RAN WG1 Meeting #57, San Francisco, USA, May 4-8, 2009, 7 pages.
3rd Generation Partnership Project (3GPP), R1-092669, "Concurrent PUSCH and PUCCH Transmissions", Samsung, 3GPP TSG RAN WG1 #57bis, Los Angeles, USA, Jun. 29-Jul. 3, 2009, 2 pages.
3rd Generation Partnership Project (3GPP), R1-093840, "UL Power Control in Carrier Aggregation", Huawei, 3GPP TSG RAN WG1 Meeting #58bis, Miyazaki, Japan, Oct. 12-16, 2009, 4 pages.
3rd Generation Partnership Project (3GPP), R1-105098, "Introduction of Rel-10 LTE-Advanced Features in 36.213", Motorola, 3GPP TSG-RAN Meeting #62, Madrid, Spain, Aug. 23-27, 2010, 2 pages.
3rd Generation Partnership Project (3GPP), R2-093723, "Impact of CA on MAC Layer", CATT, 3GPP TSG RAN WG2 Meeting #66bis, Los Angeles, USA, Jun. 29-Jul. 3, 2009, 3 pages.
3rd Generation Partnership Project (3GPP), R2-093886, "Considerations of Scheduling in Carrier Aggregation", ZTE, 3GPP TSG RAN WG2 Meeting #66bis, Los Angeles, USA, Jun. 29-Jul. 3, 2009, 4 pages.
3rd Generation Partnership Project (3GPP), TS 36.213 V8.7.0, "Technical Specification Group Radio Access Network, Evolved Universal Terrestrial Radio Access (E-UTRA), Physical Layer Procedures (Release 8)", May 2009, pp. 1-77.
3rd Generation Partnership Project (3GPP), R3-002537, "CFN/SFN in Measurement Reporting", Ericsson, TSG-RAN Working Group 3 Meeting #16, Windsor, UK, Oct. 16-20, 2000, 1 page.
3rd Generation Partnership Project (3GPP), TS 36.213 V10.2.0, "Technical Specification Group Radio Access Network, Evolved

(56) References Cited

OTHER PUBLICATIONS

Universal Terrestrial Radio Access (E-UTRA), Physical Layer Procedures (Release 10)", Jun. 2011, 120 pages.
3$^{rd}$ Generation Partnership Project (3GPP), R1-122078, "Zero-Power CSI-RS Configurations for Interference Measurements in CoMP", Fujitsu, TSG-RAN WG1, Meeting #69, Prague, Czech Republic, May 21-25, 2012, 4 pages.
3rd Generation Partnership Project (3GPP ), R1-091248, "Concurrent PUSCH and PUCCH Transmissions", Samsung , 3GPP TSG RAN WG1 #56bis, Seoul, Korea, Mar. 23-27, 2009, 2 pages.
3rd Generation Partnership Project (3GPP), R1-081464, "Triggers for Power Headroom Reports in EUTRAN Uplink", Nokia Siemens Networks, Nokia, 3GPP TSG RAN WG1 Meeting #52bis, Shenzhen, China, Mar. 31-Apr. 4, 2008, 2 pages.
3rd Generation Partnership Project (3GPP), R1-082468, "Carrier aggregation in LTE-Advanced", 3GPP TSG-RAN WG1 #53bis, Warsaw, Poland, Jun. 30-Jul. 4, 2008, 6 pages.
3rd Generation Partnership Project (3GPP), R1-082807, "CM Analysis of UL Transmission for LTE-A", InterDigital Communications, LLC, 3GPP TSG-RAN WG1 Meeting #54, Jeju, Korea, Aug. 18-22, 2008, 8 pages.
3rd Generation Partnership Project (3GPP), R1-084398, "Aspects to Consider for DL Transmission Schemes of LTE-A", Qualcomm Europe, 3GPP TSG-RAN WG1 #55, Prague, Czech Republic, Nov. 10-14, 2008, 11 pages.
3rd Generation Partnership Project (3GPP), R1-084702, "To Fix the Discrepancy of Uplink Power Control and Channel Coding of Control Information in PUSCH", Motorola, 3GPP TSG-RAN1 Meeting #55, Prague, Czech Republic, Nov. 10-14, 2008, 2 pages.
3rd Generation Partnership Project (3GPP), R1-090234, "UL Control Signalling to Support Bandwidth Extension in LTE Advanced", Nokia Siemens Networks, Nokia, Ljubljana, Slovenia, Jan. 12-16, 2009, 5 pages.
3rd Generation Partnership Project (3GPP), R1-090362, "Support of Concurrent Transmission of PUCCH and PUSCH in LTE-A Uplink", Qualcomm Europe, 3GPP TSG RAN WG1 #55bis, Ljubljana, Slovenia, Jan. 12-16, 2009, 3 pages.
3rd Generation Partnership Project (3GPP), R1-090363, "CM Analysis of Concurrent PUSCH and PUCCH UL Transmission for LTE-A", Qualcomm Europe, 3GPP TSG RAN WG1 #55bis, Ljubljana, Slovenia, Jan. 12-16, 2009, 7 pages.
3rd Generation Partnership Project (3GPP), R1-090430, "Alignment of RAN1/RAN4 Specification on UE maximum Output Power", LG Electronics, Ericsson, Panasonic, NTT DOCOMO, Nokia Siemens Network, Nokia, 3GPP TSG-RAN WG1 Meeting #55bis, Ljubljana, Slovenia, Jan. 12-16, 2009, 9 pages.
3rd Generation Partnership Project (3GPP), R1-090544, "Text Proposal for TR36.814 on Uplink Transmission Scheme", Ericsson, Ljubljana, Slovenia, Jan. 12-16, 2009, 2 pages.
3rd Generation Partnership Project (3GPP), R1-090611, "Concurrent PUSCH and PUCCH Transmissions", Samsung, 3GPP TSG RAN WG1 #56, Athens, Greece, Feb. 9-13, 2009, 2 pages.
3rd Generation Partnership Project (3GPP), R1-090654, "PUCCH Piggybacking onto PUSCH in Case of Transmit Power Limitation", LG Electronics, 3GPP TSG RAN WG1 #56, Athens, Greece, Feb. 9-13, 2009, 5 pages.
3rd Generation Partnership Project (3GPP), R1-090655, "Uplink Multiple Channel Transmission in Case of UE Transmit Power Limitation", LG Electronics, 3GPP TSG RAN WG1#56, Athens, Greece, Feb. 9-13, 2009, 3 pages.
3rd Generation Partnership Project (3GPP), R1-090738, "PUSCH Power Control for LTE-Advanced", Nokia Siemens Networks, Nokia, 3GPP TSG RAN WG1 #56 Meeting, Athens, Greece, Feb. 9-13, 2009, 4 pages.
3rd Generation Partnership Project (3GPP), R1-092415, "Uplink Power Control for Carrier Aggregation", Research in Motion, UK Limited, 3GPP TSG RAN WG1 Meeting #57b, Los Angeles, USA, Jun. 29-Jul. 3, 2009, 3 pages.
3rd Generation Partnership Project (3GPP), R1-092574, "PUSCH Power Control for LTE-Advanced", Nokia Siemens Networks, Nokia, 3GPP TSG RAN WG1 #57bis Meeting, Los Angeles, CA, USA, Jun. 29-Jul. 3, 2009, 4 pages.
3rd Generation Partnership Project (3GPP), R1-092670, "UL Transmission Power Control in LTE-A", Samsung, 3GPP TSG RAN WG1 #57bis, Los Angeles, USA, Jun. 29-Jul. 3, 2009, 5 pages.
3rd Generation Partnership Project (3GPP), R1-092983, "LS on Power Amplifier Configurations for UEs with Multiple Transmit Antennas", Qualcomm Europe, 3GPP TSG-WG1 #57bis, Los Angeles, USA, Jun. 29-Jul. 3, 2009, 2 pages.
3rd Generation Partnership Project (3GPP), R1-093070, "Proposed Way Forward on UL Power Control for LTE-A Bandwidth Extension" InterDigital Communications, LLC, 3GPP TSG-RAN WG1 Meeting #58, Shenzhen, China, Aug. 24-28, 2009, 3 pages.
3rd Generation Partnership Project (3GPP), R1-093297, "Uplink Power Control for Carrier Aggregation", 3GPP TSG RAN WG1 Meeting #58, Shenzhen, China, Aug. 24-28, 2009, 3 pages.
3rd Generation Partnership Project (3GPP), R1-094274, "Uplink Power Control for Carrier Aggregation", Ericsson, ST-Ericsson, 3GPP TSG RAN WG1 Meeting #58bis, Oct. 12-16, 2009, 4 pages.
3rd Generation Partnership Project (3GPP), R1-094470, "Uplink Power Control in LTE-Advanced", LG Electronics, 3GPP TSG RAN WG1 #59, Jeju, Korea, Nov. 9-13, 2009, 5 pages.
3rd Generation Partnership Project (3GPP), R1-100071, "Considerations on Uplink Power Control in LTE-Advanced", CATT, 3GPP TSG RAN WG1 Meeting #59bis, Valencia, Spain, Jan. 18-22, 2010, 3 pages.
3rd Generation Partnership Project (3GPP), R1-101715, "LS Reply on Uplink Power Control in LTE-A", 3GPP TSG-RAN WG1 Meeting #60bis, Beijing, China, Apr. 12-16, 2010, 2 pages.
3rd Generation Partnership Project (3GPP), R1-102601, "Final Report of 3GPP TSG RAN WG1 #60bis V1.0.0, Beijing, China, Apr. 12-16, 2010", MCC Support, 3GPP TSG RAN WG1 Meeting #61, Montreal, Canada, May 10-14, 2010, 85 pages.
3rd Generation Partnership Project (3GPP), R1-104183, "Final Report of 3GPP TSG RAN WG1 #61 V3.0.0", 3GPP TSG RAN WG1 Meeting #61bis, Dresden, Germany, Jun. 28-Jul. 2, 2010, 83 pages.
3rd Generation Partnership Project (3GPP), R2 085326, "Considering about PHR", CATT, 3GPP TSG RAN WG2 #63bis, Prague, Czech Republic, Sep. 29-Oct. 3, 2008, 6 pages.
3rd Generation Partnership Project (3GPP), TDOC R2-103580, "Summary of E-mail Discussion [70#15] LTE CA: PHR Handling", Ericsson, 3GPP TSG-RAN WG2 #70bis, Stockholm, Sweden, Jun. 28-Jul. 2, 2010, 17 pages.
3rd Generation Partnership Project (3GPP), TR 36.814 V0.4.1, "Technical Specification Group Radio Access Network, Further Advancements for E-UTRA Physical Layer Aspects (Release 9)", Feb. 2009, 31 pages.
3rd Generation Partnership Project (3GPP), TR 36.814 V1.5.0, "Technical Specification Group Radio Access Network, Further Advancements for E-UTRA Physical Layer Aspects (Release 9)", Nov. 2009, 53 pages.
3rd Generation Partnership Project (3GPP), TR 36.814 V9.0.0, "Technical Specification Group Radio Access Network, Evolved Universal Terrestrial Radio Access (E-UTRA), Further Advancements for E-UTRA Physical Layer Aspects (Release 9)", Mar. 2010, 104 pages.
3rd Generation Partnership Project (3GPP), TS 25.101 V8.5.1, "Technical Specification Group Radio Access Network, User Equipment (UE) Radio Transmission and Reception (FDD) (Release 8)", Jan. 2009, 214 pages.
3rd Generation Partnership Project (3GPP), TS 25.101 V8.9.0, "Technical Specification Group Radio Access Network, User Equipment (UE) Radio Transmission and Reception (FDD) (Release 8)", Dec. 2009, 217 pages.
3rd Generation Partnership Project (3GPP), TS 25.101 V9.2.0, "3rd Generation Partnership Project, Technical Specification Group Radio Access Network, User Equipment (UE) Radio Transmission and Reception (FDD) (Release 9)", Dec. 2009, 244 pages.
3rd Generation Partnership Project (3GPP), TS 36.133 V8.10.0, "Technical Specification Group Radio Access Network, Evolved

(56) References Cited

OTHER PUBLICATIONS

Universal Terrestrial Radio Access (E-UTRA), Requirements for Support of Radio Resource Management (Release 8)", Jun. 2010, 328 pages.
3rd Generation Partnership Project (3GPP), TS 36.133 V8.7.0, "Technical Specification Group Radio Access Network, Evolved Universal Terrestrial Radio Access (E-UTRA), Requirements for Support of Radio Resource Management (Release 8)", Sep. 2009, 317 pages.
3rd Generation Partnership Project (3GPP), TS 36.133 V9.1.0, "Technical Specification Group Radio Access Network, Evolved Universal Terrestrial Radio Access (E-UTRA), Requirements for Support of Radio Resource Management (Release 9)", Sep. 2009, 318 pages.
3rd Generation Partnership Project (3GPP), TS 36.133 V9.4.0, "Technical Specification Group Radio Access Network, Evolved Universal Terrestrial Radio Access (E-UTRA), Requirements for Support of Radio Resource Management (Release 9)", Jun. 2006, 377 pages.
3rd Generation Partnership Project (3GPP), TS 36.213 V10.0.0, "Technical Specification Group Radio Access Network, Evolved Universal Terrestrial Radio Access (E-UTRA), Physical Layer Procedures (Release 10)", Dec. 2010, pp. 1-98.
3rd Generation Partnership Project (3GPP), TS 36.213 V8.4.0, "Technical Specification Group Radio Access Network, Evolved Universal Terrestrial Radio Access (E-UTRA), Physical Layer Procedures (Release 8)", Sep. 2008, pp. 1-60.
3rd Generation Partnership Project (3GPP), TS 36.213 V8.5.0, "3rd Generation Partnership Project; Technical Specification Group Radio Access Network; Evolved Universal Terrestrial Radio Access (E-UTRA); Physical Layer Procedures (Release 8)", Dec. 2008, pp. 1-74.
3rd Generation Partnership Project (3GPP), TS 36.213 V8.8.0, "Technical Specification Group Radio Access Network, Evolved Universal Terrestrial Radio Access (E-UTRA), Physical Layer Procedures (Release 8)", Sep. 2009, 77 pages.
3rd Generation Partnership Project (3GPP), TS 36.213 V9.0.1, "3rd Generation Partnership Project; Technical Specification Group Radio Access Network; Evolved Universal Terrestrial Radio Access (E-UTRA); Physical layer procedures (Release 9)", Dec. 2009, pp. 1-79.
3rd Generation Partnership Project (3GPP), TS 36.213 V9.2.0, "Technical Specification Group Radio Access Network, Evolved Universal Terrestrial Radio Access (E-UTRA), Physical Layer Procedures (Release 9)", Jun. 2010, 80 pages.
3rd Generation Partnership Project (3GPP), TS 36.321 V8.3.0, "3rd Generation Partnership Project; Technical Specification Group Radio Access Network; Evolved Universal Terrestrial Radio Access (E-UTRA) Medium Access Control (MAC) protocol specification (Release 8)", Sep. 2008, pp. 1-36.
3rd Generation Partnership Project (3GPP), TS 36.321 V8.4.0, "Technical Specification Group Radio Access Network, Evolved Universal Terrestrial Radio Access (E-UTRA) Medium Access Control (MAC) Protocol Specification (Release 8)", Dec. 2008, 43 pages.
3rd Generation Partnership Project (3GPP), TS 36.321 V8.8.0, "3rd Generation Partnership Project, Technical Specification Group Radio Access Network, Evolved Universal Terrestrial Radio Access (E-UTRA) Medium Access Control (MAC) Protocol Specification (Release 8)", Dec. 2009, 47 pages.
3rd Generation Partnership Project (3GPP), TS 36.321 V8.9.0, "Technical Specification Group Radio Access Network, Evolved Universal Terrestrial Radio Access (E-UTRA), Medium Access Control (MAC) Protocol Specification (Release 8)", Jun. 2010, 47 pages.
3rd Generation Partnership Project (3GPP), TS 36.321 V9.0.0, "3rd Generation Partnership Project; Technical Specification Group Radio Access Network; Evolved Universal Terrestrial Radio Access (E-UTRA) Medium Access Control (MAC) protocol specification (Release 9)", Sep. 2009, pp. 1-47.
3rd Generation Partnership Project (3GPP), TS 36.321 V9.1.0, "Technical Specification Group Radio Access Network, Evolved Universal Terrestrial Radio Access (E-UTRA) Medium Access Control (MAC) Protocol Specification (Release 9)", Dec. 2009, 48 pages.
3rd Generation Partnership Project (3GPP), TS 36.321 V9.3.0, "Technical Specification Group Radio Access Network, Evolved Universal Terrestrial Radio Access (E-UTRA), Medium Access Control (MAC) Protocol Specification (Release 9)", Jun. 2010, 48 pages.
3rd Generation Partnership Project (3GPP), TS 36.331 V8.10.0, "Technical Specification Group Radio Access Network, Evolved Universal Terrestrial Radio Access (E-UTRA), Radio Resource Control (RRC), Protocol Specification (Release 8)", Jun. 2010, 211 pages.
3rd Generation Partnership Project (3GPP), TS 36.331 V8.4.0, "Technical Specification Group Radio Access Network, Evolved Universal Terrestrial Radio Access (E-UTRA) Radio Resource Control (RRC), Protocol Specification (Release 8)", Dec. 2008, 198 pages.
3rd Generation Partnership Project (3GPP), TS 36.331 V8.7.0, "Technical Specification Group Radio Access Network, Evolved Universal Terrestrial Radio Access (E-UTRA) Radio Resource Control (RRC), Protocol Specification (Release 8)", Sep. 2009, 208 pages.
3rd Generation Partnership Project (3GPP), TS 36.331 V9.0.0, "Technical Specification Group Radio Access Network, Evolved Universal Terrestrial Radio Access (E-UTRA) Radio Resource Control (RRC), Protocol Specification (Release 9)", 213 pages.
3rd Generation Partnership Project (3GPP), TS 36.331 V9.1.0, "Technical Specification Group Radio Access Network, Evolved Universal Terrestrial Radio Access (E-UTRA) Radio Resource Control (RRC), Protocol Specification (Release 9)", Dec. 2009, 233 pages.
3rd Generation Partnership Project (3GPP), TS 36.331 V9.3.0, "Technical Specification Group Radio Access Network, Evolved Universal Terrestrial Radio Access (E-UTRA), Radio Resource Control (RRC), Protocol Specification (Release 9)", Jun. 2010, 250 pages.
3rd Generation Partnership Project(3GPP), TS 36.321 V8.7.0, "Technical Specification Group Radio Access Network, Evolved Universal Terrestrial Radio Access (E-UTRA), Medium Access Control (MAC) Protocol Specification (Release 8)", Sep. 2009, 47 pages.
European Telecommunications Standards Institute (ETSI), TS 136 213 V8.4.0, "LTE; Evolved Universal Terrestrial Radio Access (E-UTRA); Physical layer procedures (3GPP TS 36.213 version 8.4.0 Release 8)", Nov. 2008, pp. 1-62.
Shen et al., "3GPP Long Term Evolution: Principle and System Design", Nov. 2008, 7 pages.
Research in Motion UK Limited: "PH reporting for Carrier Aggregation", 3GPP Tdoc R1-102049; 3GPP TSG RAN WG1 Meeting #60bis, Beijing, China, Apr. 12-16, 2010, 2 pages.
Uplink multiple channel transmission in case of UE transmit power limitation, 3GPP TSG RAN WG1#56; R1-090655.
cdma2000_1x_EV_DO Rev.B System Overview Telecommunication Technology.
Nokia Siemens Networks, et al., "Power headroom reporting for EUTRAN uplink", 3GPP Tdoc R1-080329, 3GPP TSG RAN WG1 #51bis Meeting, Seville, Spain, Jan. 14-18, 2008, 3 pages.
Nokia Seiments Networks, et al., "PUSCH Power Control for LTE-Advanced", 3GPP TSG RAN WG1 #56 Meeting, 3GPP Tdoc R1-090738, Athens, Greece, Feb. 9-13, 2009, 4 pages.
New Postcom, "36300 CR(Rel-11)_Miscellaneous correction to 36.300 on handover," 3GPP Tdoc R1-130290; 3GPP Tdoc R2-1308171.

* cited by examiner

| Bandwidth | 6 | 15 | 25 | 50 | 75 | 100 |
|---|---|---|---|---|---|---|
| Format 0 | 37 | 38 | 41 | 43 | 43 | 44 |
| Format 1A | 37 | 38 | 41 | 43 | 43 | 44 |
| Format 3/3A | 37 | 38 | 41 | 43 | 43 | 44 |
| Format 1C | 24 | 26 | 28 | 29 | 30 | 31 |
| Format 1 | 35 | 39 | 43 | 47 | 49 | 55 |
| Format 1B (2 tx ant) | 38 | 41 | 43 | 44 | 45 | 46 |
| Format 1D (2 tx ant) | 38 | 41 | 43 | 44 | 45 | 46 |
| Format 2 (2 tx ant) | 47 | 50 | 55 | 59 | 61 | 67 |
| Format 2A (2 tx ant) | 44 | 47 | 52 | 57 | 58 | 64 |
| Format 1B (4 tx ant) | 41 | 43 | 44 | 46 | 47 | 49 |
| Format 1D (4 tx ant) | 41 | 43 | 44 | 46 | 47 | 49 |
| Format 2 (4 tx ant) | 50 | 53 | 58 | 62 | 64 | 70 |
| Format 2A (4 tx ant) | 46 | 49 | 54 | 58 | 61 | 66 |

FIG. 2

```
PhysicalConfigDedicated ::=      SEQUENCE {
    pdsch-ConfigDedicated            PDSCH-ConfigDedicated            OPTIONAL,   -- Need ON
    pucch-ConfigDedicated            PUCCH-ConfigDedicated            OPTIONAL,   -- Need ON
    pusch-ConfigDedicated            PUSCH-ConfigDedicated            OPTIONAL,   -- Need ON
    uplinkPowerControlDedicated      UplinkPowerControlDedicated      OPTIONAL,   -- Need ON
    tpc-PDCCH-ConfigPUCCH            TPC-PDCCH-Config                 OPTIONAL,   -- Need ON
    tpc-PDCCH-ConfigPUSCH            TPC-PDCCH-Config                 OPTIONAL,   -- Need ON
    cqi-ReportConfig                 CQI-ReportConfig                 OPTIONAL,   -- Cond CQI-r8
    soundingRS-UL-ConfigDedicated    SoundingRS-UL-ConfigDedicated    OPTIONAL,   -- Need ON
    antennaInfo                      CHOICE {
        explicitValue                    AntennaInfoDedicated,
        defaultValue                     NULL
    }                                                                 OPTIONAL,   -- Cond AI-r8
    schedulingRequestConfig          SchedulingRequestConfig          OPTIONAL,   -- Need ON
    ...,
    [[  cqi-ReportConfig-v920            CQI-ReportConfig-v920            OPTIONAL,   -- Need ON
        antennaInfo-v920                 AntennaInfoDedicated-v920        OPTIONAL    -- Need ON
    ]],
    [[  antennaInfo-r10                  CHOICE {
            explicitValue                    AntennaInfoDedicated-r10,
            defaultValue                     NULL
        }                                                             OPTIONAL,   -- Cond AI-r10
        cif-Presence                     BOOLEAN                          OPTIONAL,   -- Need ON
        cqi-ReportConfig-r10             CQI-ReportConfig-r10             OPTIONAL,   -- Cond CQI-r10
        csi-RS-Config-r10                CSI-RS-Config-r10                OPTIONAL,   -- Need ON
        pucch-ConfigDedicated-v10x0      PUCCH-ConfigDedicated-v10x0      OPTIONAL,   -- Need ON
        pusch-ConfigDedicated-v10x0      PUSCH-ConfigDedicated-v10x0      OPTIONAL,   -- Need ON
        schedulingRequestConfig-v10x0    SchedulingRequestConfig-v10x0    OPTIONAL,   -- Need ON
        soundingRS-UL-ConfigDedicated-v10x0    SoundingRS-UL-ConfigDedicated-v10x0    OPTIONAL,   -- Need ON
        soundingRS-UL-ConfigDedicatedAperiodic-r10    SoundingRS-UL-ConfigDedicatedAperiodic-r10    OPTIONAL,   -- Need ON
        ul-AntennaInfo-r10               UL-AntennaInfo-r10               OPTIONAL,   -- Need ON
        uplinkPowerControlDedicated-v10x0    UplinkPowerControlDedicated-v10x0    OPTIONAL,   -- Need ON
        transmissionContext1-rXX         SEQUENCE {
            pucch-ConfigDedicated            PUCCH-ConfigDedicated            OPTIONAL,   -- Need ON
            pusch-ConfigDedicated            PUSCH-ConfigDedicated            OPTIONAL,   -- Need ON
            uplinkPowerControlDedicated      UplinkPowerControlDedicated      OPTIONAL,   -- Need ON
            cqi-ReportConfig                 CQI-ReportConfig                 OPTIONAL,   -- Cond CQI-r8
            soundingRS-UL-ConfigDedicated    SoundingRS-UL-ConfigDedicated    OPTIONAL,   -- Need ON
            antennaInfo                      CHOICE {
                explicitValue                    AntennaInfoDedicated,
                defaultValue                     NULL
            }                                                             OPTIONAL,   -- Cond AI-r8
        }
    ]]
}
```

| Cyclic Shift Field in uplink-related DCI format | $n^{(2)}_{DMRS,\lambda}$ | | | |
|---|---|---|---|---|
| | $\lambda = 0$ | $\lambda = 1$ | $\lambda = 2$ | $\lambda = 3$ |
| 000 | 0 | | | |
| 000 | 0 | | | |
| 100 | 2 | | | |
| 010 | 3 | | | |
| 011 | 4 | | | |
| 011 | 4 | ...... | | |
| 001 | 6 | | | |
| 001 | 6 | | | |
| 101 | 8 | | | |
| 111 | 9 | | | |
| 011 | 10 | | | |
| 011 | 10 | | | |

↑ intended setting (first 011 row) ← $n_{PRE}$ → ↑ modified setting (second 011 row)

FIG. 8

| Cyclic Shift Field in uplink-related DCI format [3] | $n^{(2)}_{DMRS,\lambda}$ | | | | $[w^{(\lambda)}(0) \ w^{(\lambda)}(1)]$ | | | | $c_{init}$ (for CSH hopping) |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | [1 1] | [1 1] | [1 1] | [1 −1] | $\Delta^{(1)}_{csh}$ |
| 001 | 6 | 0 | 9 | 3 | [1 −1] | [1 −1] | [1 −1] | [1 1] | $\Delta^{(1)}_{csh}$ |
| 010 | 3 | 9 | 6 | 0 | [1 −1] | [1 −1] | [1 −1] | [1 1] | $\Delta^{(2)}_{csh}$ |
| 011 | 4 | 10 | 7 | 1 | [1 1] | [1 1] | [1 1] | [1 −1] | $\Delta^{(1)}_{csh}$ |
| 100 | 2 | 8 | 5 | 11 | [1 1] | [1 1] | [1 1] | [1 −1] | $\Delta^{(2)}_{csh}$ |
| 101 | 8 | 2 | 11 | 5 | [1 −1] | [1 −1] | [1 −1] | [1 1] | $\Delta^{(2)}_{csh}$ |
| 110 | 10 | 4 | 1 | 7 | [1 −1] | [1 −1] | [1 −1] | [1 1] | $\Delta^{(2)}_{csh}$ |
| 111 | 9 | 3 | 0 | 6 | [1 1] | [1 1] | [1 1] | [1 −1] | $\Delta^{(2)}_{csh}$ |

FIG. 9

MULTIPOINT TRANSMISSION IN WIRELESS COMMUNICATION

CROSS REFERENCE TO RELATED APPLICATIONS

This application is the 35 U.S.C. § 371 National Stage of Patent Cooperation Treaty Application No. PCT/US2012/058186, filed Sep. 30, 2012, which claims the benefit of U.S. Provisional Patent Application No. 61/542,145, titled "MULTIPOINT TRANSMISSION IN WIRELESS COMMUNICATIONS SYSTEM", filed Sep. 30, 2011; U.S. Provisional Patent Application No. 61/591,789, titled "MULTIPOINT TRANSMISSION IN WIRELESS COMMUNICATIONS SYSTEM", filed Jan. 27, 2012; U.S. Provisional Patent Application No. 61/604,399, titled "MULTIPOINT TRANSMISSION IN WIRELESS COMMUNICATIONS SYSTEM", filed Feb. 28, 2012; U.S. Provisional Patent Application No. 61/616,256, "MULTIPOINT TRANSMISSION IN WIRELESS COMMUNICATIONS SYSTEM", filed Mar. 27, 2012; U.S. Provisional Patent Application No. 61/644,827, titled "MULTIPOINT TRANSMISSION IN WIRELESS COMMUNICATIONS SYSTEM", filed May 9, 2012; U.S. Provisional Patent Application No. 61/678,437, titled "MULTIPOINT TRANSMISSION IN WIRELESS COMMUNICATIONS SYSTEM", filed Aug. 1, 2012; the disclosures of all seven applications hereby incorporated by reference herein in their respective entirety, for all purposes.

BACKGROUND

Coordinated multipoint transmission (CoMP) for Long Term Evolution (LTE) wireless systems refers to a family of schemes involving coordination between multiple geographically separated points of the network for communications with user equipment (UE) (or wireless transmit/receive unit (WTRU)). In the uplink direction, CoMP can involve joint reception of the transmitted signal at multiple reception points and/or coordinated scheduling decisions among points to control interference and improve coverage.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The methods and apparatus described herein, taken alone or in combination, enable a wireless transmit/receive unit (WTRU) to transmit different types of uplink channels or signals in a system deployment where multiple destination points may exist. In some embodiments described herein, the methods enable a WTRU to select the destination point of a transmission on a dynamic basis. In a system where destination point selection from among multiple potential destination points may be possible for a WTRU transmission, some embodiments of the system and methods provide for determination of the handling of hybrid automatic repeat request (HARM) retransmissions and for new (e.g., contemplated by embodiments) power headroom reporting mechanisms. In further embodiments, methods are described to reduce or inhibit WTRU transmissions to destination points to which the WTRU has lost connectivity. Reference signals (RS) may be enhanced by using a pre cyclic shift (CS) offset to compensate the peak drift due to unpaired bandwidth (BW) allocation, introducing another layer of hopping over different sizes of RS' or using method to decouple CS hopping from selection of base sequences. Methods are also described to determine an initial value of CS hopping and other parameters based on reinterpretation of cyclic shift field (CSF). Different transmit power control (TPC) commands for aperiodic sounding reference signal (SRS), periodic SRS and physical uplink shared channel (PUSCH) are also described. Additional power control methods are described for SRS using decoupled TPC commands. Methods to enhance physical uplink shared channel (PUSCH) resource block (RB) mapping based on more dynamic PUSCH RB allocation are also disclosed. Additional methods for selection of uplink transmission contexts (UTC) for physical uplink control channel (PUCCH) are described. Methods are also described to handle TPC commands for multiple UTC's or for groups of physical channels and/or transmission types and on how to deal with subframe subsets where WTRU's may have limited transmission possibilities, such as for example, Further enhanced inter-cell interference coordination (FeICIC).

Embodiments contemplate a wireless transmit/receive unit (WTRU), that may comprise a processor. The processor may be configured, at least in part, to select at least one Uplink Transmission Context (UTC). The at least one UTC may correspond to one or more characteristics. The processor may be configured to select at least one of the one or more characteristics. The processor may also be configured to initiate a transmission based, at least in part, on the at least one of the one or more characteristics.

Embodiments contemplate a wireless transmit/receive unit (WTRU) that may comprise a processor. The processor may be configured, at least in part, to select at least one Uplink Transmission Context (UTC) that may correspond to a transmission type. The processor may be configured to determine a transmit power that may correspond to the at least one UTC. The processor may also be configured to initiate a transmission that may correspond to the transmission type at the determined power.

Embodiments contemplate a wireless transmit/receive unit (WTRU) that may comprise a processor, where the processor may be configured, at least in part, to determine an initial value for cyclic shift (CS) hopping. The processor may be configured to decouple the initial value for CS hopping from a $f_{ss}^{PUSCH}$. The processor may also be configured to correlate the initial value for CS hopping to at least one Uplink Transmission Context (UTC).

BRIEF DESCRIPTION OF THE DRAWINGS

A more detailed understanding may be had from the following description, given by way of example in conjunction with the accompanying drawings (or figures). Figures in such drawings, like the detailed description, are examples. As such, the Figures and the detailed description are not to be considered limiting, and other equally effective examples are contemplated, wherein:

FIG. 2 is a table illustrating the different downlink control information (DCI) sizes resulting from different system bandwidth configurations consistent with embodiments;

FIGS. 5 and 6 are Pcell uplink transmission contexts (UTC) configurations consistent with embodiments;

FIG. 7 is a sample table of UplinkPowerControl information elements consistent with embodiments;

FIG. 8 is an exemplary illustration of the cyclic shift (CS) compensation at a network consistent with embodiments; and FIG. 9 is an example cyclic shift field consistent with embodiments.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. As used herein, the article "a" or "an", absent further qualification or characterization, may be understood to mean "one or more" or "at least one", for example.

Figure 1A:
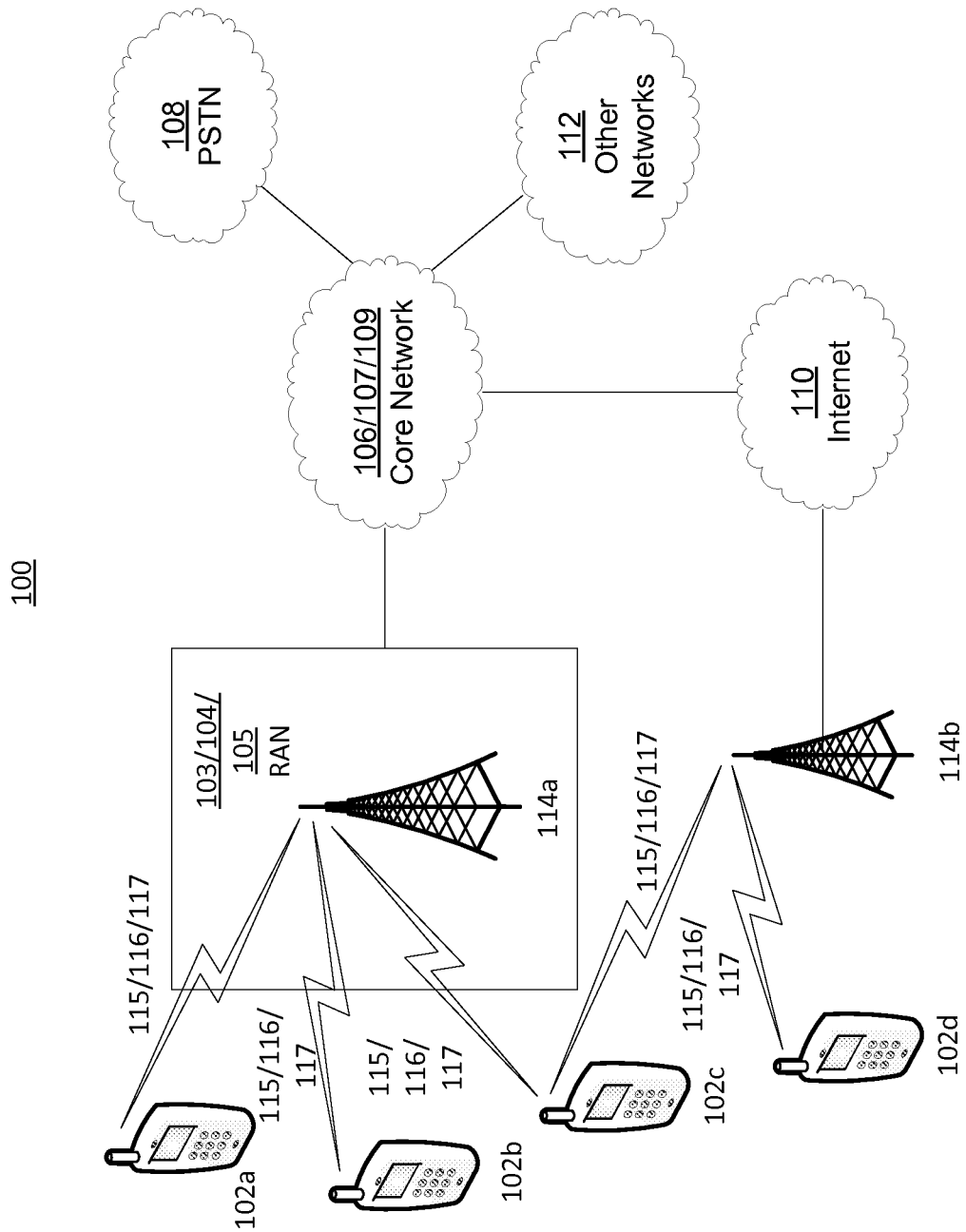
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
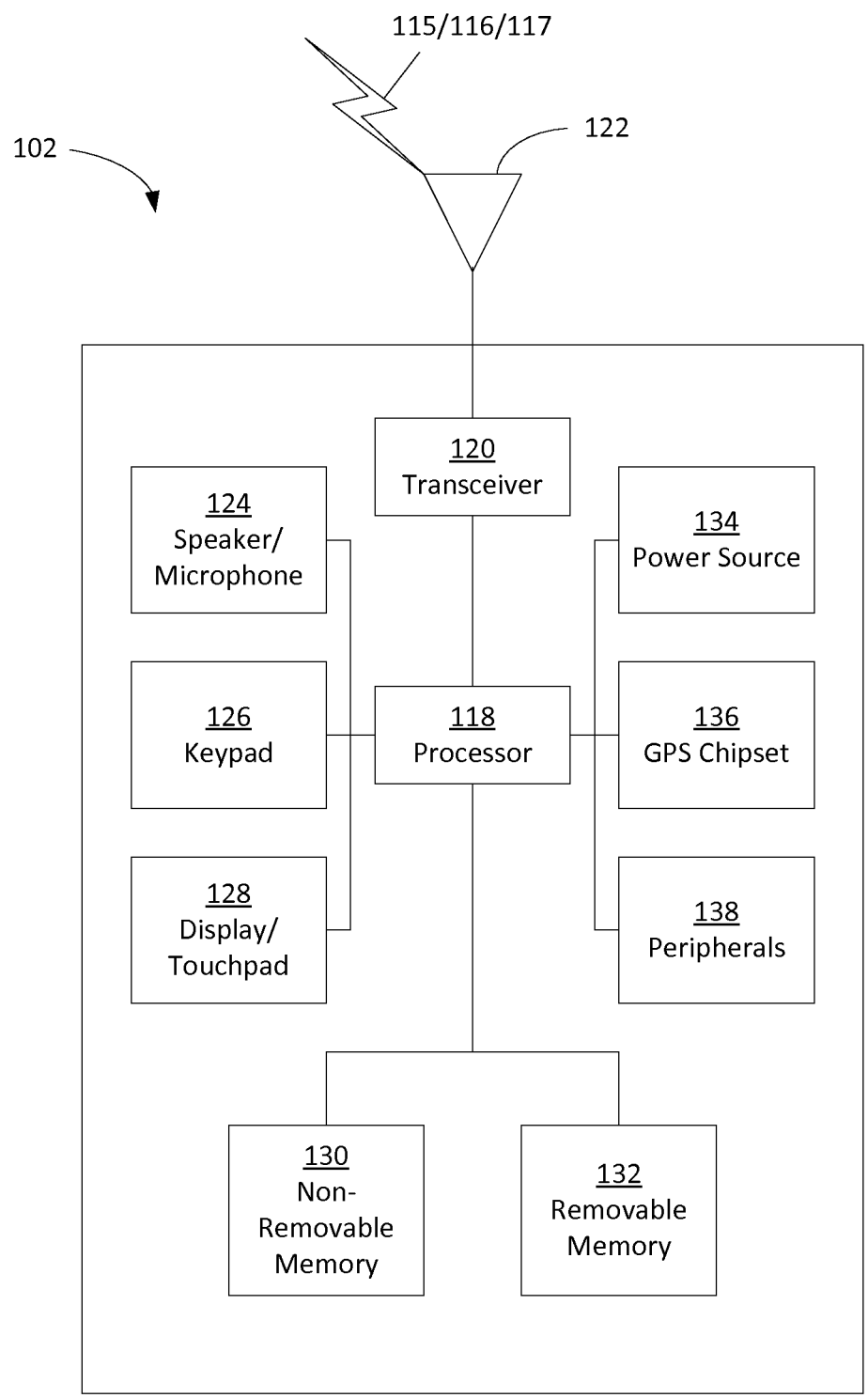
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
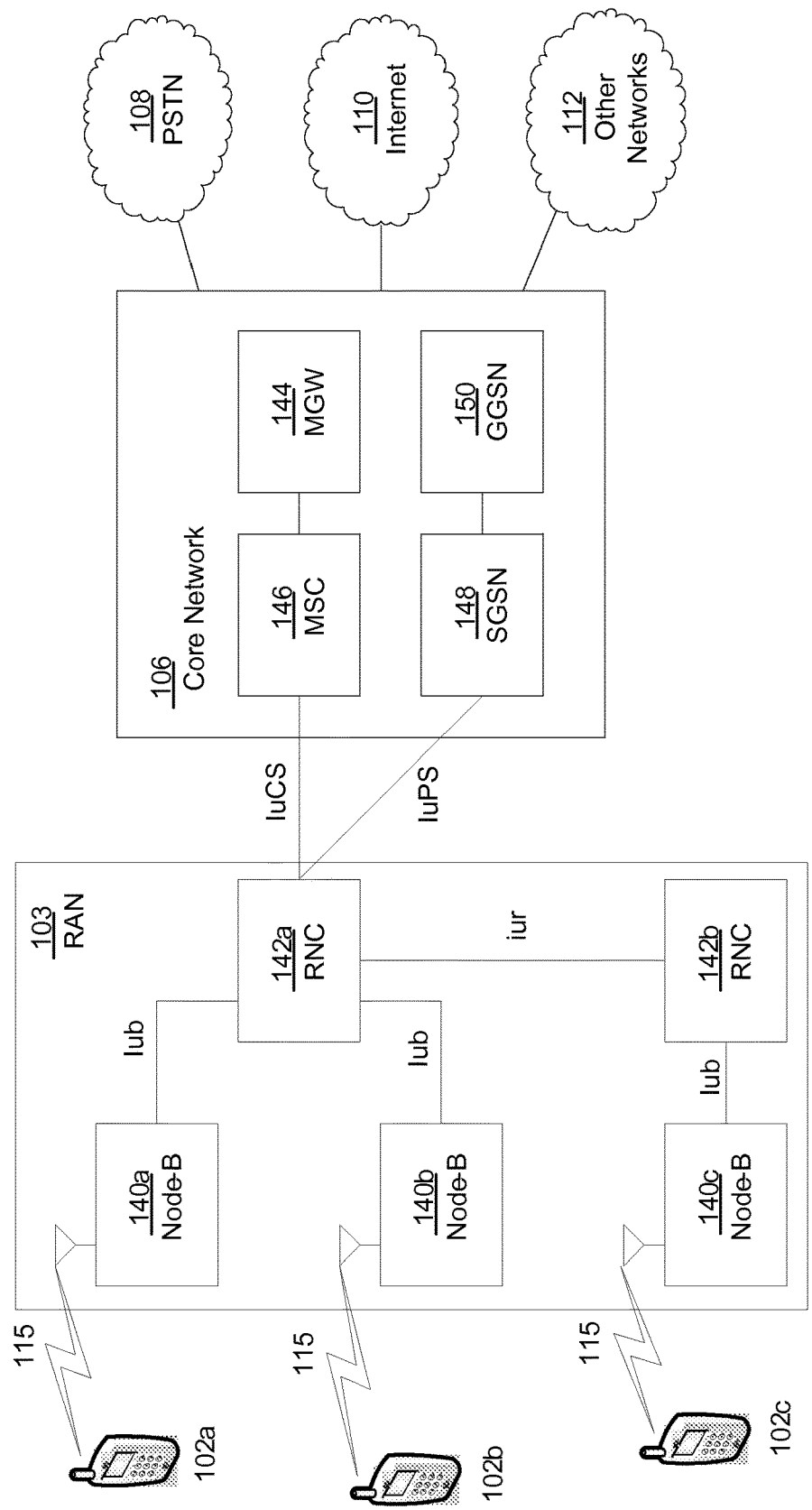
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Embodiments recognize that 3rd Generation Partnership Project (3GPP) long term evolution (LTE) Releases 8/9/10/11 operate with a single serving cell (hereafter LTE R8+) and support up to 100 Mbps in the downlink (DL), and 50 Mbps in the uplink (UL) for a 2×2 configuration. The LTE DL transmission scheme is based on an Orthogonal Frequency-Division Multiple Access (OFDMA) air interface.

Embodiments recognize that for the purpose of flexible deployment, among other reasons, LTE R8+ systems support scalable transmission bandwidths, one of [1.4, 2.5, 5, 10, 15 or 20] MHz. In LTE R8+, (also applicable to LTE R10+ with carrier aggregation), one or more, or each, radio frame (10 ms) may include of 10 equally sized sub-frames of 1 ms. One or more, or each, sub-frame includes 2 equally sized timeslots of 0.5 ms each. There may be either 7 or 6 OFDM symbols per timeslot, where 7 symbols per timeslot may be used with normal cyclic prefix length, and 6 symbols per timeslot may be used in an alternative system configuration with the extended cyclic prefix length. The sub-carrier spacing for the LTE R8/9 system is 15 kHz. An alternative reduced sub-carrier spacing mode using 7.5 kHz is contemplated.

Embodiments recognize that a resource element (RE) may correspond to (in some embodiments perhaps precisely) one (1) sub-carrier during one (1) OFDM symbol interval, where 12 consecutive sub-carriers during a 0.5 ms timeslot may constitute one (1) resource block (RB). Therefore, with 7 symbols per timeslot, one or more, or each, RB includes 12*7=84 RE's. A DL carrier can include scalable number of resource blocks (RBs), ranging from a minimum of 6 RBs up to a maximum of 110 RBs. This may correspond to an overall scalable transmission bandwidth of roughly 1 MHz up to 20 MHz. In some embodiments, a set of common transmission bandwidths may be specified, e.g. 1.4, 3, 5, 10 or 20 MHz.

The basic time-domain unit for dynamic scheduling is one sub-frame that may include at least two consecutive timeslots. In one or more embodiments this may be referred to as a resource-block pair. Certain sub-carriers on some OFDM symbols may be allocated to carry pilot signals in the time-frequency grid. In some embodiments, a given number of sub-carriers at the edges of the transmission bandwidth may not be transmitted in order to comply with spectral mask requirements, among other reasons.

For LTE, the downlink physical channels may include, while not being limited to, the Physical Control Format Indicator Channel (PCFICH), the Physical Hybrid ARQ Indicator Channel (PHICH), the Physical Data Control Channel (PDCCH), the Physical Multicast data Channel (PMCH), the Physical Broadcast Channel (PBCH) and the Physical Data Shared Channel (PDSCH). On the PCFICH, the WTRU receives control data indicating the size of the control region of the DL component carrier (CC). On the PHICH, the WTRU receives control data indicating hybrid automatic repeat request (HARQ) Acknowledgement/Negative Acknowledgement (HARQ A/N, HARQ ACK/NACK or HARQ-ACK) feedback for a previous uplink transmission. On the PDCCH, the WTRU receives downlink control information (DCI) messages that may be used for the purpose of scheduling of downlink and uplink resources. On the PDSCH, the WTRU may receive user and/or control data. For example, a WTRU may transmit on a UL CC.

For LTE, the uplink physical channels may include, while not being limited to, the Physical Uplink Control Channel (PUCCH), Physical Random Access Channel (PRACH) and the Physical Uplink Shared Channel (PUSCH). On the PUSCH, the WTRU may transmit user and/or control data. On the PUCCH, and in some case on the PUSCH, the WTRU may transmit uplink control information, (such as channel quality indicator/precoding matrix indicator/rank indicator or scheduling request (CQI/PMI/RI or SR), and/or hybrid automatic repeat request (HARQ, among others) acknowledgement/negative acknowledgement (ACK/NACK) feedback. On a UL CC, the user equipment (UE) or wireless transmit/receive unit (WTRU) (where the terms may be used interchangeably throughout this description), may also be allocated dedicated resources for transmission of Sounding Reference Signals (SRS).

In LTE R8+ systems, the WTRU may receive a cell-specific downlink reference signal for different purposes. For example, in the case of Cell-specific Reference Signals (hereafter CRS), the WTRU may use the CRS for channel estimation for coherent demodulation of any downlink physical channel except for PMCH and for PDSCH configured with TM7, TM8 or TM9. The WTRU may also use the CRS for channel state information (CSI) measurements. The WTRU may also use the CRS for cell-selection and mobility-related measurements. CRS may be received in any subframe. There may be one CRS for one or more, or each, of the antenna ports (1, 2, or 4). A CRS may occupy the first and third last OFDM symbol of one or more, or each, slot.

In addition, the WTRU may receive the one or more of the following downlink reference signals: 1) Demodulation Reference Signals (DM-RS): the WTRU-specific reference signals may be used for channel estimation for demodulation of PDSCH with TM7, TM8 and TM9. The DM-RS may be transmitted in the resource blocks assigned to the PDSCH transmission for the concerned WTRU; and/or 2) CSI Reference Signals (CSI-RS): The WTRU may use the CSI-RS for channel state information measurements. CSI-RS may be used for TM9 (or in some embodiments may only be so used), and may less densely transmitted by the network than the CRS.

The UE OR WTRU may obtain synchronization, may detect the identity of the cell (hereafter cell ID) and may determine the length (normal/extended) of the cyclic prefix using synchronization signals (which may be based on the difference in duration between the primary and the secondary synchronization signals). The UE OR WTRU may receive the Master Information block (hereafter MIB) on the PBCH; the MIB contains PHICH information, downlink bandwidth and system frame number. The UE OR WTRU can also use the PBCH to blindly detect the number of transmit antenna port(s) which detection is verified using the PBCH CRC.

In an LTE system, the NW may control physical radio resources using the PDCCH; control messages may be transmitted using specific messages, e.g. data control information (DCI) messages. The UE OR WTRU may determine whether or not it may be useful to act on control signaling in a given sub-frame by monitoring the PDCCH for specific DCIs scrambled using a known radio network temporary identifier (hereafter RNTI) in specific locations, or search space, using different combinations of physical resources (e.g., control channel elements—hereafter CCEs) based on aggregation levels (hereafter AL, one or more, or each, corresponding to either 1, 2, 4, or 8 CCEs). A CCE includes of 36 QPSK symbols, or 72 channel coded bits.

In one or more embodiments, the PDCCH may be conceptually separated in two distinct regions. The set of CCE locations in which a UE or WTRU may find DCIs it may act on may be referred to as a Search Space (hereafter SS). The SS may be conceptually split into the common SS (hereafter CSS) and UE OR WTRU-specific SS (hereafter UESS); the CSS may be common to one or more, or all, UEs monitoring a given PDCCH, while the UESS differs from one UE OR WTRU to another. In some embodiments, both SS may overlap for a given UE OR WTRU in a given sub-frame. This may be a function of the randomization function, and this overlap may differ from one sub-frame to another.

The set of CCE locations that makes up the Common Search Space (CSS), and its starting point, may be a function of the cell identity and the sub-frame number. For LTE R8/9, DCIs may be sent with AL4 (4 CCEs) or AL8 (8 CCEs) in the CSS (or in some embodiments may only be so sent). For a sub-frame for which the UE OR WTRU monitors the PDCCH, the UE OR WTRU may attempt to decode 2 DCI format sizes (e.g. formats 1A and 1C, see below, and also format 3A used for power control) in up to 4 different sets of 4 CCES for AL4 (e.g., 8 blind decoding) and up to 2 different sets of 8 CCEs for AL8 (e.g., 4 blind decoding) for a total of at most 12 blind decoding attempts in the CSS. The CSS corresponds to CCEs 0-15, implying four decoding candidates for AL4 (e.g., CCEs 0-3, 4-7, 8-11, 12-15) and two decoding candidates for AL8 (CCEs 0-7, 8-15).

The set of CCE locations that makes up the UE OR WTRU-Specific Search Space (UESS), and its starting point, may be a function of the UE OR WTRU identity and the sub-frame number. For LTE R8+, DCIs may be sent with AL1, AL2, AL4 or AL8 in the UESS. For a sub-frame for which the UE or WTRU monitors the PDCCH, the UE or WTRU may attempt to decode 2 DCI formats in up to 6 different CCES for AL1 (e.g., 12 blind decoding), up to 6 different sets of 2 CCEs for AL2 (e.g., 12 blind decoding), up to 2 different sets of 8 CCEs for AL8 (e.g., 4 blind decoding) and up to 2 different sets of 8 CCEs for AL8 (e.g., 4 blind decoding) for a total of at most 32 blind decoding attempts in the UESS.

Which DCI formats the UE or WTRU decodes may depend on the configured transmission mode (e.g. whether or not spatial multiplexing may be used). There may be a number of different DCI formats, e.g., format 0 (UL grant), formats 1 (non-MIMO), formats 2 (DL MIMO) and formats 3 (power control). Exemplary detailed format of the control messages may be defined in TS 36.212, section 5.3.3.1. The version of one or more, or each, DCI format(s) the UE or WTRU decodes may be governed at least in part by the configured transmission mode (e.g. modes 1-7 for Release 8 and Release 9).

A summary list with exemplary usage is presented below:
DCI format 0 (UL grant)
DCI format 1 (DL assignment)
DCI format 1A (compact DL assignment/PDCCH order for random access)
DCI format 1B (DL assignment with precoding info)
DCI format 1C (very compact DL assignment)
DCI format 1D (compact DL assignment with precoding info+power offset info)
DCI format 2 (DL assignment for spatial multiplexing)
DCI format 2A
DCI format 3 (TPC for PUCCH/PDSCH, two bits)
DCI format 3A (TPC for PUCCH/PDSCH, single bit)

A table illustrating examples of the different DCI sizes resulting from different system bandwidth configurations is provided in FIG. 2.

In LTE R8+ systems, whether the control signaling received on PDCCH pertains to the uplink component carrier or to the downlink component carrier may be related to the format of the DCI decoded by the UE or WTRU and the DCI formats may be used to control the UEs communication on the uplink component carrier and on the downlink component carrier of the cell on which the UE or WTRU is connected to. A UE or WTRU can request radio resources for an uplink transmission by sending a scheduling request (hereafter SR) to the eNB; the SR may be transmitted either on dedicated resources (hereafter D-SR) on the PUCCH if configured, or using the Random Access procedure (hereafter RACH) otherwise (hereafter RA-SR).

The following terminology may be used herein. In some embodiments, a "point" may refer to a set of geographically co-located transmit antennas. In one or more embodiments described herein, this definition may be slightly generalized, so that a "point" may also refer to a set of geographically co-located antennas, whether or not they transmit or receive.

An "intended reception point" or "destination point" of a first UE or WTRU transmission may refer to a point at the network side, or in some embodiments a second UE or WTRU, which may expect to receive and process this first UE or WTRU transmission. In one or more embodiments, the destination point may be identified by the first UE or WTRU by characteristics of a signal (such as a cell-specific reference signal, CSI-RS, or, in case the destination point corresponds to a second WTRU, a WTRU-specific reference such as DM-RS, SRS, PRACH preamble or other type of signal) transmitted by this destination point. Embodiments contemplate the use and meanings of, without limitation of applicability thereof, the following terms:

Component Carrier (CC), DL CC and UL CC;
Primary Cell (PCell), PCell DL, PCell UL and Secondary Cell (SCell), SCell DL, SCell UL;
Cell, serving cell, primary serving cell and secondary serving cell;

When referred to hereafter, the term "Component Carrier (CC)" may include, without loss of generality, a frequency on which the UE or WTRU operates. For example, a UE or WTRU may receive transmissions on a downlink CC (hereafter "DL CC"); a DL CC may comprise of a plurality of DL physical channels. As another example, a UE or WTRU may perform transmissions on an uplink CC (hereafter "UL CC"); a UL CC may comprise of a plurality of UL physical channels, as described above.

A cell may minimally consists in a DL CC which may be linked to a UL CC based on the system information (SI) received by the UE or WTRU either broadcasted on the DL CC or possibly using dedicated configuration signaling from the network. For example, when broadcasted on the DL CC, the UE or WTRU may receive the uplink frequency and bandwidth of the linked UL CC as part of the system information element (e.g. when in RRC_IDLE for LTE, or when in idle/CELL_FACH for WCDMA, e.g., when the UE or WTRU does not yet have a radio resource connection to the network).

When referred to hereafter, the term "Primary Cell (PCell)" includes, without loss of generality, the cell operating on the primary frequency in which the UE or WTRU performs the initial access to the system, e.g., the cell in which it either performs the initial connection establishment procedure or initiates the connection re-establishment procedure, or the cell indicated as the primary cell in the handover procedure, or the like. It may also correspond to a frequency indicated as part of the radio resource connection configuration procedure. Some functions may be (or in some embodiments may only be) supported on the PCell. For example, the UL CC of the PCell may correspond to the CC whose physical uplink control channel resources may be configured to carry one or more, or all, HARQ ACK/NACK feedback for a given UE or WTRU.

For example, in LTE the UE or WTRU may use the PCell to derive the parameters for the security functions and for upper layer system information such as NAS mobility information. Other functions that may be supported (or in some embodiments may only be supported) on the PCell DL include system information (SI) acquisition and change monitoring procedures on the broadcast channel (BCCH), and paging.

When referred to hereafter, the term "Secondary Cell (SCell)" includes, without loss of generality, the cell operating on a secondary frequency which may be configured once a radio resource control connection may be established and which may be used to provide additional radio resources. System information relevant for operation in the concerned SCell may be provided using dedicated signaling when the SCell may be added to the UE or WTRU's configuration. Although the parameters may have different values than those broadcasted on the downlink of the concerned SCell using the system information (SI) signaling, this information may be herein referred to as SI of the concerned SCell independently of the method used by the UE or WTRU to acquire this information.

When referred to hereafter, the terms "PCell DL" and "PCell UL" corresponds to, without loss of generality, the DL CC and the UL CC of the PCell, respectively. Similarly, the terms "SCell DL" and "SCell UL" corresponds to the DL CC and the UL CC (if configured) of a SCell, respectively.

When referred to hereafter, the term "serving cell" includes, without loss of generality, a primary cell (e.g., a PCell) or a secondary cell (e.g., a SCell). More specifically, for a UE or WTRU that may not be configured with any SCell or that does not support operation on multiple component carriers (e.g., carrier aggregation), there may be (or in some embodiments perhaps there may only be) one serving cell comprising of the PCell; for a UE or WTRU that is configured with at least one SCell, the term "serving cells" may include the set of one or more cells comprising of the PCell and one or more, or all, configured SCell(s).

In one or more embodiments, when a UE or WTRU may be configured with at least one SCell, there may be at least one PCell DL and at least one PCell UL and, for one or more, or each, configured SCell, there may be at least one SCell DL and, in one or more embodiments, perhaps one SCell UL (e.g., if configured).

One or more embodiments contemplate one or more techniques that may allow the UE or WTRU to select the destination point or a set of destination points of a transmission on a dynamic basis. These techniques may allow the adjustment of certain characteristics of an uplink transmission that may facilitate reception and decoding at this at least one destination point. For instance, the characteristics may include transmission power, transmission timing, and/or a property of a reference signal used for demodulation purpose or for sounding purpose such as its base sequence, its cyclic shift or an orthogonal cover code. Such techniques may support capacity optimizations from the network perspective, as well as fallback mechanisms for robust operation from the UE or WTRU perspective.

Other methods address problems related to destination point selection and other functionalities that arise when multiple potential destination points may be possible for a UE or WTRU transmission. For instance, it may be useful to be determined how HARQ retransmissions may be handled. In addition, the current power headroom reporting mechanism may not allow the network to make optimal uplink scheduling decisions when multiple potential reception points exist. Another problem stems from the possibility that the UE or WTRU loses connectivity with at least one destination point, which could result in excessive interference if the UE or WTRU attempts transmissions to this destination point.

Other methods address issues that arise when operating in a deployment with multiple potential destination points. For example, the scheduling restriction of allocating the same BW assignment between two co-scheduled UE or WTRU's to achieve orthogonality may become more severe.

Figure 3:
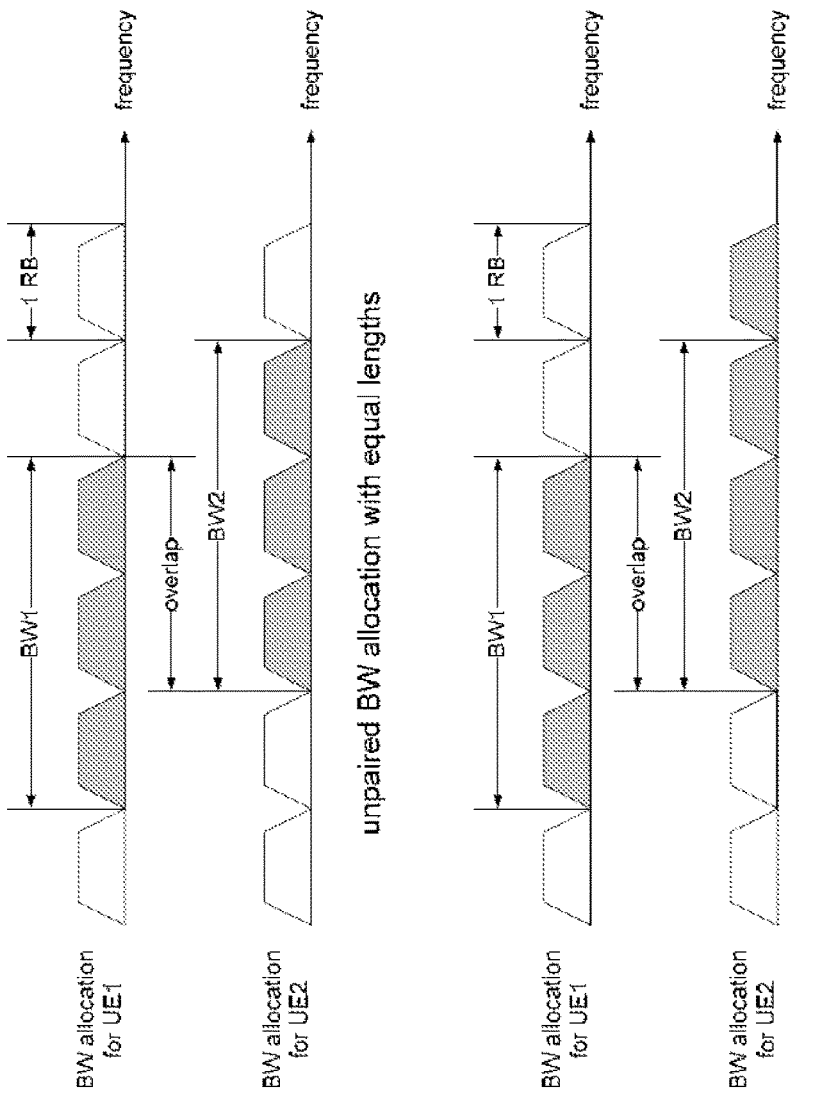
FIG. 3 shows an example of unpaired bandwidth allocation consistent with embodiments.

In particular, when multiple UEs may be co-scheduled for uplink transmission within a cell in the same subframe, it may be useful to have mutual orthogonality, (or significantly reduced cross correlation), among the reference signals used for one or more, or each, UE or WTRU in order to minimize the cross interference. In current 3GPP standard Releases, this may be achievable by allocating the same base sequence group and different cyclic shift (CS) setting, if identical bandwidth (BW) resources may be shared to one or more, or all, co-scheduled UEs. To improve network scheduling efficiency, particularly for inter-cell MU-MIMO operation occurring in the multipoint uplink reception, the network may be required to schedule UEs with unpaired BWs which may be partially overlapped. FIG. 3 shows two example scenarios of the unpaired BW allocation for two UEs.

Figure 4:
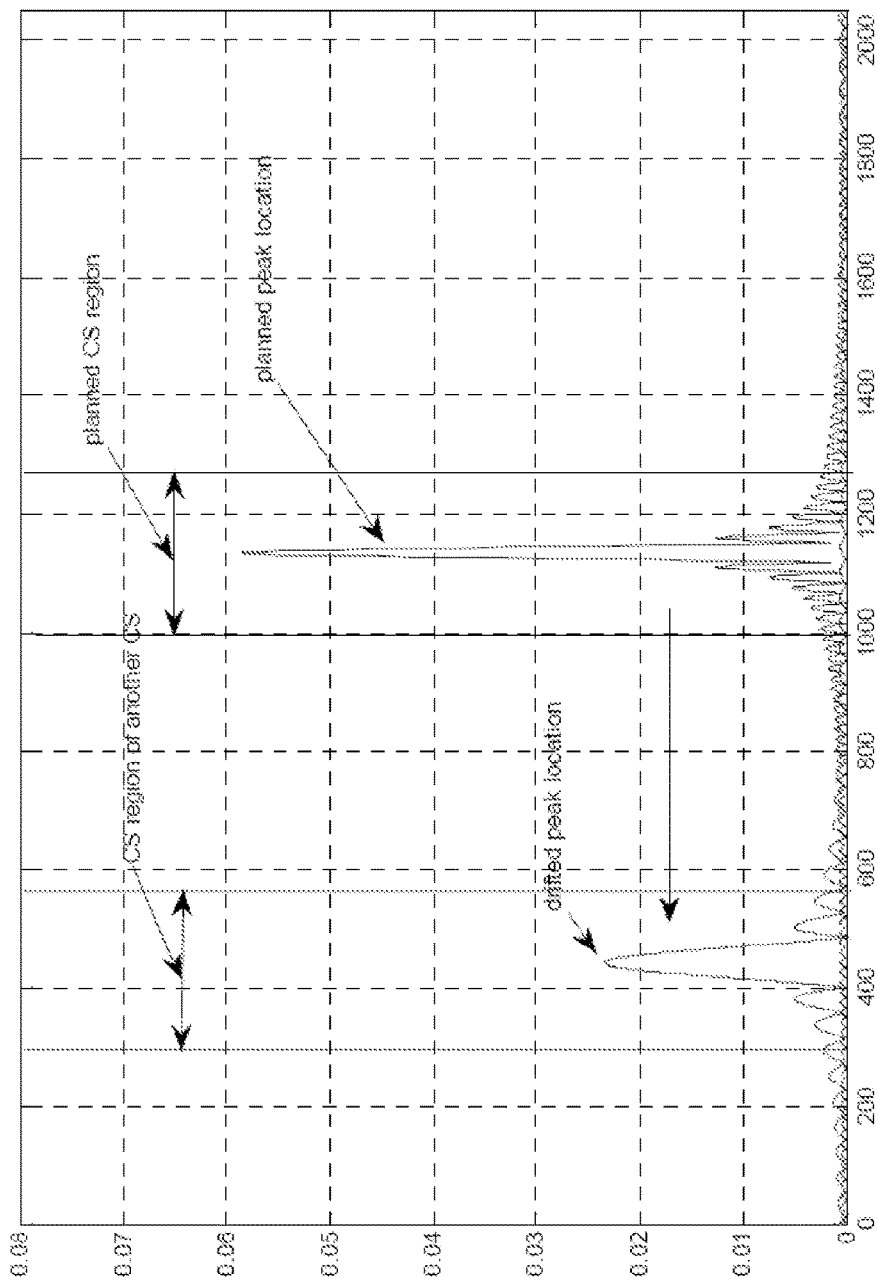
FIG. 4 shows an example of correlation peak drift consistent with embodiments.

As result of the unpaired BW allocation, the original orthogonality achieved by different CS settings may be lost as large peak cross-correlation is sometimes observed among the reference signals used for one or more, or each, UE or WTRU. The problem stems from the fact that the correlation peak drifts to a different location in time domain because of change of RB allocation. This drifted peak may penetrate other CS regions assigned to RS of another UE or WTRU, creating significant interference to it. This is illustrated in an example shown by FIG. 4, where equal BW lengths of 12 RBs may be used and the overlap portion is 6 RBs. As seen from FIG. 4, the amount of drift may be fairly large, (sometimes wrapped around). In addition, the correlation peak becomes wider because of the window effect proportional to the width of the overlap portion, which may further degrade the correlation performance, particularly when the overlap portion of two RSs may be very small.

Methods are also provided to address issues arising in deployments with multiple potential destination points where cyclic shift hopping (CS hopping) may be in use in some of these destination points. Thus, it may become more difficult to assign a CS for the transmission of a UE or WTRU that does not result in excessive interference towards these points.

Cyclic hopping may be applied to the demodulation reference signal (DMRS) in order to randomize its interference to other UEs. In current 3GPP standard, for one or more, or each, UE or WTRU, a cyclic shift $\alpha_\lambda$ for a layer indexed by $\lambda$ is defined according to:

$$\alpha_\lambda = \frac{2\pi n_{cs,\lambda}}{12}, n_{cs,\lambda} = (n_{DMRS}^{(1)} + n_{DMRS,\lambda}^{(2)} + n_{pn}(n_s)) \bmod 12$$

$$\text{where } n_{DMRS}^{(1)}, n_{DMRS,\lambda}^{(2)}$$

may be respectively the UE or WTRU-specific and layer-specific parameters and $n_{PN}(n_s)$ is the cell-specific CS hopping pattern defined by:

$$n_{PN}(n_s) = \sum_{i=0}^{7} c(8N_{symb}^{UL} n_s + i) 2^i$$

which is initiated by:

$$c_{init} = \left\lfloor \frac{N_{ID}^{cell}}{30} \right\rfloor + f_{ss}^{PUSCH}.$$

In some embodiments, the sequence-shift pattern $f_{ss}^{PUSCH}$ may share the same value with that used in defining the base sequence group, for example.

For inter-cell multi-user multiple-input multiple-output (MU-MIMO) operation, in order to enhance orthogonality of reference signals across multiple cells or points, it may be beneficial to allow dynamic assignment of base sequences to the co-scheduled UEs. Thus $f_{ss}^{PUSCH}$ may not be appropriate for defining CS hopping because it may be now varying time or may no longer be cell specific, for example.

The methods described herein may be taken alone or in combination, explain how a UE or WTRU can transmit different types of uplink channels or signals in a system deployment where multiple destination points may exist.

Upon performing a transmission of a given channel or signal in a subframe, the UE or WTRU may determine transmission characteristics that may be dependent on an Uplink Transmission Context (hereafter UTC) selected out of a set of at least one UTC. Described herein are various embodiments of methods of selecting a UTC.

In various embodiments, the UE or WTRU may use the selected UTC to perform a transmission for a given channel or signal such that it may determine at least one of the following transmission characteristics: An uplink frequency and/or a bandwidth for the said transmission; A transmission power to apply to the said transmission; A timing advance (or timing alignment) to apply to the said transmission; At least one property that may be specific to the transmitted channel or signal, such as: (i) A property of at least one demodulation reference signal (e.g. cyclic shift, sequence group, antenna port), e.g. for PUSCH or SRS (periodic or aperiodic); (ii) A transmission format and/or resource, e.g. in case of a PUCCH transmission; and (iii) A property of at least one random access preamble, e.g. in case of a PRACH transmission.

A UTC may be defined such that it represents information that enables the UE or WTRU to perform uplink transmissions according to the selected UTC. The UTC may conceptually be divided in terms of at least one of the following types of information associated to the concerned UTC:

UTC parameters: a set of one or more parameters including, but not limited to, parameters of a UE or WTRU's configuration such as semi-static parameters configured by RRC (e.g. a maximum transmission power which may be used to determine a transmission power for a transmission for the concerned UTC), or the like;

UTC properties: a set or one or more properties including, but not limited to, properties derived from a UE or WTRU's configuration (e.g. a DL path loss and/or timing reference derived from a grouping function), from a procedure performed by the UE or WTRU (e.g. a DL path loss estimate derived from a DL PL reference which may be used to determine a transmission power for a transmission for the concerned UTC) or the like; and/or UTC variables: a set of one or more variables including, but not limited to, state variables (e.g. whether or not a UTC may be in an activated state), timers (e.g. a timer related to the validity of a timing advance value) or the like.

In other words, an Uplink Transmission Context may be conceptually represented as to include at least one of a set of semi-static parameters, values determined by the UE or WTRU in relation to a given transmission and in one or more embodiments may be based on a configuration of a parameter, and/or variables that may be maintained and updated by the UE or WTRU in relation to the concerned UTC.

The representation described herein does not limit the applicability of the methods described herein to different representation of an equivalent description of the UTC and its related methods.

An UTC may be associated to one or more types of uplink channels or uplink signals according to at least one of the following:

Uplink channel (or transmission signal)-specific: For example, a UTC (or parts thereof) may be applicable to a given uplink channel e.g. a UE or WTRU may be configured with one or more UTC for one or more, or each, of a PUSCH, a PUCCH, a PRACH or a SRS configuration;

Serving cell-specific: For example, a UTC (or parts thereof) may be applicable to a plurality of uplink transmissions for a given serving cell of the UE or WTRU's configuration, in which case the UTC may include aspects that may be common to one or more, or all, transmissions (e.g. a DL PL and/or timing reference) and/or aspects that may be specific to a given type of transmission (e.g. a transmission power offset to apply e.g. for SRS transmissions);

Group of cell-specific: For example, a UTC (or parts thereof) may be applicable to transmission(s) for one or more serving cells of a UE or WTRU's configuration, in which case the UTC may include aspects that may be common to one or more, or all, transmissions for the group of serving cells (e.g. a DL PL and/or timing reference); and/or A combination of the above: For example, a UTC (or parts thereof) may be applicable according to one or more of the following: The UTC may be applicable to a given serving cell, e.g. it may be configured for a SCell; The UTC may be applicable to a given uplink channel, e.g. it may be applicable to transmissions on PUSCH; For example, one or more, or each, UTC may include different PtRS and maximum power; The UE or WTRU may be configured with a plurality of UTC for the PUSCH of the concerned cell; The UE or WTRU may use selection methods such as those described herein to determine what UTC may be applicable for a given transmission.

As another example, a UTC (or parts thereof) may be applicable according to the following: The UTC may be applicable to a plurality of serving cells configured with uplink resources, e.g. it may be configured for one or more, or all, SCells of the same TA group; The UTC may be applicable to one or more, or all, uplink transmissions, e.g. it may be applicable to transmissions on PUSCH, PRACH and SRS; For example, one or more, or each, UTC may include different PtRS, DL PL reference and DL timing reference; The UE or WTRU may be configured with a plurality of UTC for the concerned cells; The UE or WTRU may use selection methods such as those described herein to determine what UTC may be applicable for the transmissions on uplink resources of a concerned cell.

As another example, a UTC (or parts thereof) may be applicable according to the following: The UTC may be applicable to a plurality of channels (e.g. PUSCH/PUCCH/PRACH) for one serving cell; The UE or WTRU may be configured with a plurality of UTC for the group of channels; The UE or WTRU may use selection methods such as those described herein to determine what UTC to use for one or more, or all, the channels within the group; The UE or WTRU may be further configured with another UTC that may be applicable to another type of channel or transmission type (e.g. SRS); The UE or WTRU may be configured with a plurality of UTC for the transmission type SRS; The UE or WTRU may use selection methods such as those described herein to determine which UTC to use for SRS transmission (e.g. the type of SRS may be used to determine which UTC to use).

UTC Parameters: The parameters that may be associated to an UTC may include at least one of the following configuration parameters. Some of these parameters may be defined to be common to more than one UTC, or to one or more, or all, UTC's. These may include L1/Physical layer parameters, L2/MAC parameters, and/or L3/RRC parameters.

L1/Physical layer parameters may be at least one of: at least one downlink Point Reference Signal (hereafter PtRS), where a PtRS may represent an intended reception point of a given transmission and in case of more than one intended reception point, more than one PtRS may be included; a Physical Cell Identity, where, the UE or WTRU may, for example, use at least one cell identity in the generation of certain uplink signals or channels (e.g. PUCCH, DM-RS, SRS) and this identity may or may not correspond to the identity of a serving cell which the UTC may be applicable to; other parameters used in the generation of certain uplink signals may include use parameters corresponding to that contained in the PUSCH-Config information element of existing systems, such as cyclicShift, groupAssignment- PUSCH (ΔSS), Activate-DMRS-with OCC, Sequence-hopping-enabled, groupHoppingEnabled, pusch-HoppingOffset, n-SB, hopping Mode for the generation of DM-RS in PUCCH, DM-RS in PUSCH and/or PUSCH, which may have the same interpretation as in existing systems. The UE or WTRU may also use new (e.g., contemplated by embodiments) parameters to generate such signals, as described herein. In another example, the UE or WTRU may use parameters corresponding to that contained in the PUCCH-Config information element of existing systems, such as n1PUCCH-AN($N_{PUCCH}^{(1)}$), n1PUCCH-AN-CS-List, nCS-An, and the like; power control parameters that the UE or WTRU may, for example, use in combination with PtRS measurements to determine the transmission power to apply to a given transmission. For example, such parameters may include a maximum transmission power (Pmax) applicable to a transmission using the concerned UTC, and/or a reference transmission power for one or more, or each, TpRS, indicating the transmission power of this TpRS for path loss estimation purposes; Scheduling-related parameters that the UE or WTRU may, for example, determine at least one aspect of the decoding of DCI format on a PDCCH corresponding to the concerned UTC, which DCI format may possibly contain downlink information that triggers the uplink transmission and/or may possibly contain TPC commands applicable to at least one aspect of the concerned UTC. For example, the UE or WTRU may determine at least one search space of the concerned PDCCH. In one or more embodiments may, different search space may correspond to different UTC. The UE or WTRU may determine at least one set of DCI formats of the concerned PDCCH. In one or more embodiments, different DCI formats and/or contents may correspond to different UTCs. Alternatively, depending on an UTC activation state for a given serving cell, DCI decoding may use different DCI formats corresponding to the active (or selected) UTC. The UE or WTRU may determine at least one RNTI of the concerned PDCCH. In one or more embodiments may, different RNTI may correspond to different UTCs.

The L2/MAC parameters, for example, may include at least one of: timing parameters, which the UE or WTRU may, for example, determine the DL Timing reference for a given transmission based on the selected UTC; and scheduling-related parameters, which the UE or WTRU may, for example, determine the RNTI to monitor for the PDCCH corresponding to a given UTC based on the activation state of the concerned UTC.

The L3/RRC parameters, e.g. at least one of: an identity of the UTC, which the UE or WTRU may, for example, use as an identity of an UTC, e.g. for the purpose of adding, modifying and/or removing an UTC; or one or more selection criterion or parameters of the UTC, which the UE or WTRU may, for example, use as a configuration for RLM operation as a way to determine whether or not a UTC may be selected for an uplink transmission.

For one or more, or each, of the above, the UTC may include a distinct set of parameters that may be specific to one or more, or each, type of uplink transmission (e.g. one set for PRACH, PUSCH, aperiodic SRS, periodic SRS, PUCCH).

Embodiments contemplate UTC properties. The properties that may be associated to an UTC may include at least one of the following: For example, for at least one channel or signal, whether transmission of this channel or signal may be allowed or not for this UTC. For instance, transmission of PUCCH may or may not be possible for the UTC. For at least two channel(s) or signal(s), whether simultaneous transmission of these channel(s) or signal(s) may be allowed or not in the same subframe (such as PUCCH with PUSCH, PUCCH with SRS, etc.). For example, for at least one channel or signal, a DL path loss reference and/or a DL timing reference and/or a TA group may be associated to a given UTC.

Embodiments contemplate UTC variables. In addition to the above, the following state variables associated to an Uplink Transmission Context may be utilized in the determination of transmission characteristics: A power control adjustment state for the UTC to be used in the determination of transmission power in case this UTC may be selected (e.g. a TPC accumulation); A transmission timing adjustment state (e.g. a TA adjustment or TA accumulator) for the UTC, possibly with respect to a reference signal such as its PtRS. The UE or WTRU may, for example, determine the TA offset to apply to a given transmission based on the selected UTC; A timing advance timer for the UTC (e.g. a TAT); An activation state of the Transmission Context, to be used for the purpose of selecting an UTC; and/or A connectivity state of the UTC, to be used for the purpose of determining whether selection of this UTC may be possible, among other contemplated purposes.

At least one of the above configuration parameters and state variables may be shared within a Group of at least one UTC. For instance, a group of UTCs may be defined for one or more, or all, UTCs sharing the same PtRS. In this case, such group of UTC's may also share the same transmission timing adjustment state, timing advance timer, and connectivity state.

An UTC may be seen as corresponding to at least one "intended reception point" or "destination point" for the UE or WTRU transmission, under the assumption that the PtRS is transmitted from a "transmission point" corresponding to one of the destination points. At least one such point at the network may be expected to receive and process this UE or WTRU transmission. Thus, a PtRS of an UTC may also correspond to a downlink reference signal associated to a transmission point. Such transmission point may itself be associated with its own configuration defining characteristics of downlink transmissions that may be received by the UE or WTRU (or "Downlink Transmission Context"). It may be possible to link a unique UTC to a given Downlink Transmission Context. If such linkage may be defined, some characteristics of the UTC (such as those used for the determination of search spaces for PDCCH, or the identity of a PtRS) may be defined as part of the corresponding Downlink Transmission Context. The set of configured UTCs for a UE or WTRU may or may not be associated with the same cell identity.

Downlink Point Reference Signal (PtRS): A Point Reference Signal (PtRS) may be defined as a downlink Reference Signal that may be measured by the UE or WTRU on a given downlink carrier. The UE or WTRU may use the PtRS for the purpose of performing at least one of the following: Path loss estimation, e.g. the UE or WTRU may use the PtRS as the DL PL reference; Power control; Timing alignment, e.g. the UE or WTRU may use the PtRS as the DL timing reference; Measurements, e.g. received power or quality; Radio link monitoring and determination of connectivity state; UTC selection or restriction.

A PtRS configured for an UTC may include a reference signal such as one already defined in existing systems, including a common reference signal (CRS) or a CSI-RS reference signal. Alternatively, the PtRS may include any other reference signal, such as one that may be optimized for the purpose of path loss estimation for an UTC. As example of such optimized signal, this reference signal may be transmitted in a subset of the physical resource blocks, for instance in 1 out of N physical resource blocks with an offset that may be depending on an antenna port index. In the time domain, the reference signal may be transmitted more frequently, such as in every time slot or every subframe. Such configuration sparse in frequency domain but dense in time domain may be beneficial for the purpose of path loss estimation where frequency resolution may not be critical but tracking time fast variations may be useful. In one or more embodiments, a PtRS may be transmitted on at least one antenna port, each of which may be identified with an antenna port index.

Embodiments contemplate one or more techniques to realize the configuration of a UTC in the UE or WTRU. Radio Resource Configuration aspects: The UE or WTRU may be configured, e.g. using a procedure similar to the state-of-the-art RRC connection reconfiguration procedure and/or a RRCConnectionReconfiguration message (with or without the mobilityControlInfo information element) to operate on a primary serving cell (e.g. a PCell) and zero or more additional serving cells (e.g. SCells) for operation according to the principles of carrier aggregation.

In addition, for a given serving cell, the UE or WTRU may additionally be configured with one or a plurality of UTCs. In one or more embodiments, this may be performed (or in some embodiments may only be performed) for a serving cell with configured uplink resources. For example, a UE or WTRU may be configured with a plurality of UTC for a serving cell, where the selected UTC may be applicable to any uplink transmission on radio resources of the concerned cell.

In one or more embodiments may, a UTC configuration may be applicable to a specific type of uplink channel, e.g. PUCCH, PUSCH, PRACH and/or to a specific type of uplink transmissions e.g. SRS for a given serving cell. For example, a UE or WTRU may be configured with a plurality of UTC for the PUCCH channel of a PCell, while a single UTC may be configured for PRACH and PUSCH for the concerned serving cell. In other words, different type of uplink transmission may be configured with different UTC, or none (which resulting configuration may represent a default UTC), for a given serving cell.

In one or more embodiments may, a UTC configuration may be applicable to a specific type of uplink transmission and/or uplink channel, e.g. PUCCH, PUSCH, PRACH or SRS across a plurality of serving cells. For example, the UE or WTRU may be configured with a plurality of UTC applicable to the PUSCH transmission of one or more, or all, serving cells of the UE or WTRU's configuration. Alternatively, the UTC may be applicable to a subset of serving cells, for example a plurality of UTC applicable to the PUSCH transmission of one or more, or all, SCells of the UE or WTRU's configuration.

In one or more embodiments may, a subset to which a UTC may be applicable may be based on grouping. For example, a UE or WTRU may be configured with a UTC for PUSCH channel of a plurality of serving cells within a group of cells, e.g. for one or more, or all, SCells that may be configured as part of the same Timing Advance Group (TA Group), or based on an explicit grouping configuration received by RRC signaling.

A UTC group may have at least one of the following characteristics in common: DL timing reference, and/or Timing Advance, and/or TA timer; DL path loss reference and/or path loss estimate; DL reference for radio link monitoring; for example, when the RLM function of a DL reference corresponding to a group of UTC may determine that the reference may be no longer suitable, the UE or WTRU may perform a number of actions that may be applicable to one or more (or all) UTC of the same group. For example, the UE or WTRU may deactivate the corresponding UTC; Power control parameters, e.g. the nominal desired transmit power Po, and/or the maximum power Pcmax, and/or TPC accumulation; RNTI to identify control signaling applicable a UTC of the concerned group; and/or an identity of the group.

The UE or WTRU may receive RRC signaling that includes a PhysicalConfigDedicated information element that configures the radio resources of the UE or WTRU for the PCell. In addition, the UE or WTRU may receive RRC signaling that includes a PhysicalConfigDedicatedSCell information element that configures the radio resources of the UE or WTRU for one or more SCells. Such information element may include configuration information related to uplink channels and transmissions, e.g. pucch-ConfigDedicated, pusch-ConfigDedicated, uplinkPowerControlDedicated, tpc-PDCCH-ConfigPUCCH, tpc-PDCCH-Config-PUSCH, cqi-ReportConfig, soundingRS-UL-ConfigDedicated, antennaInfo, schedulingRequestConfig, cqi-ReportConfig, csi-RS-Config, soundingRS-UL-ConfigDedicatedAperiodic, ul-AntennaInfo and the likes.

The UE or WTRU may receive a UTC configuration in a PhysicalConfigDedicated information element and/or in a PhysicalConfigDedicatedSCell information element.

Figure 5:
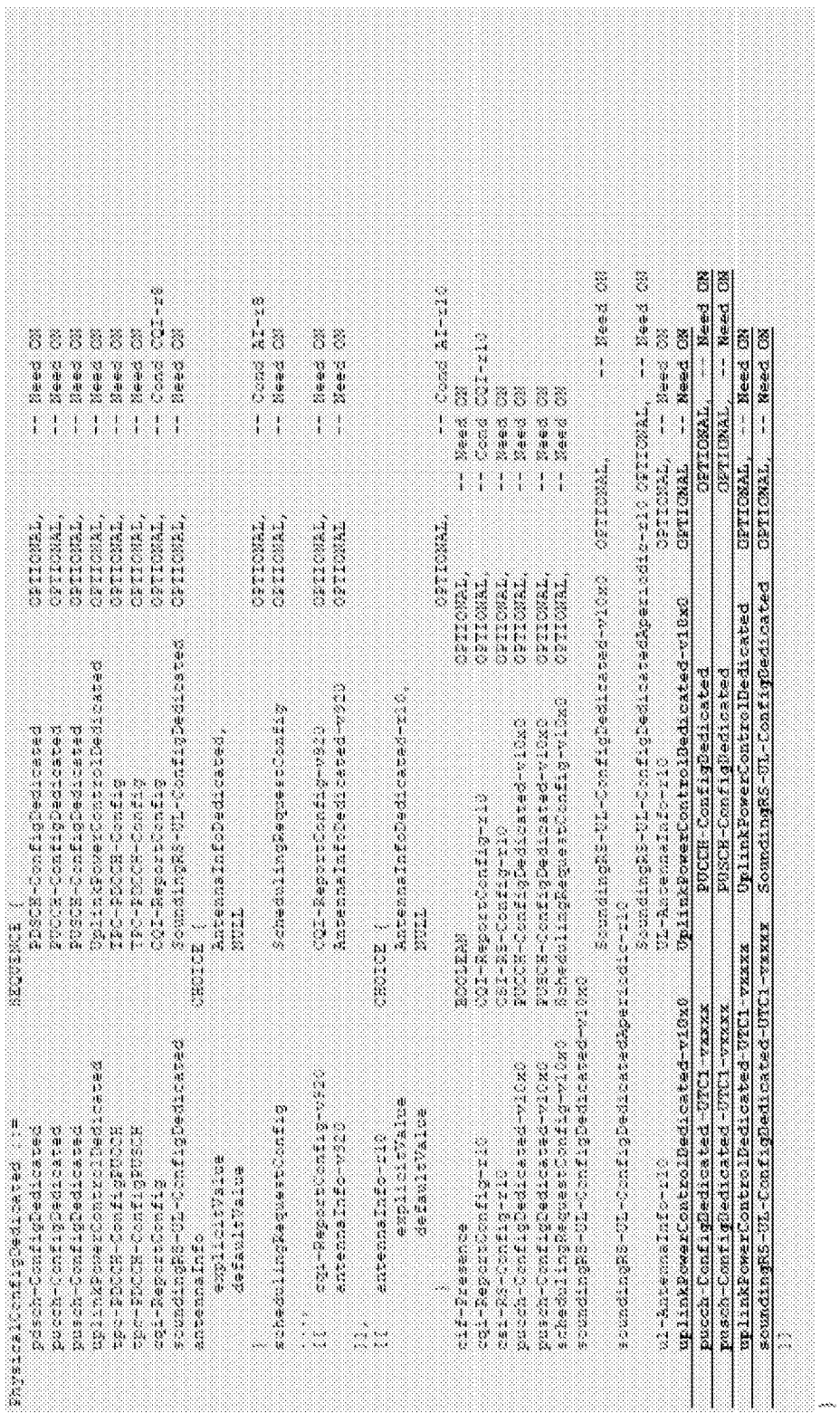

In one embodiment, a given channel may be configured with a plurality of UTC by including multiple parameters for the concerned channel inside the physical channel configuration applicable to a given serving cell. In one or more embodiments may, the state-of-the-art configuration may implicitly be the default UTC configuration, while additional UTC for a given channel may be indexed according to their relative position inside a list of additional UTC. FIG. 5 depicts an example for a Pcell.

In another embodiment, a given UTC may be configured and may include a plurality of channels UTC for a given serving cell. In one embodiment, the state-of-the-art configuration may implicitly be the default UTC configuration, while additional UTC for a given serving cell may be indexed according to their relative position inside a list of additional UTC. FIG. 6 depicts an example for a Pcell.

In another embodiment, the UE or WTRU may be configured with a plurality of "sub-cell" configuration for a given serving cell, by using multiple information elements. In one or more embodiments may, an information element may be associated to a given serving cell by using the same cell identity e.g. there may be multiple configuration with the same servCellID. In one or more embodiments may, the order of the information elements for the serving cell configuration (e.g. associated with a given servCellID) may be used to derive an identity of the UTC for the given serving cell. For example, for PCell (which implicitly has id "0") the configuration may include a plurality of PhysicalConfigDedicated (and/or also "Common") information elements, one for one or more, or each, UTC applicable to the PCell. For example, similarly, for a SCell identified with an explicit servCellID the configuration may include a plurality of PhysicalConfigDedicatedSCell (and/or also "Common") information elements, one for one or more, or each, UTC applicable to the concerned SCell.

In another embodiment, an information element may be defined for UTCs, which IE may include configuration parameters for a single channel or type of uplink transmissions, or a plurality thereof.

In another embodiment, the UTC configuration may be provided as part of the power control configuration. For one or more, or each, UTC a new (e.g., contemplated by embodiments) power control dedicated IE may be added that includes the parameters required for one or more, or all, channels and transmission types. One example is shown below, in which the pathlossReferencePointLinking-rxx correspond to the downlink point reference signal for a given UTC. The reference signal information as described above may have been provided as part of a downlink configuration for a transmission point (e.g. for example UTC1 corresponds to transmission point 1 and UTC 2 to transmission point 2) or they may have been explicitly provided for one or more, or each, UTC.

Figure 7:
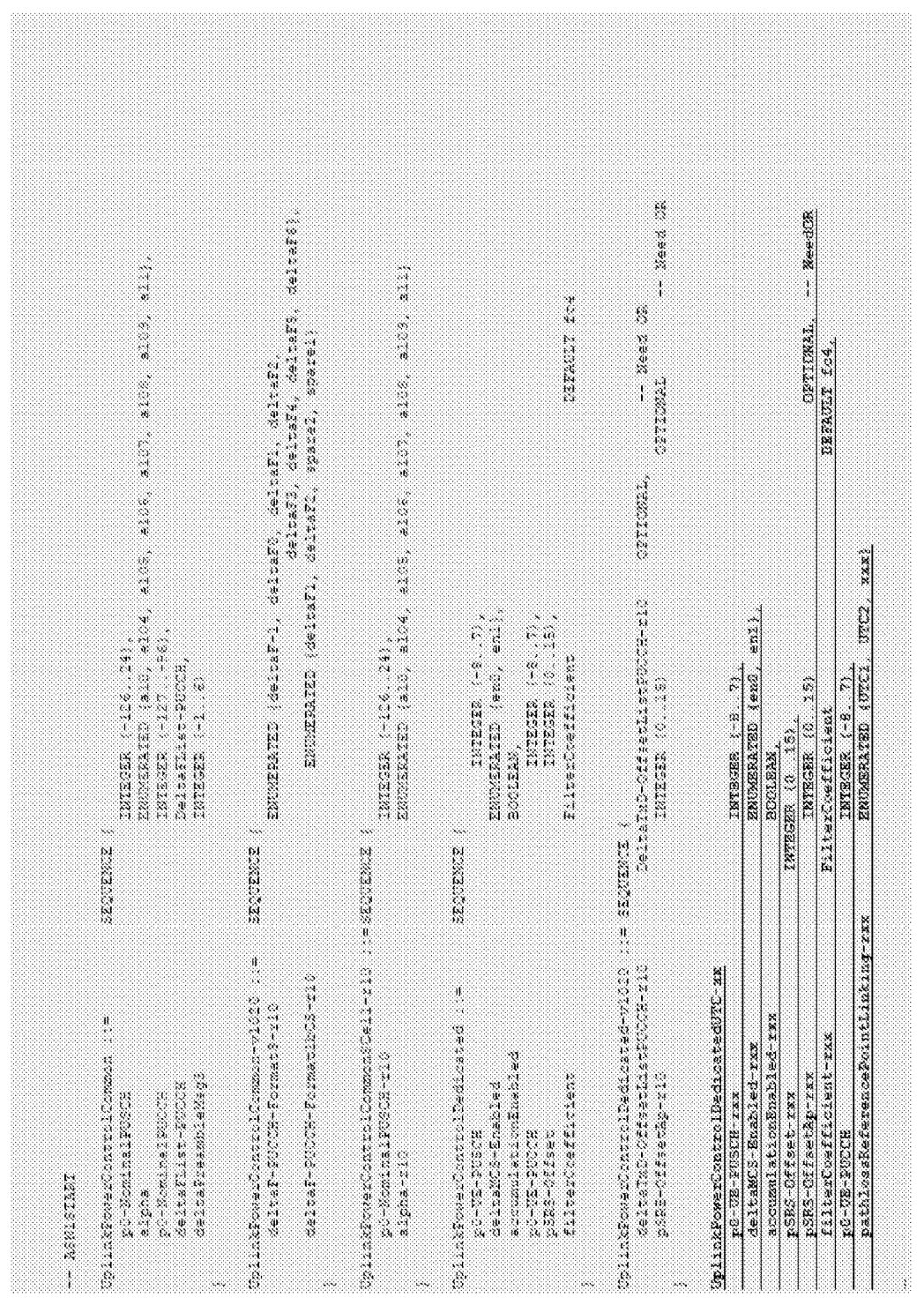

FIG. 7 depicts exemplary UplinkPowerControl information elements.

The UTC configuration for a given channel or transmission type may be further realized using one or a combination of the methods described below with respect to Physical layer aspects.

For a given serving cell (e.g. Pcell or Scell) the principle of a UTC for a given channel and/or transmission type may be implemented using one or a combination of the methods described below.

An additional column for one or more, or each, TM may be added to Table 8-3 of 36.213 (copied below). Embodiments contemplate multiple UTCs per Transmission Mode (TM). The UE or WTRU may be configured with a single TM per configured serving cell (e.g. TM 1 or TM 2 for PUSCH). Additionally, the UE or WTRU may be configured for one or more, or each, TM with a plurality of UTC, where one or more UTC(s) may be configured for one or for a subset of channels or transmission types, using for example one or a combination of the methods described below.

TABLE 8-3

| PDCCH and PUSCH configured by C-RNTI | | | |
|---|---|---|---|
| Transmission mode | DCI format | Search Space | Transmission scheme of PUSCH corresponding to PDCCH |
| Mode 1 | DCI format 0 | Common and UE or WTRU specific by C-RNTI | Single-antenna port, port 10 (see subclause 8.0.1) |
| Mode 2 | DCI format 0 | Common and UE or WTRU specific by C-RNTI | Single-antenna port, port 10 (see subclause 8.0.1) |
|  | DCI format 4 | UE or WTRU specific by C-RNTI | Closed-loop spatial multiplexing (see subclause 8.0.2) |

The above table may be expanded with multiple table 8-3s for a serving cell. Embodiments contemplate Multiple UTCs per serving cell. The UE or WTRU may be configured with a plurality of UTCs for a configured serving cell. In this case, a UTC may be conceptually viewed as a "sub-cell" within the configuration of a serving cell. In one or more embodiments may, each UTC may be configured with a single TM.

The above table may be expanded with additional rows for a serving cell. Embodiments contemplate Multiple TMs per serving cell. The UE or WTRU may be configured with additional transmission mode(s), which may be introduced in addition to LTE R10 TM1 and TM2 for uplink operation. For one or more, or each additional TM, a plurality of UTC may be configured. For example, such additional TM may be configured such that e.g. a DCI format (and/or format type) indicates the use of a specific UTC. More specifically, for one or more, or each, DCI format 0 and 4, a UTC may be configured (or a default UTC may be used) and possibly a new (e.g., contemplated by embodiments) DCI format may be introduced that may have one or a plurality of UTC configured. In some embodiments, the UTC to be used within the new (e.g., contemplated by embodiments) DCI format may be determined according to the embodiments described herein.

In particular, the above may be applicable to the configuration of UTC(s) for PUSCH channels.

In one or more embodiments, the principle of UTC may be implemented according to one or more of the following:

One or more UTCs per channel: The UE or WTRU may be configured with a plurality of UTC per channel (e.g. PUCCH, PRACH, or possibly also PUSCH) or per transmission type (e.g. SRS) as part of configuration parameters in the UL configuration. For example, the UE or WTRU may be configured with a UTC or a subset thereof as part of a PUCCH configuration. The UTC may include an activation state for the PUCCH, as well as a set of configured PUCCH resources indexed using an ARI; the ARI and/or the PUCCH activation state may be used to determine the PtRS and/or the applicable UTC for a PUCCH transmission. For example, the UE or WTRU may be configured with a UTC or a subset thereof as part of a SRS configuration, for periodic SRS and/or for aperiodic SRS. The UTC may include an activation state for the concerned SRS configuration. More specifically, the UE or WTRU may be configured with a separate UTC configuration for aperiodic SRS transmissions and periodic SRS transmissions. The type of SRS (e.g. SRS type 0 or SRS type 1) may thus be used to determine what UTC to apply to the SRS transmission (possibly including what PtRS to use as a reference) for a given serving cell. In addition, the UE or WTRU may be configured with a plurality of configuration for either type, possibly one or more, or each, with a different UTC. For example, the UE or WTRU may be configured with a UTC of a subset thereof as part of a PRACH configuration. More specifically, the UE or WTRU may be configured with separate UTC configuration for different type of dedicated preambles, random access trigger (e.g. by PDCCH or RA-SR) and/or PRACH resource indexes. In one or more embodiments may, the UE or WTRU may determine what UTC may be applicable for a preamble based on an indication in PDCCH DCI format 1a and/or in the RAR (e.g. the grant) for an uplink transmission for msg3. Alternatively, the UE or WTRU may determine the applicable UTC for the preamble based on the PtRS associated with the received PDCCH and/or RAR reception;

One or more UTCs may apply to a plurality of channels/signals: The UE or WTRU may use the UTC of the PUSCH channel (e.g. possibly based on the activation state of the UTC) for the transmission of a subset of the other channels (e.g. PUCCH) or transmission types (e.g. SRS); and/or A combination thereof: in one embodiment, a combination may be provided where the PUCCH may use the UTC configuration of the PUSCH and a separate UTC for SRS may be configured. In particular, the above may be applicable to the configuration of UTC(s) for PUCCH, PRACH and/or SRS transmissions.

The transmission power levels for different physical channels or transmission types may be dependent on a combination of at least one of the following variables: $P_{CMAX,c}$—the configured maximum UE or WTRU transmit power for UTC c; M—the bandwidth of the channel; $P_o$—the desired received power; $PL_c$—the uplink path loss applicable to UTC c; A partial path-loss compensation; A power control adjustment state; and/or a configurable offset.

Given that the UTC for a physical channel or transmission type may change dynamically, one or more, or each, UTC may have its own set of transmission power parameters. Furthermore one or more, or each, physical channel (e.g., PUSCH, PUCCH, and PRACH) or transmission type (e.g., SRS) may have its own set of transmission power parameters for one or more, or each, UTC. In one or more embodiments, these sets of parameters may overlap and reuse the same values for some or one or more, or all, parameters. To have different sets of parameters may require that one or more, or each, UTC has a distinct value for path loss. The UE or WTRU may therefore be configured with the transmission power level of one or more, or all, the possible transmission points or UTCs as well as specific reference signals for one or more, or each. The path loss may be therefore defined as $PL_c$=reference signal power of c–higher layered filtered RSRP of c, for UTC c.

The RSRP may be calculated from at least one of: PtRS or new (e.g., contemplated by embodiments) UTC-specific reference signal; CRS; and/or CSI-RS.

Embodiments contemplate that to determine which set of reference symbols to use to determine the path loss, among other reasons, the UE or WTRU may be informed via higher layer signaling the link between a UTC and the appropriate set of reference symbols. Upon selecting a UTC (as described herein), a UE or WTRU may then derive the path loss value.

In one embodiment, the UTC of a physical channel or transmission type may be configured with multiple PtRS's from which multiple path loss measurements may be derived. In this case, a method to select the path loss used may be one or more of the following: The lowest path loss value for any PtRS; The highest path loss value for any PtRS; The linear average of path loss values of the set of PtRS's; and/or any preconfigured path loss value of a specific PtRS; and/or a function of the path loss values of the set of PtRS's (e.g. addition of one or more, or all, individual path loss values). In one or more embodiments, PtRS selection can also be used to select a UTC for the purpose of UL transmission and path loss reference determination.

Furthermore, for the case where the UTC may be configured with multiple PtRS's, other parameters (for example, a desired receive power Po) may also be selected similarly (e.g., one of the maximum, minimum, average or preconfigured selection of desired receive power). The selection mechanism may be signaled via higher layer RRC signaling and does not have to be the same for one or more, or all, parameters.

The current power control adjustment state may be composed of either the sum of the previous power control adjustment state plus the most recent correction value (also referred to as TPC command), or just the most recent correction value (most recent TPC command). In order to enable proper power control adjustment state, the UE or WTRU may perform at least one of (or any combination thereof): Maintain a TPC command chain per UTC configured; Maintain a TPC command chain per PtRS (linking a TPC command chain to a path loss); Maintain a TPC command chain per physical channel or transmission type; A combination thereof; for example, one TPC command chain may be maintained for a set of physical channels (e.g. PUSCH/PUCCH) and a TPC command per UTC may be maintained for another channel or transmission type (e.g. SRS). Alternatively, in some embodiments if an SRS is being transmitted to the UTC that is being used for PUSCH/PUCCH the same TPC command as that of PUSCH may be used and an independent one may be maintained for SRS transmission to other points (e.g. UTC).

An example of when a UE or WTRU may find it useful to maintain multiple TPC command chains may be if a physical channel is configured to use different UTC depending on the transmission type. For example, a PUCCH used for HARQ may use a different UTC than a PUCCH used for scheduling requests, and may therefore one or more, or each, have its own TPC command chain.

A UE or WTRU may determine for which UTC a TPC command may be for by at least one of: a UTC indication attached to one or more, or all, TPC commands; the search space from which a DCI may be decoded from; the use of different RNTI (one per UTC) to scramble to CRC of a DCI; the subframe number when the TPC command may be received; and the downlink transmission point from which the TPC command may be transmitted.

For the case when a new (e.g., fresh or updated) UTC may be selected for an uplink transmission, the updated power control adjustment state may be at least one of the following: be reset to a preconfigured level (for example, 0 dBm). This level may be specific to an UTC, or may be specific to an uplink physical channel; be modified by a preconfigured offset, where the offset may be specific to the new UTC or the previous UTC or be specific to the uplink physical channel; remain unaffected with the understanding that future TPC command may properly refine the power control adjustment state, (e.g. any subsequent TPC command may be added to the previous accumulated TPC for the channel regardless of the UTC); be scaled such that the over-all transmission power remains unchanged, despite the new (e.g., fresh or updated) desired received power and path loss for the new (e.g., fresh or updated) UTC; be retrieved from the most recent time that UTC was used. In such scenarios, the UE or WTRU may (or in some embodiments, perhaps must) save one or more, or all, the most recent power control adjustment states for one or more, or all, the channels and for one or more, or all, the UTCs; and/or be reset to the last value used for uplink transmission to that UTC and/or to that PtRS and/or for that physical channel and/or for that transmission type.

In one or more embodiments, a UE or WTRU may be configured with multiple UTC and may autonomously select a UTC for a channel. In order to select the UTC for a current transmission on an uplink channel, the UE or WTRU may use at least one of: the UTC requiring the lowest transmit power. In such a case, the transmit power may be determined by using the appropriate set of power setting parameters for that UTC; the UTC may be selected according to any of the mechanisms described herein; the UTC may be selected by applying a selection mechanism on any of the parameters. The possible selection mechanisms include: maximum, minimum, a minimum (or maximum) threshold difference over the previously selected UTC's parameter. For example, the UE or WTRU may choose a UTC by selecting the one which minimizes the path loss. The power setting may then be determined by applying one or more, or all, parameters that apply to that UTC. As another example, a UE or WTRU may select a new (e.g., fresh or updated) UTC by ensuring that the difference in nominal power between the previous UTC and the new (e.g., fresh or updated) UTC be less than a predetermined threshold. The parameter list may be expanded to include MCS.

In another embodiment, a new (e.g., contemplated by embodiments) power level offset may be used for the case where the UTC may be configured with multiple PtRS's. This offset may be either positive to ensure that one or more, or all, intended reception points have a chance at properly decoding, or it may be negative, if the network determines that with more reception points cooperating to decode the data, less power may be required. The offset may be pre-configured via higher layers or may be jointly coded with other TPC commands in PDCCH with DCI format 3/3A whose CRC may be scrambled with a new (e.g., contemplated by embodiments) RNTI (e.g. such as TPC-COMP-RNTI).

Any power control parameter discussed herein, (such as PCMAX,c), may be tied to the subframe when such an UL transmission occurs. For example, there may be subsets of subframes which require different sets of power control parameters. In such scenarios, the UTC for one or more, or each, physical channel or transmission type may remain the same regardless of the subframe number. However, some power control parameters may be subframe number dependent. For example, in a subset of subframes, the UE or WTRU may use a set of offset values that may be UTC and/or physical channel and/or transmission type dependent, and in another subset of subframes, another set of offsets may be used. In one or more embodiments, the UTC used for one or more, or each, physical channel or transmission type may depend on the subframe number.

Embodiments contemplate one or more enhancements to SRS power control. The enhancements may be applied to one or more of: 1) one or more, or all, SRS transmission; or 2) aperiodic SRS (in some embodiments perhaps only aperiodic SRS) (e.g., type 1 SRS trigger), or Periodic SRS (in some embodiments perhaps only periodic SRS) (e.g., type 0 SRS trigger). Furthermore, the enhancements described herein for aperiodic SRS may possibly be applied when aperiodic SRS may be triggered with one or more specific values of the SRS request field, and not for other values.

Embodiments contemplate SRS Power Control. Given that a UTC used for SRS may be different than that used for PUSCH, the setting of the UE or WTRU transmit power $P_{SRS}$ for SRS transmitted on subframe i for the UTC c when there may be no PUSCH transmission on c may be defined by:

$$P_{SRS,c}(i) = \min\{P_{CMAX,c}(i), 10 \log_{10}(M_{SRS,c}) + P_{O\_SRS,c}(j) + \alpha_c(j) \cdot PL_c + h_c(i)\} \text{ [dBm]},$$

where $P_{CMAX,c}(i)$ may be the configured WTRU transmit power in subframe i and UTC c, $M_{SRS,c}$ may be the bandwidth of the SRS transmission, and $\alpha_c(j)$ may be a 3-bit parameter provided by higher layers for UTC c. $PL_c$ may be defined per UTC as explained herein and $P_{O\_SRS,c}(j)$ may be the desired or target received power for UTC c. This variable j may be used to denote that the desired target received power may depend on whether the SRS may be aperiodic or periodic or for regular SRS or probing SRS, and $h_c(i)$ may be the current SRS power control adjustment state for UTC c and may be either the sum of the previous power control adjustment state $h_c(i-1)$ and a TPC command for SRS, or just a TPC command for SRS. For aperiodic SRS, the TPC command for SRS can be included in the aperiodic SRS trigger. For periodic SRS, the TPC command can be either included in PDCCH with DCI format 0/4 for UTC c or jointly coded with other TPC commands in PDCCH with DCI format 3/3A whose CRC parity bits may be scrambled with TPC-SRS-RNTI.

For DL CoMP, it may be useful to have one or more, or all, CoMP cooperating set cells receive SRS in order to determine the DL CoMP transmission points (e.g., SRS used for probing). In such a case, the power setting used for SRS may be useful to be different than for regular SRS used for dynamic scheduling purposes. Therefore, a UE or WTRU may be configured with at least two types of periodic SRS, one or more, or each, with its own power setting parameters (e.g., desired power, TPC command chain, path loss reference, etc. . . . ). The types of periodic SRS may be differentiated by at least one of: Desired or target received power $P_{O\_SRS,c}(j)$; Subframe periodicity; Subframe offset; Use of frequency hopping (for example, for the SRS intended for many destination points, it may be useful to use frequency hopping in order to focus the available power onto a narrowband); Different scrambling; Reference signal sequences may be separated into two sets; one or more, or each, associated with a different type of SRS. The sets can be signaled via higher layer signaling.

The reference point (PtRS) or UTC to use to estimate the PLc in order to determine the transmission power of a SRS transmission may be determined according to any of the methods described herein. For example, for the SRS configuration used to be sent to one or more, or all, CoMP cell the PtRS or UTC to use for path loss estimation can be determined according to one or more of: the point with the highest path loss (e.g., to ensure one or more, or all, cells get the SRS); or the default UTC or the pre-configured UTC to be used for this type of SRS and, for example, the path loss for a SRS used to be sent (or in some embodiments perhaps used only to be sent) to a specific UTC may be determine as described above or according to the path loss used for PUSCH transmission if PUSCH transmission may be performed for that UTC.

In one or more embodiments, the same power setting parameters may be used for the two types of SRS (probing and regular), however, in order to increase the received power for probing SRS, frequency hopping may be used, while for regular SRS non-frequency hopping may be used.

In one or more embodiments, the same power setting parameters may be used for the two types of SRS, however a new (e.g., contemplated by embodiments) offset may be included which the UE or WTRU may use when setting the power for the probing type of SRS.

In one or more embodiments, at least one of the power settings parameters, TPC commands and SRS power control adjustment states for aperiodic SRS may correspond to the parameters, TPC commands and/or SRS power control adjustment states of PUCCH. Embodiments contemplate that the power control adjustment state for SRS may be modified by the reception of a TPC command in a downlink assignment, even though there may be no SRS transmission.

When aperiodic SRS may be triggered, it may include an IE which indicates for what type of SRS the trigger may be for. In such a case, the UE or WTRU may use the appropriate power setting parameters for the SRS transmission. Alternatively, in an aperiodic SRS grant, a one time offset may be transmitted, which informs the UE or WTRU to modify the power setting for SRS using this offset for the aperiodic SRS (or in some embodiments perhaps only for the aperiodic SRS) and not for further SRS.

In one or more embodiments, different UTC may share a subset of parameters for different SRS. Furthermore, some parameters linked to a physical channel or transmission type used by a UTC may be configured or transmitted by another UTC. In such a case, an indication of UTC for which a configuration or parameter may be for may be added to the transmission of the configuration or parameter. This may ensure that the WTRU knows for which UTC and/or channel and/or transmission type a configuration or parameter may be for. One such scenario may be a case where a WTRU may be configured for periodic SRS (PSRS) for one UTC and aperiodic SRS (ASRS) for another UTC. An example of this may be where PSRS may be used to assist in uplink transmission from point (or cell) A, while ASRS may be used to assist downlink transmission from point (or cell) B. In such scenarios, the two SRS may require different power control parameters. For example a WTRU may be indicated by a different $P_{O\_SRS,c}(j)$ (or equivalently, $P_{SRS\_OFFSET,c}(m)$) value for one or more, or each, UTC. Furthermore, $P_{O\_SRS,c}(j)$ (or $P_{SRS\_OFFSET,c}(m)$) may be useful to be dynamically indicated by L1 signaling. For instance, the value of the offset ($P_{SRS\_OFFSET,c}(m)$) may be a function of the value of the SRS request field.

Embodiments contemplate decoupling of TPC commands between aperiodic SRS (ASRS), periodic SRS (PSRS) and PUSCH. The TPC command may be useful to be kept separate between the ASRS and PSRS and PUSCH, and possibly depending on the value of the SRS request field used to trigger ASRS. In such a case, ASRS and PSRS and PUSCH may maintain their own TPC command chain. For the case where the ASRS and PSRS TPC command chains may be decoupled from the PUSCH TPC command chain, enhancements may be required to indicate for what UTC (or SRS) a TPC command may be for. One method may be to add a new (e.g., contemplated by embodiments) information element (IE) to the ASRS trigger which provides a TPC command. Furthermore, this TPC command may be used for ASRS, PSRS, PUSCH or any combination of these transmission types. To indicate for which point the TPC command may be for, a new (e.g., contemplated by embodiments) bit-field may be included. This bit-field may use a preconfigured mapping. For example, value 00 may indicate a TPC command for ASRS, values 01 may indicate a TPC command for PSRS, and so on. In one or more embodiments, on top of indicating what ASRS parameters to use, the SRS Request Field may be used to indicate for what transmission type the TPC command may be used. In one or more embodiments, a new (e.g., contemplated by embodiments) bit field may be added to the PUSCH TPC command which indicates for which combination of transmission types, (ASRS, PSRS or PUSCH) a TPC command may be for. In one or more embodiments, the TPC field itself may be reinterpreted to indicate both a power control adjustment and an indication of whether the adjustment applies to at least one of ASRS, PSRS or PUSCH.

In one or more embodiments, the TPC command may apply to PUSCH (or in some embodiments perhaps only to PUSCH) if the TPC command may be received as part of a DCI containing an uplink grant where the SRS request field indicates that aperiodic SRS may be not triggered, (e.g., "No type 1 SRS trigger"). For other values of the SRS request field, PUSCH power may be not adjusted.

In one or more embodiments, the TPC command applies to ASRS (or in some embodiments perhaps only ASRS) if (among other contemplated conditions) the TPC command may be received as part of a DCI containing an uplink grant where the SRS request field indicates that aperiodic SRS is triggered, (e.g., value of the field not set to "No type 1 SRS trigger"). For other values of the SRS request field, ASRS power may not be adjusted.

In one or more embodiments, ASRS triggered with different values of the SRS request field may maintain separate power control adjustment states. In such scenarios, a TPC command received as part of a DCI containing an uplink grant may apply to (or in some embodiments may only apply to) the ASRS triggered with the value of the SRS request field in the same DCI.

In one or more embodiments, the TPC command may apply to ASRS (or in some embodiments may only apply to ASRS) if (among other contemplated conditions) the DCI may be such that the transmission of a transport block (in uplink) is disabled, such as for instance when $I_{MCS}$ is set to 0 and $N_{PRB}$ is set larger than 1, or when $I_{MCS}$ is set to 28 and $N_{PRB}$ is set to 1. In one or more embodiments may, the TPC command also does not apply to PUSCH under the same condition.

In one or more embodiments, a DCI, (e.g., an uplink grant, downlink assignment, or DCI 3/3A), may be used to indicate TPC commands. Furthermore a linkage between different periods/offsets of the DCI and TPC command for different transmission types, (ASRS, PSRS, PUSCH), or combination of transmission types, may be preconfigured at the WTRU. In such a case, based on the subframe within which it receives a DCI, the WTRU may know or determine what UTC/transmission type the TPC command may be for.

In one or more embodiments, the applicability of the TPC command may depend on the DCI format in which it may be received. For instance, a TPC command received in DCI format 3 may apply to PUSCH only, (or to ASRS only, or to PSRS only), while a TPC command received in DCI format 4 may apply to ASRS only. In one or more embodiments, the applicability of the TPC command may depend on the value of the RNTI used to mask the CRC of the DCI.

In one or more embodiments, one or more, or each, of periodic SRS and multiple aperiodic SRS, (where one or more, or each, ASRS may be mapped to different SRS Request Field values), may be configured with possibly different UTC. In such a case or even in a case where multiple transmission types may be configured with the same UTC, there may be a be useful to maintain different TPC command loops for one or more, or each, of the PSRS and the multiple ASRS as well as for PUSCH and PUCCH. In one or more embodiments, combinations of SRS types and PUSCH and PUCCH may use the same TPC command values in their power control formulas. As an example, the PSRS and/or a subset of ASRS and/or the PUSCH may use the same TPC command values, while another subset of ASRS and PUCCH may use another. In another example, a TPC command included in a downlink assignment, (e.g., DCI Format 1A/1B/1D/1/2A/2B/2C/2), may be used, (cumulatively or not), for one or multiple ASRS power control formulas, (in another alternative, this TPC command may be a reuse of the PUCCH TPC command).

In one or more embodiments, a TPC command included in an uplink grant, (e.g., DCI Format 0/4), may be used for PSRS, PUSCH and one or multiple ASRS power control formulas. Furthermore, DCI Format 3/3A may be used for any TPC command by using the appropriate CRC parity bit scrambling. In such an example, one or more, or each, of PSRS and multiple ASRS and PUCCH and PUSCH may have its own scrambling RNTI. Therefore, in this example, the TPC command transmitted in uplink grants or downlink assignments may be used by a group of UTCs, (corresponding to some or any pre-configured combination of the PSRS, the multiple ASRS, the PUCCH and the PUSCH), while further refinement for a subset of the UTCs may be achieved by transmitting TPC commands on DCI Format 3. In such scenarios, for one or more, or each, physical channel or transmission type, (PSRS or ASRS), the UE or WTRU may maintain separate power control adjustment states.

In one or more embodiments, TPC commands (or in some embodiments perhaps only TPC commands) that may be applied to a group of UTCs, (for example, those in DCI formats 0/1/1A/1B/1D/2/2A/2B/2C/4), may be cumulative, while TPC commands used for single UTC, (for example, those in DCI format 3/3A), may be valid (or in some embodiments may only be valid) for one instance of UL transmission on the UTC. In one or more embodiments, groups of physical channels or transmission types may be updated (or in some embodiments perhaps always updated) with the same TPC command and in such scenarios, the UE or WTRU may maintain separate power control adjustment states for one or more, or each, group. In one or more embodiments, the power control loop for which a TPC command is intended may depend on the subframe number within which the TPC command may be transmitted. For example, a group of physical channels and/or transmission types may be configured to receive a TPC command in a specific DCI Format. In some embodiments, the members of the group may be further subdivided into subgroups such that when (or in some embodiments perhaps only when) the DCI Format may be transmitted in a subset of subframes, (e.g., configured by higher layers), a subgroup may apply the TPC command. In such scenarios, one or more, or each, subgroup of physical channels and/or transmission types may be preconfigured by one or more higher layers to be tied to a subset of subframes.

When a group of physical channels and/or transmission types, (PSRS or any of the ASRS), share a TPC command, (whether they share UTC or not), one or more, or each, individual physical channel and/or transmission type may also be configured to apply a different offset to the over-all TPC command chain. In one or more embodiments, when a group of physical channels and/or transmission types share a TPC command, one or more, or each, individual may interpret a TPC command codepoint differently. For example, one or more, or each, group may be preconfigured, by higher layer, a mapping between the TPC command value transmitted and the value to be used within the power control formula. In some embodiments, a group of physical channels and/or transmission types may be made up of a single element, for example.

In one or more embodiments, the choice of UTC may depend on the subframe number. For example, the same physical channel or transmission type may be tied to a different UTC depending on specific subframes, based on preconfigured subsets of subframes. The subset of subframes may be determined from at least one of, frame number, subframe number, offset and periodicity. In such a case, a TPC command may be applicable (or in some embodiments perhaps may only be applicable) for physical channels or transmission types, (e.g., PSRS or multiple ASRS), whose UTCs may be used in the subframe in which the TPC command was transmitted. In one or more embodiments, if a TPC command may be transmitted in a subframe subset, then (or in some embodiments perhaps only then) UTCs and/or physical channels and/or transmission types, (PSRS or multiple ASRS), configured to be used for that subset of subframes may use the TPC command. In one or more embodiments, a TPC command may be tied to a specific physical channel and/or transmission type, independent of the UTC. Therefore, regardless of the subframe number, the TPC command may be valid. In one or more embodiments, TPC commands transmitted in DCI Format 3 (or in some embodiments perhaps only such TPC commands) may be used for one or more, or all, subframes. In one or more embodiments, any other TPC command may be valid (or in some embodiments perhaps may only be valid) for a subset of subframes.

Multiple SRS for multiple UTC may serve different purposes, (for example, PSRS may be used for UL scheduling while ASRS may be used for DL set management). Therefore the frequency with which one or more, or each, SRS may be transmitted may differ. There may therefore be a linkage between the frequency (and/or periodicity) that TPC commands may be sent for an SRS and the frequency (and/or periodicity) with which this SRS may be transmitted by the WTRU. Furthermore, if open-loop power control may be lacking in precision, it may be possible that lower frequency (and/or higher periodicity) TPC commands may lead to power control not converging to an appropriate solution. One method for addressing may be to modify the granularity of the correction value used in the TPC command chain. For example, one type of SRS (or PUSCH) may be preconfigured with a specific mapping of TPC command field value and correction value. And another type of SRS (or PUSCH) may be preconfigured with another mapping. In one or more embodiments, this may allow different SRS for different UTC to have different TPC command granularity.

Embodiments contemplate PRACH Power Control. In SIB 2, the random access parameters may be provided to a UE or WTRU. These may include which signal reference to use, (e.g., either CRS, CSI-RS or another UTC-dependent reference signal), for path loss calculations as well as what resources to use for PRACH. There can be multiple sets of PRACH parameters provided to the UE or WTRU. These parameter sets may include at least one of the following, for one or more, or each, UTC: PRACH resource; Set of possible preamble sequences; Preamble received target power; and/or RA-RNTI.

For example, one set may be for the UE or WTRU to attempt access on a specific cell, while another set may be to attempt access on multiple cells for CoMP operation. For example, one set of parameters may have one subset of preambles which indicate to the network the UEs UTC. In SIB2, there may also be an indication for parameter sets that require UE or WTRU to have CoMP capabilities. One set of parameters (possibly linked to a UTC)) may be considered the fallback parameters/UTC. In one or more embodiments, the UTC chosen may also be linked to the type of random access (contention based or non-contention based).

For the case where the UTC includes multiple PtRS's, the path loss may be determined from at least one of: The minimum value of path loss for any PtRS; The maximum value of path loss for any PtRS; The linear average of path losses for one or more, or all, PtRS; Any preconfigured value from the set of path losses for one or more, or all, PtRS.

In the Random Access Response (RAR) message, the network may indicate to the UE or WTRU the CoMP cooperating set. Furthermore, the TPC command included in the RAR message may include the UTC for which it may be valid.

In the event of a random access attempt failure, the UE or WTRU may use the fallback UTC and single cell path loss and begin the random access anew. In one or more embodiments, the UE or WTRU may continue with the same UTC and ramp the power up accordingly.

Embodiments contemplate one or more techniques of transmitting an uplink reference signal and initially, maintaining orthogonality with different frequency assignments.

One or more embodiments contemplate reducing peak correlation by way of cyclic shift (CS) compensation. The amount of correlation peak drift may be found to be a function of the relative locations of RSs in frequency domain, which may be derived in terms of number of samples as:

$$amount of correlation peak drift = \mod\left(\text{round}\left(q\frac{(k_{01} - k_{00})N}{N_{ZC}^{RS}}\right), N\right)$$

where $k_{01}$ and $k_{00}$ may be the sub-carrier indexes of the starting positions of the two RSs. q is the Zadoff-Chu generating index defined in 3GPP standard by $$q = \left\lfloor \bar{q} + \frac{1}{2} \right\rfloor + v(-1)^{\lfloor 2\bar{q} \rfloor}, v = 0, 1$$

$$\bar{q} = \frac{N_{ZC}^{RS}(u+1)}{31}, u = 0, 1, \ldots 29$$

with v, and $N_{ZC}^{RS}$ being the sequence group index, the base sequence index, and the length of the RS sequence respectively. N may be the size of inverse discrete Fourier transform (IDFT) in the SC-FDMA baseband generator and in one or more embodiments N may be=2048.

As a solution to mitigate the peak correlation issue, among other reasons, the drift of the correlation peak may be pre-compensated by applying an offset value on top of the planned CS setting, given that the UE or WTRU may be scheduled according to a specific resource block (RB) allocation. In particular, an additional offset value, denoted by $n_{PRE}$, may be added to the cyclic shift calculation. For example, for physical uplink shared channel (PUSCH) DMRS reference signal generation, the cyclic shift may be calculated as follows:

$$\alpha_\lambda = \frac{2\pi n_{cs,\lambda}}{12}$$

$$n_{cs,\lambda} = (n_{DMRS}^{(1)} + n_{DMRS,\lambda}^{(2)} + n_{PN}(n_s) + n_{PRE}) \mod 12$$

where $n_{DMRS}^{(1)}$, $n_{DMRS,\lambda}^{(2)}$, $n_{PN}(n_s)$ may be respectively the UE or WTRU-specific, layer-specific, and CS hopping CS variables defined in 3GPP TS 36.211, V10.x.x, "E-UTRA, Physical channels and modulation", which is herein incorporated by reference as if fully set forth herein.

As an exemplary embodiment, the pre-compensation offset variable $n_{PRE}$ may be calculated in the reverse direction of the correlation peak drift:

$$n_{PRE} = \frac{12 \times \mod\left(\text{round}\left(q\frac{(k_{01} - k_{00})N}{N_{ZC}^{RS}}\right), N\right)}{N}$$

For other types of reference signal generation, such as DMRS for PUCCH or SRS, same concept of the CS pre-compensation can be applied where the equations may be presented with some differences.

In a first implementation of the CS pre-compensation method, UE or WTRU may autonomously perform the CS compensation without involvement of the network operation. The UE or WTRU has direct access to the values of $k_{01}$, $N_{ZC}^{RS}$, and q already from the scheduling grant sent by network. But the starting position of the reference RS, $k_{00}$, may not be generally available to the UE or WTRU. In one or more embodiments, one or more, or all, the WTRUs that may be jointly scheduled in MU-MIMO operation may be configured with a common $k_{00}$ value that may be pre-defined or configured by network via higher layer. Upon receiving one or more, or each, uplink grant via uplink related downlink control information (DCI), UE or WTRU may perform the CS compensation on per transmission time interval (TTI) basis, or for a longer period. Alternatively, additional dynamic signaling mechanism may be introduced to inform the UE or WTRU of the $k_{00}$ value used by the other UEs under co-scheduling. In one or more embodiments, the $k_{00}$ value may be signaled as part of an uplink transmission context, (corresponding for instance to properties of a certain potential destination point), allowing the network to indicate one of multiple $k_{00}$ values from the indicated uplink transmission context.

In a second implementation of the CS pre-compensation method, CS compensation may be performed at the network side. In one or more embodiments, the network scheduler may have all the necessary or useful information available for one or more, or each, UE or WTRU under the co-scheduling. Therefore, may calculate the CS compensation according to the scheduling decision it makes and pre-modify the Cyclic Shift Field in the uplink-related DCI that may be sent to UE or WTRU on one or more, or each, uplink grant. As an example, the Cyclic Shift Field may be modified in such a way as illustrated in FIG. 8, where the bits in Cyclic Shift Field may be modified by offsetting the entry pointer to the given table in terms of $n_{PRE}$. In some embodiments, the wrap around may be performed when hitting the end of the table.

Alternatively, if additional dynamic signaling mechanism is introduced for dynamic configuration of CS, among other conditions, the CS compensation may be applied by directly modifying the CS signaling.

At least one aspect of the usefulness of the contemplated CS compensation techniques may be that the current techniques of generating the reference signals, such as grouping of the base sequences and configuration of various levels of the hopping schemes, may not be useful to change, which may help to minimize the standardization impact and may make it easier to be backward compatible to legacy WTRUs.

Embodiments contemplate reducing peak correlation by way of further randomization. In defining the reference signals for uplink transmission, the Zadoff-Chu sequence is used for the base sequence generation:

$$X_q(m) = e - q\frac{j\pi m(M=1)}{N_{ZC}^{RS}}, \quad 0 \le M \le N_{ZC}^{RS} - 1$$

where q is the root index that may serve as a key parameter to define different base sequences. The length $N_{ZC}^{RS}$ may be chosen as the largest prime number as compared to the length of the reference signal, denoted by $M_{SC}^{RS}$. The Zadoff-Chu sequence of length $N_{ZC}^{RS}$ may be cyclic and may be extended to a base sequence of length $M_{SC}^{RS}$.

The set of available base sequences may include 30 base sequence groups labeled by u, u=0, 1, 2, ..., 29, for example. One or more, or each, group may have a set of base sequences of different sizes of $M_{SC}^{RS}$ and for $M_{SC}^{RS} \ge 72$ there may be two base sequences assigned with sequence label v, v=0,1. The relation of the group and sequence labels to the root index is defined in current 3GPP standard by:

$$q = \left\lfloor \bar{q} + \frac{1}{2} \right\rfloor + v(-1)^{\lfloor 2\bar{q} \rfloor}$$

$$\bar{q} = \frac{N_{ZC}^{RS}(u+1)}{31}$$

When the group hopping may be performed, the group number u may vary with the slot number $n_s$ according to a group hopping pattern $f_{gh}(n_s)$:

$$u = (f_{gh}(n_s) + f_{ss}) \bmod 30$$

where $f_{ss}$ may be a cell-specific sequence-shift parameter configured by higher layer.

For one or more, or all, base sequences within a base sequence group, it may be seen that they share a common hopping pattern. Thus for unpaired BW allocation, reference signals being used may (or in some embodiments, may always) have a fixed pair relation regardless of how the hopping pattern varies. Since the poor peak cross-correlation may appear rarely and among some pairs of reference signals of unequal lengths (or in some embodiments perhaps only such pairs), it may be useful to perform further hopping over the reference signals of different sizes. In other words, another layer of hopping is contemplated that may be RS length dependent. As an example, the group number u may be defined in such a way:

$$u = (f_{gh}(n_s) + f_{ss} + f_{lh}(n_s, M_{SC}^{RS})) \bmod 30$$

where $f_{lh}(n_s, M_{SC}^{RS})$ may be the RS length hopping pattern contemplated herein, which may be a function of the RS length $M_{SC}^{RS}$. Further, the RS length hopping pattern may be defined by:

$$f_{lh}\left(n_s, M_{SC}^{RS}\right) = \begin{cases} 0 & if\, RS\, length\, hopping\, is\, disabled \\ \sum_{i=0}^{7}(c(8n_s+i)2^i) \bmod 30 & if\, RS\, length\, hopping\, is\, enabled \end{cases}$$

which may be initialed with a RS length dependent value, for instance, $c_{init} = M_{SC}^{RS}$, where c(i) may be a pseudo-random sequence generating function.

As another example, the RS length dependent hopping may be combined into the group hopping pattern. In particular, the group hopping pattern may be made RS length dependent:

$$u = (f_{gh}(n_s, M_{SC}^{RS}) + f_{ss}) \bmod 30$$

$$f_{gh}(n_s, M_{SC}^{RS}) = \begin{cases} 0 & if\, RS\, length\, hopping\, is\, disabled \\ \sum_{i=0}^{7}(c(8n_s+i)2^i) \bmod 30 & if\, RS\, length\, hopping\, is\, enabled \end{cases}$$

which may be initialized by a RS length depend value, for instance:

$$c_{init} = \left\lfloor \frac{N_{ID}^{cell}}{30} + M_{SC}^{RS} \right\rfloor.$$

Alternatively, if the group hopping is made non-cell specific, the initial value may be defined by $$c_{init} = \left\lfloor \frac{GroupHoppingConfig}{30} + M_{SC}^{RS} \right\rfloor$$

where GroupHoppingConfig may be a parameter that may be configured by higher layer, or updated dynamically.

Embodiments contemplate one or more CS hopping enhancements. The following paragraphs describe contemplated techniques to enhance the use of CS hopping by a UE or WTRU in a deployment with multiple potential destination points.

The DM-RS transmitted in a slot $n_s$ for a transmission layer λ may be a function of a cyclic shift $\alpha_\lambda$ according to $\alpha_\lambda = 2\pi n_{cs,\lambda}/12$ where $n_{cs,\lambda}$ may be a cyclic shift index. The cyclic shift index may be calculated according to the following formula:

$$n_{cs,\lambda} = (n_{DMRS}^{(1)} + n_{DMRS,\lambda}^{(2)} + n_{PN}(n_s)) \bmod 12$$

where at least one of $n_{DMRS}^{(1)}$ and $n_{DMRS,\lambda}^{(2)}$ may be a parameter associated to a UTC. The values of these parameters may be obtained from higher layers or may be obtained from a dynamic selection method, such as from the value of a cyclic shift field (CSF) in uplink-related downlink control signaling. The quantity $n_{PN}(n_s)$ may be referred to as "cyclic shift (CS) hopping sequence". It may be a function of the slot number $n_s$ that may be derived from a pseudo-random sequence c(i) according to the same relationship as in current systems. Such pseudo-random sequence may be initialized at the beginning of one or more, or each, radio frame with a value $c_{init}$ which may be referred to as "initial value for CS hopping". The value of the cyclic shift hopping sequence initiator $c_{init}$ may be a dependent on the UTC and obtained using at least one of several contemplated techniques described herein. When a UTC also includes power control parameters enabling reception of the uplink signal at the proper level at a certain reception point, such as the identity of a point-specific reference signal and/or point-specific power control parameters, embodiments that may enable the utilization of a UTC-specific value of $c_{init}$ may ensure that the reference signal may be received at the proper level for the point for which the structure of the reference signal may be optimal for the purpose of MU-MIMO combining.

In one or more embodiments, the initial value of the pseudo-random generator used for CS hopping may be decoupled from $f_{ss}^{PUSCH}$ and may still be made cell-specific, for instance:

$$c_{init} = \left\lfloor \frac{N_{ID}^{cell}}{30} \right\rfloor 2^5 + (N_{ID}^{cell}) \bmod 30$$

where $N_{ID}^{cell}$ may correspond to the physical cell identity or to an identity associated to a UTC. In one or more embodiments, the CS hopping may be independently configured via $c_{init} = \Delta_{csh}$. In combining the two contemplated techniques, the CS hopping pattern may also be initialized by $$c_{init} = \left\lfloor \frac{N_{ID}^{cell}}{30} \right\rfloor 2^5 + (N_{ID}^{cell}) \bmod 30 + \Delta_{csh}$$

In one or more embodiments, the UE or WTRU-specific adjustment may be dynamically assigned in the most recent uplink-related DCI (or in the uplink-related DCI to which the current UL transmission may be related). In one or more embodiments, the UE or WTRU-specific adjustment $\Delta_{csh}$ may be derived implicitly at the UE or WTRU. One possible implicit derivation may depend on the current base sequence group.

In one or more embodiments, the implicit derivation may be a function of the current base sequence group as well as the previous base sequence group.

In a one or more embodiments, the additional randomization may be performed over DMRS of different lengths, similar to the concept described herein. An exemplary realization may be to have the CS hopping pattern defined by:

$$n_{PN}(n_s, M_{SC}^{RS}) = \sum_{i=0}^{7} c(8 N_{symb}^{UL} n_s + i) 2^i$$

which may be initialized in terms of $M_{SC}^{RS}$ as well, for instance:

$$c_{init} = \left\lfloor \frac{N_{ID}^{cell}}{30} \right\rfloor 2^5 + (N_{ID}^{cell} + M_{SC}^{RS}) \bmod 30$$

or alternatively if UE or WTRU-specific adjustment may be used $$c_{init} = \left\lfloor \frac{N_{ID}^{cell}}{30} \right\rfloor 2^5 + (N_{ID}^{cell} + M_{SC}^{RS}) \bmod 30 + \Delta_{csh}.$$

In one or more embodiments, the CS may be obtained using the same formulas as in the current system, $$c_{init} = \left\lfloor \frac{N_{ID}^{cell}}{30} \right\rfloor 2^5 + f_{ss}^{PUSCH}$$

but certain parameters may be replaced with UE or WTRU-specific parameters, and in some embodiments may be provided in an uplink transmission context. The parameters that may be provided in the uplink transmission context may include:

The Cell ID ($N_{ID}^{cell}$) may be replaced with a UTC-specific value ($N_{ID}^{UTC}$).

The sequence shift pattern $f_{ss}^{PUSCH}$ may be replaced with a UTC-specific value $f_{ss}^{PUSCH-UTC}$. In the latter case, the UTC-specific value $f_{ss}^{PUSCH-UTC}$ may be provided directly or may be derived from the UTC-specific cell ID parameter ($N_{ID}^{UTC}$) and, in some embodiments, perhaps another UTC-specific parameter ($\Delta_{ss}^{UTC}$). These values may or may not be configured independently from possible other UTC-specific cell ID parameters used in the calculation of other properties of the UTC, such as the base sequence for example. One or more embodiments contemplate that $f_{ss}^{PUSCH-UTC} = (N_{ID}^{UTC} \bmod 30 + \Delta_{ss}^{UTC}) \bmod 30$. In some embodiments, in case the parameter $\Delta_{ss}^{UTC}$ may not be present or may not be defined, this formula could be simplified as follows: $f_{ss}^{PUSCH-UTC} = N_{ID}^{UTC} \bmod 30$. In such cases, the initial value of the pseudo-random sequence generator $c_{init}$ can be summarized as:

$$c_{init} = \left\lfloor \frac{N_{ID}^{UTC}}{30} \right\rfloor 2^5 + N_{ID}^{UTC} \bmod 30.$$

Such embodiments may allow the network to schedule the UE or WTRU using a cyclic shift hopping pattern matching that may be used in a destination point that may be used by another co-scheduled UE or WTRU, minimizing the interference with this co-scheduled UE or WTRU. The contemplated techniques allowing the selection of one of multiple UTC's, (described herein), may allow the selection by the network of the destination point and corresponding co-scheduled UE or WTRU with which it may be most appropriate to minimize interference, when multiple such destination points exist.

In the aforementioned embodiments, the parameters for the determination of CS hopping may be the same regardless of whether the DM-RS may be transmitted as part of PUCCH or PUSCH. Alternatively, at least one parameter may be different between PUCCH and PUSCH. In this case, distinct parameters may be utilized by the UE or WTRU as part of a same UTC for a transmission over PUCCH or PUSCH, or different UTC's may be defined for transmission over PUCCH or PUSCH.

The following methods may be employed alone or in combination for the selection of an UTC for an UL transmission. In the following embodiments, a downlink control signaling may be said to be "applicable" to an uplink transmission if the uplink transmission is triggered by this signaling. This may include, for instance, DCI (decoded in PDCCH or E-PDCCH) indicating a grant for a PUSCH transmission, a DCI indicating an aperiodic SRS transmission, a DCI indicating a RACH order, or a DCI indicating a downlink assignment for which HARQ feedback may be useful to be transmitted over a PUCCH.

For the purpose of determining a UTC to use for a certain uplink transmission, among other contemplate conditions, the UE or WTRU may first determine a subset of candidate UTCs using at least one contemplated restriction technique. The UE or WTRU may then select the UTC from the UTCs available in the subset of candidate UTCs. In case this subset may be empty, the UE or WTRU may use a "default" UTC which may be available (or in some embodiments may always be available). Such "default" UTC may correspond to a UTC allowing reception from most points of the cell. For instance, the "default" UTC may use the common reference signal as the PtRS.

Some example restriction methods are provided in the following. In one method, the UE or WTRU may determine that a UTC may be a candidate if the path loss estimated from the PtRS may be below a threshold. The path loss may be estimated as the difference between the transmission power and the received power (RSRP) in dB units. In one or more embodiments, the UE or WTRU may determine that a UTC may be a candidate if the received signal power or quality measured from the PtRS may be above a threshold. In one or more embodiments, the UE or WTRU may determine that a UTC may be not a candidate if connectivity exists for this UTC. In one or more embodiments, the UE or WTRU may determine that UTC may be not a candidate if an activation state associated to this UTC is deactivated.

The UE or WTRU may determine the UTC based on the type of uplink transmission, possibly according to a higher-layer indication or configuration. In one example, an aperiodic SRS transmission may be configured to be transmitted using the transmission parameters of a first UTC and a periodic SRS transmission may be configured to be transmitted using the transmission parameters of a second UTC. In another example, for a first periodic SRS transmission configured to take place with a first period and offset the UE or WTRU may use a first UTC, while for a second periodic SRS transmission configured to take place with a second period and offset the UE or WTRU may use a second UTC. In another example, the UE or WTRU may use a first UTC for PUSCH transmissions, and a second UTC for PUCCH transmissions. In another example, the UE or WTRU may use a first UTC for PUSCH transmissions triggered by a dynamic grant, and a second UTC for PUSCH transmissions triggered by a semi-persistent scheduling (SPS) grant. In one or more embodiments, the UE or WTRU may use the second for a PUSCH transmission triggered by a dynamic grant if it occurs in place of a SPS grant in the same subframe. In one or more embodiments, the UE or WTRU may determine the UTC based on data multiplexed into the transport block or set of transport blocks carried by the PUSCH transmission. For instance, the UTC may depend on one or more of the logical channel, type of logical channel, logical channel group, and/or radio bearer or type of data contained in a transport block. The logical channel to UTC mapping may be provided by one or more higher layers to the WTRU. Alternatively, the WTRU may determine the logical channel to UTC mapping based on logical channel group (LCG) priorities. In one or more embodiments, for a certain logical channel the UTC selection may further take into consideration whether the TB contains user plane data or control plane data, wherein control plane data may correspond to RLC control PDUs (such as status PDUs), or MAC control PDUs, or RRC messages. In some embodiments, this behavior and/or UTC selection may be configured for a subset of logical channels. In case more than one MAC entity or MAC instance is configured, the UE or WTRU may determine the UTC based on the MAC entity or MAC instance providing the set of transport blocks carried by the PUSCH transmission.

The UE or WTRU may determine the UTC based on the received downlink control signaling applicable to the uplink transmission. In one method, in case of a PUSCH transmission, the downlink control signaling may include a field indicating the UTC for the PUSCH transmission.

For example, the field may include a Cyclic Shift Field (CSF) in an uplink-related downlink control signaling, where the interpretation of the field may be modified compared to that in existing systems. One or more, or each, value of the CSF may indicate the use of a specific UTC, or the use of at least one parameter associated to the UTC, possibly along with the use of other parameters such as an orthogonal cover code (OCC) or a cyclic shift index for one or more, or each, transmission layer $n_{DMRS,\lambda}^{(2)}$. For instance, a value of the CSF may indicate at least one of: a parameter specific to a UTC, such as an UTC index, or a UTC-specific parameter used in place of a cell identity; at least one parameter used to determine at least one of a base sequence group number u and a base sequence number v for one or more, or each, slot $n_s$. The at least one parameter may be associated to a UTC or be common to one or more, or all, UTC's. For instance, the at least one parameter may include a UTC-specific parameter used in place of a cell identity ($N^{UTC}_{ID}$) and possibly a UTC-specific parameter ($\Delta^{UTC}_{ss}$) used in place of a cell-specific $\Delta_{ss}$, for the purpose of calculating the base sequence parameters; at least one parameter used to determine an initial value for CS hopping $c_{init}$, such as a UTC-specific value ($\Delta_{csh}$ or $c_{init}^{CSH\_UTC}$) or an UTC-specific identity ($N^{UTC}_{ID}$) used for the purpose of calculating the initial value for CS hopping, or a UTC-specific parameter $\Delta^{UTC}_{ss}$ used for the purpose of calculating the initial value for CS hopping; or at least one parameter used to determine the resource blocks that may be used for PUSCH in one subframe, (or equivalently, which RBs may be used for PUCCH in one subframe). The at least one parameter may be associated to a UTC or be common to one or more, or all, UTC's. For example, the at least one parameter may include a UTC-specific parameter for pusch-HoppingOffset as well as n-SB and hoppingMode which may be used by the WTRU to determine the RBs within which PUSCH may be located.

FIG. 9 shows an example of possible modified mapping for the CSF, where in addition to the cyclic shift index $n_{DMRS,\lambda}^{(2)}$ and the orthogonal cover code $[w^{(\lambda)}(0)\ w^{(\lambda)}(1)]$ for one or more, or each, transmission layer λ, an initial value of CS hopping may be indicated for one or more, or each, codepoint. One or more embodiments contemplate that in place of directly indicating an initial value of CS hopping for each codepoint (in the last column), a UTC-specific parameter $\Delta^{UTC}_{ss}$ can be indicated that may be used for the purpose of calculating this initial value of CS hopping, according to one or more previously described embodiments, e.g.

$$c_{init} = \left\lfloor \frac{N^{UTC}_{ID}}{30} \right\rfloor \cdot 2^5 + N^{UTC}_{ID} \bmod 30.$$

In case the CSF may be interpreted as per the above, the UE or WTRU may determine (in some embodiments perhaps implicitly) a UTC based on the indicated value of the initial value for CS hopping, (or of another UTC-specific parameter, in other contemplated techniques), and infer other properties of the uplink transmission based on this UTC. For instance, the UE or WTRU may determine that the transmission power may be calculated based on a first set of UTC-specific parameters in case the indicated value of the initial value for CS hopping may be a first value, and that the transmission power may be calculated based on a second set of UTC-specific parameters in case the indicated value may be a second value. The UE or WTRU may interpret the CSF field differently depending on a configuration parameter. For instance, the UE or WTRU may interpret the CSF field in the same way as in existing systems if it may be configured with a single UTC, and use FIG. 9 if it may be configured with more than one UTC's.

In one or more embodiments, in case of an aperiodic SRS transmission, the field indicating the SRS request may indicate one of a set of possible UTCs, along with other characteristics of the aperiodic SRS transmission.

In one or more embodiments, in case of a PUCCH transmission utilized for transmitting HARQ feedback, an A/N resource indicator may indicate the UTC to use along with other information on the PUCCH resource that may be utilized (such as the resource index or another property of the PUCCH transmission). For instance, the parameter $N_{PUCCH}^{(1)}$ used for the determination of a resource index may be set to a first value in a first UTC and to a second value in a second UTC, that may allow the use of distinct PUCCH regions between adjacent reception points for better performance. In another example, the parameters used for the determination of the base sequences of the DM-RS for PUCCH, (such as a parameter replacing a cell identity), may be set to a first set of values in a first UTC and to a second set of values in a second UTC. In another example, the parameters used for the determination of the RBs used for PUSCH, (such as pusch-HoppingOffset), may be set to a first set of values in a first UTC and to a second set of values in a second UTC.

In another example, the parameters used for determination of the initial value of the CS hopping sequence of the DM-RS for PUCCH, (such as the initial value itself or a parameter replacing a cell identity), may be set to a first set of values in a first UTC and to a second set of values in a second UTC. In another example, the initial value of the pseudo-random sequence c(i) used for the determination of the cyclic shift term $n_{cs}^{cell}(n_s,l)$ for one or more, or each, slot $n_s$ and symbol number may be set to a first value in a first UTC and to a second value in a second UTC. The value in one or more, or each, UTC may correspond to a UTC-specific cell identity parameter.

In one or more embodiments, in case of a PRACH transmission triggered by a PDCCH order, among other contemplated conditions, a field in the PDCCH order may indicate a UTC.

In the above methods, the indication of a UTC may include an index ("destination point index" or "carrier indication field" or "UTC" or "transmission point" if used for this purpose) pointing to one of several sets of parameters configured for one or more, or each, possible UTC, or group thereof. Alternatively, the indication may include an indication to any other parameter that may uniquely identify the UTC, such as an index to a transmission point or DL reference signal transmitted from the destination point (e.g. associated to the UTC) and used for power control or timing alignment purposes.

The WTRU may determine (in some embodiments perhaps implicitly) the UTC for an uplink transmission based on a property of the downlink control signaling applicable to the uplink transmission. In one method, the UTC may be determined based on the search space (or location in the time-frequency grid) where the PDCCH or E-PDCCH containing the applicable downlink control information (DCI) may have been decoded. For instance, in case DCI for a downlink assignment may be decoded in a common search space, the UTC for the PUCCH containing the HARQ feedback for this assignment may correspond to the UTC that may use a common reference signal (CRS) of the cell as its point reference signal.

In another example, in case DCI for an uplink grant may be decoded in a UE or WTRU-specific search space, the UTC for the PUSCH may correspond to a UTC that may use another reference signal (e.g. CSI-RS) as its point reference signal. In one or more embodiments, the UTC may be determined based on the type of physical control channel (PDCCH as defined in current system, or E-PDCCH based on UE or WTRU-specific reference signal(s)) containing the applicable downlink control information (DCI). For instance, in case the DCI may be decoded from a PDCCH, the UTC for the PUCCH containing the HARQ feedback for this assignment may correspond to the destination point that may use a common reference signal (CRS) of the cell as its point reference signal.

In another example, in case the DCI may be decoded from an E-PDCCH, the UTC may correspond to the destination point that may use another reference signal as its point reference signal. In one or more embodiments, the UTC may be determined based on the reference signal or antenna port used for the transmission of the corresponding downlink control signaling. For instance, in case DCI for a downlink assignment may be transmitted over an antenna port corresponding to a common reference signal, the UTC for the PUCCH containing the HARQ feedback for this assignment may correspond to the UTC that may use a common reference signal (CRS) of the cell as its point reference signal. In another example, in case DCI for an uplink grant may be transmitted over an antenna port corresponding to a DM-RS reference signal, the UTC for the PUSCH may correspond to a destination point that may use another reference signal (e.g. CSI-RS) as its point reference signal. The relationship between the antenna port used to transmit the downlink control signaling and the reference signal (or antenna port) of used as point reference signal for the UTC of the uplink transmission may be provided by one or more higher layers.

In one or more embodiments, the UTC may be determined based on the RNTI used to mask the CRC used in the encoding of the corresponding downlink control signaling. For instance, in case the CRC used in the encoding of the DCI for a downlink assignment may be masked with a first RNTI, the UTC for the PUCCH containing the HARQ feedback for this assignment may correspond to the destination point that may use a first point reference signal. In another example, in case the CRC used in the encoding of the DCI for a downlink assignment may be masked with a second RNTI, the UTC for the PUCCH containing the HARQ feedback for this assignment may correspond to the destination point that may use a second point reference signal. In another example, in case the CRC used in the encoding of the DCI for an uplink grant is the temporary C-RNTI, the UTC for the DM-RS used in the corresponding PUSCH transmission may correspond to a default UTC, where transmission properties may be derived from the physical cell identity. In one or more embodiments, the mapping between RNTI and UTC (or its point reference signal) may be provided by one or more higher layers. In another example, in case the CRC used in the encoding of the DCI for an uplink grant may be masked with a first RNTI, the UTC for the PUSCH transmission and associated DM-RS, (including, for instance, the parameters used to generate the base sequence of DM-RS), may correspond to a first UTC. In case the CRC used in the encoding of the DCI may be masked with a second RNTI, the UTC for the PUSCH transmission and associated DM-RS may correspond to a second UTC.

In one or more embodiments, the UTC may be determined based on the DCI format used. Based on a transmission mode or a configuration mode, a direct DCI format to UTC mapping may be specified. When configured in this mode, if a DCI format, for example DCI format 5 may be received the UE or WTRU may use the corresponding configured UTC for UL transmission, otherwise if the UE or WTRU receives a different DCI format, it may use a default or the associated UTC.

In one or more embodiments, the UTC, or at least one parameter tied to the UTC, (for example PUSCH hopping offset), may be determined based on the lowest CCE index used to construct the PDCCH used for transmission of the corresponding DCI assignment.

The UE or WTRU may determine (in some embodiments perhaps implicitly) the UTC based on measurements performed for at least one reference signal associated to at least one UTC. The reference signal used to perform measurements may correspond to at least one of the reference signals herein, such as the point reference signal of the UTC. The types of measurements that may be used, for a given reference signal of a UTC, may include at least one of: Received signal power (e.g. similar to RSRP); Received signal quality (e.g. similar to RSRQ); Path loss, estimated as the difference (in dB units) between the transmitted power and the received power, where the transmitted power may be provided as part of the configuration; Alternatively, path gain which may be the negative of path loss in dB units; and/or Channel quality indication.

In one or more embodiments, the UTC may be selected so as to reach (or in some embodiments perhaps only reach) one or a subset of the closest reception points. Such UTC may be selected using at least one of the following criteria: UTC for which path loss of the associated reference signal may be the smallest (or for which path gain may be the largest); UTC for which received signal power (or received signal quality, or channel quality indication) of the associated reference signal may be the largest; and/or UTC for which the transmitted power determined by the transmit power control context for this UTC may be the smallest.

In one or more embodiments, the UTC may be selected so as to reach a larger set of reception points. Such UTC may be selected using at least one of the following criteria: UTC for which path loss of the associated reference signal may be the largest (or for which path gain may be the smallest); UTC for which received signal power (or received signal quality, or channel quality indication) of the associated reference signal may be the smallest; and/or UTC for which the transmitted power determined by the transmit power control context for this UTC may be the largest.

The UE or WTRU may determine that one of a plurality of the above criteria may be used for the selection of the UTC based on at least one of the following:

The type of uplink transmission (channel or signal). For instance, the UTC with the largest power may be selected in case of a periodic SRS transmissions, according to a higher-layer indication applicable to the type of uplink transmission. For instance, a certain aperiodic SRS transmission may be configured to use the UTC with the largest power;

Based on downlink control information applicable to the uplink transmission. For instance, a field in the DCI indicating an uplink grant may indicate whether to use the UTC with the largest or the smallest power; and/or Based on subframe timing.

In one or more embodiments, the UE or WTRU may determine (in some embodiments perhaps implicitly) the UTC based on the timing of the subframe where the uplink transmission takes place, or the timing of the subframe where the downlink control information may be applicable to the uplink transmission. The timing may be defined using at least one of a frame number, subframe number, periodicity and offset. One application of this method may be for the case where a UE or WTRU may highly interfere with a node that it cannot select as a reception point. In such a case, the network may configure the UE or WTRU with a subset of subframes for which it may use regular uplink transmission and another subset of subframes for which it may use limited transmission. The limitation on transmission may be a reduction in transmission power for one or more, or all, physical channels and/or transmission types. Or it may be a reduction in applicable CS hopping and/or PUSCH hopping. In another example, the UE or WTRU may determine the UTC to use in a given subframe based on one or more of a specific set of possible subframe configurations, where a subframe configuration may define for some or each subframe which MAC instance(s) or MAC entity or entities) can transmit over PUSCH, or alternatively for some or each MAC instance or MAC entity the subset of subframes may be available for transmission over PUSCH.

In one example method, the UTC used for uplink transmissions occurring in the subset of subframes whose frame number (Nf) and subframe number (Ns) satisfy (10×Nf+Ns) mod T1=O1, where T1 and O1 may be parameters that may be provided by one or more higher layers, may be determined to correspond to the UTC that may use a common reference signal (CRS) of the cell as its point reference signal. In another example method, the UTC used for uplink transmissions may be determined based on a bitmap provided by higher layers, where one or more, or each, position of the bitmap corresponds to a certain subframe and the value of the bitmap indicates the UTC to use.

In another example method, the initial value for CS hopping and/or PUSCH hopping offset may be determined to be a first value, (possibly corresponding to a first UTC), for even-numbered subframes, and a second value, (possibly corresponding to a second UTC), for odd-numbered subframes. The two values may be provided by higher layers. The transmission power may also be determined based on parameters associated to the respective corresponding UTC. For example, in one subset of subframes, a UE or WTRU may be configured with one set of UTCs one or more, or each, configured with a specific transmission power offset. While in another subset of subframes, the UE or WTRU may be configured with another set of UTCs, which may be a near replica of the first set of UTCs, save for some differences in some parameters, such as a different transmission power offset.

In one or more embodiments, the UE or WTRU may determine (in some embodiments perhaps implicitly) the UTC based on the type of subframe where the uplink transmission takes place, where the type of a subframe may be one of at least a specific subset of "MBSFN" subframes, an "almost blank" subframe, or a "normal" subframe. For instance, the UTC used for uplink transmissions taking place during a first subset of MBSFN subframes may be determined to correspond to the UTC that may use a first point reference signal, while the UTC used for uplink transmissions taking place during normal subframe may be determined to correspond to the UTC that may use a common reference signal as its point reference signal, or to a default UTC.

The UE or WTRU may determine the UTC for an uplink transmission based on a property of this uplink transmission which may have been signaled dynamically in the grant, or configured semi-statically. For instance, the UTC used for a PUSCH transmission may be selected based on the resource block assignment or the hopping offset for this PUSCH transmission. For instance, it may be a function of the starting resource block or the number of resource blocks or the number of subbands or the hopping offset. In another example, the UTC may be selected based on the modulation and coding scheme used for the PUSCH transmission.

In another example, the UTC used for a PUCCH transmission may be selected based on the physical resource block (PRB) in which the PUCCH transmission takes place. For instance, the UTC used for a PUCCH transmission may be set to a first UTC when the PRB belongs to a first set of PRB's, and to a second UTC when the PRB belongs to a second set of PRB's. Thus, for instance, at least one of the physical cell identities, and power control parameters and variables, (e.g. reference signal used for path loss estimation, power control adjustment state), may be selected based on the PRB used for the PUCCH.

In another example, the UTC used for a PUCCH transmission may be selected based on a specific set of uplink transmission properties of PUCCH as indicated by a PUCCH resource index for a certain PUCCH format. For instance, the UTC used for a PUCCH transmission may be set to a first UTC when the resource index may be within a first range (or set) of values, and to a second UTC when the resource index may be within a second range (or set) of values.

The UE or WTRU may determine the UTC for an uplink transmission containing HARQ feedback for at least one downlink transmission on PDSCH based on a property of this downlink transmission. The uplink transmission may include at least one of PUCCH or PUSCH containing HARQ feedback. The property of the PDSCH transmission may include at least one of: Transmission mode (for one or more, or each, transmission); Antenna port or type of reference signal used for PDSCH transmission; and/or Carrier frequency of the PDSCH transmission (or carrier index or cell index).

For instance, the UE or WTRU may use a UTC corresponding to a first point reference signal to transmit A/N feedback (over PUCCH or PUSCH) if at least one PDSCH transmission was received using an antenna port between 7 and 15, and use a UTC for which the point reference signal corresponds to a common reference signal otherwise.

The UE or WTRU may determine the UTC to use for an uplink transmission based on the latest received indication of which UTC to use. Such indication may have been received from physical, MAC or RRC signaling.

For example, the UE or WTRU may determine the UTC based on the reception of digital control information on PDCCH, where at least one field of the digital control information indicates a UTC to use until another indication may be provided. In another example method, the UE or WTRU may determine the UTC based on the reception of a MAC control element, where at least one field of the MAC CE indicates a UTC to use until another indication may be provided.

In another example method, the UE or WTRU may determine the UTC based on the latest received Timing advance command (e.g. the UTC for which the latest TAC may be applicable to). The UE or WTRU may select the UTC for subsequent transmissions as a function of the reception of a TAC. In one or more embodiments, once the UE or WTRU may have determined to what UTC the received TAC may be applicable to, the UE or WTRU may select the concerned UTC for subsequent transmissions for the concerned channel, transmission type and/or serving cell or groups thereof.

For example, the UE or WTRU may transmit a SRS for a concerned serving cell (either from a periodic configuration or from an aperiodic request), and subsequently receive a MAC TAC CE for the concerned serving cell; the MAC TAC CE may include an indication of a UTC to which the TAC applies, and the UE or WTRU may use this UTC for subsequent transmission in the serving cell such as for PUSCH transmissions.

The UE or WTRU may select a UTC that may be in an activated state (or in some embodiments perhaps only for a serving cell that may be also in activated state). If one UTC (or in some embodiments perhaps only one UTC) may be in the activated state at the same time for a given serving cell, among other contemplated conditions, the UE or WTRU may select the activated UTC. Otherwise, if multiple UTC may be activated at the same time for a given serving cell, the UE or WTRU may additionally apply any of the methods described herein to select the UTC to perform the uplink transmission.

A UTC configuration for PRACH may include at least one of the following parameters: The initial transmit power preambleInitialReceivedTargetPower; The power ramping function and/or factor powerRampingStep; The maximum number of preamble transmission preambleTransMax; The transmit power for the cell e.g. Pcmax,c (and deltaPreambleMsg3); The preamble format based offset DELTA_PREAMBLE; Set of PRACH Resources (e.g. prach-ConfigIndex); Group of random access preambles, set of available preamble per group (e.g. sizeOfRA-PreamblesGroupA, numberOfRA-Preambles); If preamble group B exists, messagePowerOffsetGroupB and messageSizeGroupA; The RA Response window size; The maximum number of Msg3 HARQ transmissions; and/or The contention resolution timer.

For example, the UE or WTRU may perform a preamble transmission on the resources of a serving cell by first selecting a UTC according to one or more embodiments described above or below. In one or more embodiments, the UE or WTRU may select a UTC and/or how to perform the transmission of a preamble as a function of one or more of the following:

The type of preamble transmission, e.g. whether the preamble transmission may be for a contention-based random access (CBRA), a contention-free random access (CFRA), for initial access to a cell upon handover, for connection re-establishment, for a scheduling request (RA-SR) or for gaining uplink timing alignment; For example, the UE or WTRU may select a UTC that corresponds to a default UTC of the concerned serving cell (e.g. a UTC corresponding to a transmission to a macro cell) if the preamble transmission corresponds to a CBRA, or alternatively, upon preamble transmission for the initial access to a cell during a handover procedure, or as a further alternative, upon preamble transmission during a RRC connection re-establishment procedure. Alternatively, upon preamble transmission triggered by a scheduling request e.g., RA-SR. For example, the UE or WTRU may select a UTC that corresponds to a UTC for which the UE or WTRU does not have a valid uplink timing alignment (e.g. UTC-specific TAT may be expired), or as an alternative, for a preamble transmission for a SCell (or in some embodiments perhaps only for a preamble transmission for a SCell);

The trigger that initiated the transmission of a preamble, e.g. whether it may be network-initiated or UE or WTRU-initiated; For example, the UE or WTRU may select a UTC that corresponds to a default UTC of the concerned serving cell (e.g. a UTC corresponding to a transmission to a macro cell) if the preamble transmission may be autonomously initiated by the UE or WTRU e.g. corresponds to a RA-SR. For example, the UE or WTRU may select a UTC that corresponds to the currently active UTC for the concerned cell if the preamble transmission may be triggered by the reception of a PDCCH order (e.g. DCI format 1A) to perform a preamble transmission and/or a random access procedure. In one or more embodiments, this may be performed if (or in some embodiments perhaps only if) the PDCCH order indicates a preamble transmission on Scell, or in a further alternative, if (or in some embodiments perhaps only if) the preamble transmission may be for gaining timing advance, among other contemplated conditions;

The type of serving cell for which a preamble may be transmitted, e.g. whether the preamble transmission corresponds to a PCell or to a SCell of the UE or WTRU's configuration. For example, the UE or WTRU may select a UTC that corresponds to a default UTC of the concerned serving cell (e.g. a UTC corresponding to a transmission to a macro cell) if the preamble transmission may be for a PCell. For example, the UE or WTRU may select a UTC that corresponds to the currently active UTC for the concerned cell if the preamble transmission may be for a SCell;

An explicit indication that may be received inside control signaling e.g. in a PDCCH order such as a DCI format 1A. For example, the UE or WTRU may select the UTC indicated in the received control signaling, if any such indication may be present; and/or The currently activated UTC for the concerned cell. For example, the UE or WTRU may select (or in some embodiments may always select) the UTC that may be activated for the concerned cell.

The UE or WTRU may then identify the set or parameters applicable to concerned UTC. For example, for PRACH one or more, or each, UTC may be configured with different power-related parameters. For example, the power ramping function may be a function of the selected UTC. A UTC may thus be configured with a ramping that may be either slower or faster than e.g. the power ramping for a default UTC. Similarly, a UTC that may not be a default UTC for PRACH may be configured with fewer retransmission attempts. The UE or WTRU may then initiate the transmission of a preamble using the corresponding parameters. The UE or WTRU may select a group of preamble based on Pcmax,c and a PL estimate applicable to the concerned UTC, e.g. using reference signal that may be specific to the concerned UTC.

The reference signal used for deriving power control parameters for a preamble transmission may include at least one of the following example reference signals.

For example, a cell-specific CRS may be used as the default reference signal (or in some embodiments perhaps always for a given cell or one or more, or all, cells). For example, the UE or WTRU may determine that the UTC used for preamble transmission may be a UTC configured with a CRS. In one or more embodiments, his may be the default UTC for the concerned cell. For example, the UE or WTRU may determine that the reference signal used for preamble transmission for a concerned cell may be a cell-specific reference signal (or in some embodiments perhaps may always be so), independently of the UTC selected for preamble transmission. In this case, the initial transmit power and/or the power ramping parameters may be configured for the selected UTC such that it compensate for the different power levels between the selected UTC (e.g. a UTC corresponding to a RRH or a pico cell) and a default UTC (e.g. a UTC corresponding to a macro cell). The network may determine what preamble reception(s) to consider (e.g. if it successfully decode the preamble at a plurality of reception points) and respond accordingly, including possibly generating one timing advance command for one or more, or each, reception point.

Whether or not a cell-specific CRS may be used may be a function of a characteristic of the preamble transmission (e.g. for CBRA). When CRS may not be used, a UE or WTRU-specific RS and/or the RS configured for the UTC may be used; For example, the UE or WTRU may determine that the reference signal used for preamble transmission for a concerned cell may be a cell-specific reference signal, independently of the UTC selected for preamble transmission and/or of the currently active UTC, if the preamble transmission corresponds to a UE or WTRU-initiated preamble transmission and/or to a CBRA. Otherwise, the UE or WTRU may use the reference signal corresponding to the UTC selected for preamble transmission and/or of the currently active UTC.

Whether or not a cell-specific CRS may be used may be a function of a characteristic of the selected UTC; For example, if the selected UTC corresponds to a default UTC, cell-specific CRS may be used.

The RS to use may be explicitly indicated. For example, the UE or WTRU may receive control signaling with an explicit indication of what UTC and/or reference signal to use for the corresponding preamble transmission, e.g. in a PDCCH order DCI format 1A.

The UE or WTRU may perform an initial preamble transmission on a PRACH resource applicable to the selected UTC for the concerned cell. Subsequently, the UE or WTRU may receive a random access response (RAR) message using a RA-RNTI for decoding control signaling on PDCCH, which RA-RNTI value may be a function of the selected UTC e.g. such that the RA-RNTI may unambiguously identify what time-frequency resource was used for the preamble transmission, and/or also for what UTC (or reception point) the preamble was received. The UE or WTRU may use reception of control signaling on RA-RNTI to determine to what UTC the RAR corresponds to. More generally, the UE or WTRU may determine (in some embodiments perhaps implicitly) to what UTC a DCI that may be successfully decoded with a given RNTI based on the said RNTI, e.g. a UTC may include a RNTI for the purpose of identifying downlink control signaling that corresponds to uplink transmissions (e.g. a grant, a TPC or a SRS request).

For example, the UE or WTRU may determine the RA-RNTI for a given UTC by including an explicit identifier of the concerned UTC, e.g. such that RA-RNTI=1+(index of first subframe of PRACH resource for transmitted preamble)+10*(index of PRACH in frequency domain)+(UTC identity). In one or more embodiments, the default UTC identity for a given serving cell may be 0.

If the UE or WTRU reaches the maximum number of preamble transmissions for a specific UTC, the UE or WTRU may perform at least one of the following: the UE or WTRU may trigger a RACH failure (e.g. MAC indicates radio link problems to upper layers) if (or in some embodiments perhaps only if) the preamble transmissions correspond to a UTC configured as the default UTC for the concerned cell (e.g. a macro cell); in one or more embodiments, if (or in some embodiments perhaps only if) the concerned cell may be a PCell of the UE or WTRU's configuration, the UE or WTRU may deactivate the concerned UTC; and/or the UE or WTRU may initiate preamble transmission (e.g. a RACH procedure) on a UTC configured as a default UTC for a concerned serving cell (or in one or more embodiments, perhaps only for the default UTC corresponding to the PCell).

Embodiments recognize that in LTE R8 and later, uplink HARQ processes may be synchronous. In one or more embodiments, the UE or WTRU may perform autonomous uplink retransmission for an ongoing HARQ process (e.g. for a HARQ process for which the last feedback received for the process may be a HARQ negative acknowledgement, or not feedback was received), until the transmission may be either successful and/or until the HARQ process may be stopped (e.g. by the reception of a HARQ acknowledgement). The UE or WTRU may additionally receive a grant for a retransmission for an ongoing HARQ process to adapt a retransmission, e.g. in terms of MCS and/or what PRB(s) may be used for the retransmission.

When the UE or WTRU performs a non-adaptive synchronous HARQ retransmission for an ongoing HARQ process, among other conditions, the UE or WTRU may select what UTC to apply for the concerned transmission according to at least one of the following: the UE or WTRU may use the same UTC as for the initial transmission for the concerned HARQ process; for example, the UE or WTRU may apply (or in some embodiments may always apply) the UTC that it applied for the initial transmission for this HARQ process; in some embodiments if the previous transmission was a retransmission, and if the retransmission was dynamically scheduled (e.g. it was not a UE or WTRU-autonomous retransmission) such that a different UTC was used, the UE or WTRU reverts to the UTC of the initial transmission for this HARQ process for any subsequent UE or WTRU-autonomous retransmission until a new (e.g., fresh or updated) transmission may be initiated for this HARQ process; The UE or WTRU may use the same UTC as for the previous transmission for the concerned HARQ process; For example, the UE or WTRU applies the UTC that it applied for the previous transmission for this HARQ process; the implication of this may be that if the previous transmission was a retransmission, and if the retransmission was dynamically scheduled (e.g. it was not a UE or WTRU-autonomous retransmission) such that a different UTC was used, the UE or WTRU may apply a different UTC than that of the initial transmission for this HARQ process; The UE or WTRU may use the default UTC for the concerned serving cell; For example, for any HARQ process, the UE or WTRU may apply the default UTC when it performs a non-adaptive retransmission; The UE or WTRU may use the currently active UTC for the concerned serving cell. For example, for any HARQ process, the UE or WTRU may apply the currently active UTC when it performs a non-adaptive retransmission, if one UTC may be active in a given subframe (or in some embodiment perhaps only if one UTC may be so active), among other contemplated conditions.

A UE or WTRU may be configured with subsets of subframes where for different subsets it may use different UTCs. One or more embodiments contemplate that for one or more, or each, subset of subframes and one or more, or each, UTC, a different PCMAX,c may be configured. In such a scenario, it may be difficult to achieve efficient non-adaptive retransmission. Therefore, non-adaptive retransmission may be enhanced such that it may occur (or on some embodiments perhaps may only occur) in the same subset of subframes as the original transmission. In such scenarios, the UE or WTRU may maintain (or in some embodiments may need or be useful to maintain) separate HARQ processes based on the subframe subset of the original transmission.

When the UE or WTRU receives control signaling for dynamic scheduling of a HARQ retransmission for an ongoing HARQ process, the UE or WTRU may select what UTC to apply for the concerned transmission according to at least one of the following: The UE or WTRU may use any of the methods for selection of a UTC described in paragraphs above and below; The UE or WTRU may use the same UTC as for the initial transmission for the concerned HARQ process; For example, unless another UTC selection method may be applicable (e.g. the UTC may be explicitly signaled in the control signaling), the UE or WTRU may apply the same UTC as for the initial transmission for this HARQ process. The UE or WTRU may use the same UTC as for the previous transmission for the concerned HARQ process; For example, unless another UTC selection method may be applicable (e.g. the UTC may be explicitly signaled in the control signaling), the UE or WTRU may apply the same UTC as for the previous transmission for this HARQ process. The UE or WTRU may use the default UTC for the concerned serving cell; For example, unless another UTC selection method may be applicable (e.g. the UTC may be explicitly signaled in the control signaling), the UE or WTRU may apply the default UTC when it performs the retransmission; The UE or WTRU may use the currently active UTC for the concerned serving cell; For example, unless another UTC selection method may be applicable (e.g. the UTC may be explicitly signaled in the control signaling), the UE or WTRU may apply the currently active UTC when it performs the retransmission if (or in some embodiments perhaps only if) one UTC may be active in a given subframe, among other contemplated conditions.

The UE or WTRU may receive a Timing Advance Command (TAC) in a MAC CE or in a RAR message during the random access procedure. The UE or WTRU may determine to what UTC (e.g. what TA accumulator) the TAC applies according to at least one of the following methods:

Explicitly signaled identifier in the message that contains the TAC (e.g. MAC TAC CE, RAR): The message that contains the TAC includes an identity of the concerned UTC (and possibly also the concerned serving cell) and/or of the concerned UTC group e.g. in a TA Group; For example, the UE or WTRU may receive a MAC TAC CE on the downlink of any serving cell; the UE or WTRU may determine based on a field (or based on a bitmap which bit order may indicate such identity) that contains an identity to what UTC the TAC may be applicable to.

Explicitly signaled identifier in the control signaling that schedules the message with the TAC: The downlink control information that schedules the TAC may include an identity of the concerned serving cell, UTC (and possibly also the concerned serving cell) and/or of the concerned UTC group e.g. in a TA Group; For example, the UE or WTRU may receive a PDCCH DCI scheduling a PDSCH using a cell identification field. The CIF may indicate a serving cell, in which case other methods may be used to determine to what UTC the TAC may be applicable to e.g. the activated UTC for the indicated cell. Alternatively, the CIF may indicate a UTC.

Association between an uplink transmission and the received TAC: The received TAC may be associated to an uplink transmission that was previously performed by the UE or WTRU. For example, the UE or WTRU may receive a TAC inside a RAR that corresponds to a previous preamble transmission. The UE or WTRU may determine to what preamble transmission the RAR corresponds to, and may determine that the TAC may be applicable to the UTC corresponding to the said preamble transmission. Alternatively, a RNTI of the UE or WTRU may be used, e.g. a RA-RNTI which value may be a function of the UTC applicable for the transmission of the preamble. Alternatively, this may be based on the PtRS used when demodulating the downlink transmission that corresponds to the TAC.

Current activated UTC for the concerned serving cell or TA group: The TAC may be associated to the UTC that is activated at the time of reception of the transmission that contains the TAC.

In one or more embodiments, the UTC activated for the serving cell and/or TA group explicitly indicated in the message that may contain the TAC (e.g. a MAC TAC CE). In one or more embodiments, for a given serving cell and/or a given group of cells and/or transmission channels e.g. cells and/or PUSCH channels configured with the same UTC and/or TA group. In some embodiments, once the UE or WTRU may have determined to what UTC the received TAC may be applicable to, the UE or WTRU may change the activation state of the concerned TAC to "activated". In one or more embodiments, any other UTC of the concerned channel, transmission type and/or serving cell may be deactivated, if at most one UTC may be activated at any time for the concerned channel, transmission type and/or serving cell. In one or more embodiments, the UE or WTRU may select the concerned UTC for subsequent transmissions for the concerned channel, transmission type and/or serving cell.

The UE or WTRU may trigger and/or initiate the transmission of a power headroom report (PHR) according to at least one of the following:
  The path loss estimate for a given UTC changes by more than a threshold. The UE or WTRU may perform path loss estimation based on a UTC-specific reference signal. The concerned UTC may be a default UTC for the concerned serving cell. Alternatively, it may be a UTC that may be in activated state. The threshold may be configured for one or more, or each, UTC. Alternatively, it may be a threshold applicable to a group of UTC, either based on explicit grouping information received from the network or for the concerned serving cell. The UE or WTRU may trigger a PHR report when the corresponding PL estimate changes by a threshold; and/or
  Configuration, activation and/or change in activation state for a given UTC. The UE or WTRU may trigger a PHR report when the activation state of a UTC changes. In one embodiment, this may be done upon activation of a UTC. In an alternative embodiment, this may be done upon activation from explicit signaling received by the UE or WTRU. In yet a further embodiment, this may be done upon activation that changes the state from deactivated to activated.

The UE or WTRU may include at least one of the following in a PHR:
  The UE or WTRU may include a PHR value for one or more, or all, configured UTC. For example, the UE or WTRU may report a plurality of PH values, including PH for a configured but deactivated UTC;
  The UE or WTRU may include a PHR value for one or more, or all, activated UTC. For example, the UE or WTRU may report a plurality of PH values, one for one or more, or each, configured and activated UTC; and/or
  The UE or WTRU may include a PHR value for the selected UTC in the subframe in which it performs an uplink transmission that includes one or more PHR(s). For example, the UE or WTRU may report a plurality of PH values, one for one or more, or each, UTC corresponding to a serving cell for which the UE or WTRU performs an uplink transmission.

For example, for any of the above and for a UTC for which no uplink transmission takes place in the subframe in which the UE or WTRU performs an uplink transmission that includes one or more PHR(s), the UE or WTRU may report a PH value by including a value calculated based on specific parameters for a transmission in that subframe although a transmission for the corresponding UTC does not take place (e.g. a virtual PHR). Multiple PH values may thus be reported for a given serving cell configured with a plurality of UTC.

In one or more embodiments, a UE or WTRU may be configured with multiple subframe subsets. For one or more, or each, subframe subset, the UE or WTRU may be required to use different transmission powers. This may require different subframe subsets to be configured with different PCMAX,c. In such a method, the UE or WTRU may be configured with different UTC for one or more, or each, subframe subsets. Therefore for one or more, or each, UTC, the UE or WTRU may find it useful to report PHR based on UTC-specific power control parameters. In one or more embodiments, the same UTC may be used for a specific physical channel and/or transmission type over one or more, or all, the different subframe subsets. In such a case, a UE or WTRU may have multiple power control parameters for one or more, or each, UTC, with one or more, or each, subframe subset having a pre-configured set of power control parameters. Therefore, the UE or WTRU may report multiple PHR values for one or more, or each, UTC; with one or more, or each, PHR value corresponding to a subframe subset, (and hence a corresponding set of transmission power parameters). In such a method, the UE or WTRU may include a subframe subset identifier in its PHR report. In one or more embodiments, a PHR report may be valid for the subset of subframes within which it may be transmitted (or in some embodiments perhaps only valid for such a subset). In one or more embodiments, one or more, or each, subset of subframes may have specific PHR reporting instances tied to them. These PHR reporting instances may not be in the subset of subframes.

The UE or WTRU may associate a UTC with an activation state that indicates whether the UTC may be activated or deactivated. The activation state may be used to select the UTC applicable to a given uplink transmission. This activation state may be independent from the activation state of the serving cells, given that a PCell cannot be deactivated. In one or more embodiments, deactivation of a UTC may thus be applicable to a PCell configured with a plurality of UTC (or in some embodiments perhaps only applicable to such a PSCell). Alternatively, this state may be applicable to any configured UTC.

The UE or WTRU may receive control signaling that activates the use of carrier segments for one of more serving cells of the UE or WTRU's configuration. The control signaling may include at least one of the following: layer 1 signaling; layer 2 signaling; layer 3 signaling; UE or WTRU-autonomous activation.

Layer 1 signaling: The UE or WTRU may receive a DCI format on PDCCH that indicates activation of a UTC for one or more serving cells. In some embodiments, the indication may be according to at least one of the following: The UE or WTRU successfully decodes the DCI format using a configured RNTI, e.g. a UTC-RNTI; The UE or WTRU may determine that a DCI format may be of a certain type and/or includes an explicit indication e.g. a field and/or flag; and/or the UE or WTRU may receive a DCI format that indicates a grant for an uplink transmission (e.g. for PUSCH), a request for SRS transmission, or a TPC that may be applicable to a specific UTC.

The control signaling may activate and/or change the activation state for the UTC to which said DCI format may be applicable. In one or more embodiments, the DCI format may include an identity of the UTC to which the control signaling applies. Alternatively, the control signaling may be applied to UTC of a concerned serving cell in sequence. For example, if a serving cell may be configured with two UTC, where a first UTC may be active and a second UTC may be inactive, the control signaling may at once deactivate the first UTC and activate the second UTC.

The UE or WTRU may transmit a HARQ ACK feedback to acknowledge the reception of the said DCI interpreted as the activation command. For example, for DCI signaling received in subframe n, the UE or WTRU may transmit HARQ ACK on an uplink channel in subframe n+k, where k may represent a UE or WTRU processing delay e.g., k=4 subframes.

Layer 2 signaling: The UE or WTRU may receive a MAC Control Element (CE) that indicates activation of at least one UTC for one or more serving cell(s) of the UE or WTRU's configuration. In one or more embodiments, the MAC CE may be received on the PDSCH of any serving cell of the UE or WTRU's configuration. In one or more embodiments, the UE or WTRU activates the UTC corresponding to the serving cell based on an explicit indication (e.g. a bitmap, or a transmissionContextId) included in the MAC CE. Alternatively, the UE or WTRU may activate the UTC corresponding to the serving cell on which PDSCH the MAC CE was received, by activating the next UTC in a sequence. In one or more embodiments, the MAC CE includes a configuration of the resource allocation to use for the corresponding UTC.

In another example embodiment, the UE or WTRU may change activation state based on reception of a TAC. The UE or WTRU may change the activation state of a UTC as a function of the reception of a TAC. In one or more embodiments, once the UE or WTRU may have determined to what UTC the received TAC may be applicable to, the UE or WTRU may change the activation state of the concerned TAC to "activated". In one or more embodiments, any other UTC of the concerned channel, transmission type and/or serving cell may be deactivated, if at most one UTC may be activated at any time for the concerned channel, transmission type and/or serving cell or groups thereof. For example, the UE or WTRU may transmit a SRS for a concerned serving cell (either from a periodic configuration or from an aperiodic request), and subsequently receive a MAC TAC CE for the concerned serving cell; the MAC TAC CE may include an indication of a UTC to which the TAC applies, and the UE or WTRU may change the activation state of the concerned UTC to "activated".

Layer 3 signaling: The UE or WTRU may receive a configuration for one or more UTC (s), upon which the default UTC may be in the activated state.

UE or WTRU-autonomous activation (e.g. implicit): The UE or WTRU may measure signal reception quality for a given UTC. In one embodiment, this may be done using RSRP measurements. In an alternative embodiment, this may be done using a UTC-specific reference signal. When the UE or WTRU detects that the corresponding measurement may be above a specific threshold, the UE or WTRU may activate the concerned UTC. In one or more embodiments, the threshold may be configured by RRC.

In one or more embodiments, the UE or WTRU may additionally deactivate any other UTC configured for the concerned serving cell, such that a single UTC may be activated at any given time. In some embodiments, the activation of the use of a UTC for a given serving cell may be applied immediately (e.g. in case of layer 1 signaling) or in one or more embodiments after a fixed delay of e.g. k subframes (e.g. in case of layer 2/3 signaling). For example, for layer 2 signaling received at subframe n, the UE or WTRU may consider the UTC in the activated state from subframe n+k, where k may be equal to 8 subframes; alternatively, in the subframe after the transmission of a HARQ ACK for the transport block in which the MAC CE was received. In one or more embodiments, the UE or WTRU may further delay the start of the use of a UTC for a given ongoing HARQ process until the HARQ process successfully completes and/or until the control signaling received indicates a new (e.g., fresh or updated) data transmission (e.g. from the New Data Indicator—NDI field in the DCI format).

When the UE or WTRU receives control signaling that activates one or more UTC, the UE or WTRU may consider the first assignment for the corresponding HARQ buffer subsequent to the subframe in which the activation state changes as a new (e.g., fresh or updated) transmission, for a HARQ process that corresponds to a serving cell for which the UTC used may be changed. For example, the UE or WTRU may perform any (or at least part) of the above in the subframe in which the UE or WTRU receives control signaling. Alternatively, the UE or WTRU may perform at least part of the above in the subframe in which the UE or WTRU first may use the activated UTC (e.g. in the subframe of the activation). In yet another alternative, the UE or WTRU may perform at least part of the one or more aforementioned embodiments for control signaling that changes the activation state of a UTC to the activated state (or in some embodiments perhaps for only such control signaling).

If a UE or WTRU may be configured with a plurality of UTC for a given serving cell, and if multiple UTC may be activated in a given subframe, the UE or WTRU may perform additional selection process to determine what UTC to use for an uplink transmission on the concerned serving cell. The UE or WTRU may additionally consider that a UTC may not be used, if the corresponding SCell may be in the deactivated state. In one or more embodiments, one or more, or all, UTC configured for a given SCell may be deactivated when the concerned SCell may be in the deactivated state.

The UE or WTRU may receive control signaling that deactivates the use of one or more UTC for a given serving cell of the UE or WTRU's configuration. The control signaling may include at least one of the following: layer 1 signaling; layer 2 signaling; layer 3 signaling.

Layer 1 signaling: The UE or WTRU may receive a DCI format on PDCCH that indicates deactivation of one or more UTC(s). In some embodiments, the indication may be according to at least one of the following: The UE or WTRU successfully decodes the DCI format using a configured RNTI, e.g. a CS-RNTI; The UE or WTRU may determine that a DCI format may be of a certain type and/or includes an explicit indication e.g. a field and/or flag; The UE or WTRU receives an indication to activate a UTC different than the UTC currently activated for the concerned serving cell, and a single UTC may be in the activated state at any given time.

The control signaling may deactivate and/or change the activation state for the UTC to which said DCI format may be applicable. In one or more embodiments, the DCI format may include an identity of the UTC to which the control signaling applies. Alternatively, the control signaling may be applied to UTC of a concerned serving cell in sequence. For example, if a serving cell may be configured with two UTC, where a first UTC may be inactive and a second UTC may be active, the control signaling may at once activate the first UTC and deactivate the second UTC.

The UE or WTRU may transmit a HARQ ACK feedback to acknowledge the reception of the said DCI interpreted as the deactivation command. For example, for DCI signaling received in subframe n, the UE or WTRU may transmit HARQ ACK on an uplink channel in subframe n+k, where k may represent a UE or WTRU processing delay e.g., k=4 subframes.

Layer 2 signaling: The UE or WTRU may receive a MAC Control Element (CE) that indicates deactivation of at least one UTC for one or more serving cell(s). In one or more embodiments, the MAC CE may be received on the PDSCH of any serving cell of the UE or WTRU's configuration. In one or more embodiments, the UE or WTRU deactivates the UTC corresponding to the serving cell based on an explicit indication (e.g. a bitmap, or a transmissionContextId) included in the MAC CE. Alternatively, the UE or WTRU may deactivate the UTC corresponding to the serving cell on which PDSCH the MAC CE was received, by activating the next UTC in a sequence. In one or more embodiments, the MAC CE may include a configuration of the resource allocation to use for the corresponding UTC.

In one embodiment, the UE or WTRU may deactivate a UTC following the reception of a TAC that activates another UTC for the concerned channel, transmission type and/or serving cell or groups thereof. In some embodiments, this may be done if (or in some embodiments perhaps only if) a single UTC may be in the active state at any given time, among other contemplated conditions.

Layer 3 signaling: The UE or WTRU may receive a configuration that modifies and/or remove one or more UTC(s) for one or more serving cell(s), upon which the concerned UTC may be deactivated (e.g. the UE or WTRU reverts to a default UTC of the concerned serving cell). The UE or WTRU may implicitly deactivate a UTC, and in one or more embodiments may revert to a default UTC, according to at least one of the following:

The time since the last transmission (or reception of control signaling applicable to a transmission e.g. either scheduling on PDCCH e.g. a grant and/or a DL HARQ feedback e.g. a HARQ acknowledgement) that used the concerned UTC may be longer that a specific value (possibly configured) (for example, a tc-Deactivation-Timer may be used for one or more, or each, serving cell configured with a plurality of UTC(s);

The Timing Advance for the concerned UTC and/or serving cell may be no longer valid e.g. the Timing Alignment Timer has expired;

The UE or WTRU receives control signaling that modifies the configuration of the UTC for the concerned serving cell, in one or more embodiments, if (or in some embodiments perhaps only if) the UTC may not be the default UTC for the serving cell;

A HARQ process that may use a specific UTC has reached maximum number of HARQ transmissions (e.g. a HARQ failure) (in one or more embodiments, if the concerned UTC may be a default UTC, the UE or WTRU may determine that the uplink experiences some form of radio link failure e.g. UL RLF;

The UE or WTRU may determine that transmissions using the concerned UTC may be experiencing radio link failure, e.g. upon the UE or WTRU reaching the maximum number of preamble transmissions, upon failure of DL timing and/or of DL PL reference for the concerned UTC. In one or more embodiments, if the concerned UTC may be a default UTC, the UE or WTRU may determine that the uplink experiences some form of radio link failure e.g. UL RLF; and/or Implicit deactivation of one or more, or all, configured UTC(s) for a given serving cell when the SCell may be deactivated.

When the UE or WTRU receives control signaling that deactivates one or more UTC(s) for a given serving cell, the UE or WTRU may perform at least one of the following: For a HARQ process for which a UTC may have been used, the UE or WTRU may consider the first assignment for the corresponding HARQ buffer subsequent to the subframe in which the activation state changes as a new (e.g., fresh or updated) transmission; The UE or WTRU may revert to the default UTC for other procedures such as CQI reporting, SRS transmissions if applicable. Similar delay as for the activation may be applied for the deactivation of a UTC. In one embodiment, this may be done for a deactivation using explicit signaling.

In order to determine connectivity for a UTC, the UE or WTRU may monitor the radio link conditions of a radio link associated to a UTC, referred to hereafter as RLM for a UTC. The connectivity to a transmission point may be further determined according to the RACH procedure status. If the RACH procedures fail or if the timing alignment to a give UTC expires, the UE or WTRU may establish that the connectivity to a UTC has been lost. In one or more embodiments, the UE or WTRU may determine that connectivity to a UTC does not exist if the difference in path loss between this UTC and a second UTC may be higher than a threshold.

The radio link monitoring of a UTC may be based on a downlink-specific reference signal that may be associated to the given UTC such as the PtRS. The reference signal may correspond to a CRS if such reference signal exists for the given UTC or it may correspond to at least one of the reference signals configured as PtRS for the corresponding UTC.

For one or more, or each, determined UTC, as described below the UE or WTRU may monitor and estimate the downlink radio link quality and compare it to the thresholds Qout and Qin. The thresholds associated to radio link monitoring (e.g. Qout/Qin, T310, N310) may be UTC specific or one common set of parameters may be configured and used to evaluate radio link failure in the UE or WTRU.

The UE or WTRU may determine for which UTCs to monitor radio link quality or connectivity state according to at least one of the following: monitoring for one or more, or all, configured UTCs may be performed; monitoring for one or more, or all, active UTCs may be performed; monitoring may be performed for at least one UTC configured to be used for transmission of a specific subset of channels/signals. For instance, RLM may be performed for the UTC used to transmit a PUCCH. In another example the UTC for PUSCH may be monitored or that of the SRS. In yet another example, RLM may be performed for the UTC to be used for PUCCH/PUSCH transmissions; monitoring may be performed for a configured default UTC; monitoring may be performed on the best link determined according to at least one of the following measurements: Channel quality (CQI) measurement, RSRP/RSRQ for the downlink channel associated to the given UTC, or The UTC with largest PHR value (e.g., if PHR may be determined for one or more, or all, configured/active UTCs)); monitoring may be performed for a configured default UTC and another UTC determined according to any of the methods described above.

For one or more, or each, determined and selected UTC, RLM may be performed on the associated downlink reference point. The quality of one or more, or each, downlink signal may be independently monitored and the determination of a radio link failure on a specific link may be independently determined and declared. When referred to hereafter a Radio Link Failure in a UTC may be referred to as one of the conditions to determine that the connectivity to a UTC may be lost.

In an alternate embodiment the radio link monitoring/failure determination may be jointly performed for one or more, or all, monitored UTCs. More specifically, the physical layer downlink quality of one or more, or all, sets may be independently monitored but the UE or WTRU may report (or in some embodiments may only report) an out-of-synch to higher layers if, among other contemplated conditions, the quality of one or more, or all, monitored sets may be below Qout threshold, otherwise an in-synch may be reported.

Upon determination of loss of connectivity (e.g. either RLF, out-of-synch, RACH failure, or a certain path loss differential may be detected) in at least one UTC the UE or WTRU may perform one or a combination of the following actions: stop UL transmission to the associated UTC; consider or set the activation state of the associated UTC to deactivated; consider the TAT as expired for the UTC; remove the configuration of the UTC; or the UE or WTRU may stop transmitting the corresponding channels using the failed UTC and may wait for an explicit order or grant to start using a new (e.g., fresh or updated) UTC for the configured channel, where the UE or WTRU may start monitoring the downlink of the default UTC or the sent in which it has fallen back as described below.

The UE or WTRU may further choose to fall back to a different UTC for the purpose of transmitting one or a subset of the transmission channels or signal and/or for the purpose of downlink monitoring of the PDCCH and other configured downlink signals. The UTC to fall back on may be determined using at least one of the following: 1) The default UTC may be chosen as a fallback UTC; or 2) The next available or activated UTC may be determined to be the new (e.g., fresh or updated) UTC. If more than one activated/configured sets may be available the UE or WTRU may chose: i) The UTC that provides the best downlink channel quality; ii) The first available UTC, wherein the order of UTC may be according to the order in which they were configured in the RRC message or according to an explicit index provided in the configuration message; or iii) The UTC in which another channels may be configured to perform transmissions may be chosen. For example, the UTC in which PUCCH may be transmitted may be chosen as the next UTC to perform other UL transmissions.

In one or more embodiments, the new (e.g., fresh or updated) selected UTC may be used by the UE or WTRU to establish a radio link connection and communicate/transmit PUCCH or PUSCH to the eNB. The UE or WTRU may perform one or a combination of the following actions on the new (e.g., fresh or updated) selected UTC: 1) Start a preamble transmission using the transmission characteristics/parameters of the new (e.g., fresh or updated) selected UTC; 2) Trigger a scheduling request on PUCCH using selected set of transmission parameters and resources. In one or more embodiments, the actions may be dependent on the UE or WTRU having a valid TAT or the UTC may be part of the same group as the failed UTC; or 3) The UE or WTRU may indicate that RLF or that a loss of connectivity occurred for at least one transmission point to the network by sending a message to the network indicating at least one of, the reason for the message (e.g. UTC failure), the failure reason (e.g. RLF, RACH, TAT expiry, etc), the failed UTC identity, UTC identity of the new (e.g., fresh or updated) selected set. The message may transmitted via RRC signaling, a MAC control element, or alternatively the UE or WTRU starts using the new (e.g., fresh or updated) UTC characteristics. The change of UTC characteristics or resource index may act as an implicit indication that the old UTC has failed and the UE or WTRU may be using a new (e.g., fresh or updated) UTC.

In one or more embodiments, if a default UTC fails, among other contemplated conditions, the UE or WTRU may immediately declare RLF and/or may start the RRC re-establishment techniques, and in some embodiments may do so regardless of the connectivity status of the other non-default UTCs.

In view of the description herein and the FIGS. 1-9, embodiments contemplate one or more techniques and/or WTRU (or UE) configurations that may include obtaining characteristics derived from one of multiple Uplink Transmission Contexts (UTC) and/or transmitting from a WTRU (or UE) based at least in part on the characteristics. In one or more embodiments the characteristics may correspond to a certain intended reception point. The intended reception point may operate on the same frequency. In some embodiments the UTC may be characterized by at least one Point Reference Signal. The contemplated techniques and/or WTRU configurations may be such that the UTC may be characterized by at least one configuration parameter and/or state variable. In some embodiments, the characteristics may include a set of one or more parameters including, but not limited to, parameters of a WTRU's configuration including semi-static parameters configured by radio resource controller (RRC) including a maximum transmission power that may be used to determine a transmission power for a transmission for a concerned UTC.

The contemplated techniques and/or WTRU configurations may be such that the characteristics may include a set of one or more properties including, but not limited to, properties derived from a WTRU's configuration including a downlink (DL) path loss and/or timing reference derived from a grouping function, from a procedure performed by the UE such as a DL path loss estimate derived from a DL path loss reference used to determine a transmission power for a transmission for a concerned UTC.

The contemplated techniques and/or WTRU configurations may be such that the characteristics may include a set of one or more variables including state variables including an activated/deactivated UTC, and/or timers including a timer related to the validity of a timing advance value.

The contemplated techniques and/or WTRU configurations may be such that the characteristics may include one or more of: an uplink frequency and/or a bandwidth for the said transmission; a transmission power to apply to the said transmission; a timing advance (or timing alignment) to apply to the said transmission; at least one property that may be specific to the transmitted channel or signal, including (i) a property of at least one demodulation reference signal including cyclic shift, sequence group, antenna port, for physical uplink shared channel (PUSCH) or sounding reference signal (SRS) periodic or SRS aperiodic; (ii) a transmission format and/or resource; and/or (iii) a property of at least one random access preamble.

Embodiments contemplate techniques and/or WTRU configurations for selecting Uplink Transmission Contexts for different types of transmissions including physical uplink control channel (PUCCH), PUSCH, random access channel (RACH), sounding reference signal (SRS). The contemplated techniques and/or WTRU configurations may be such that the selecting may be based at least in part on an antenna port used to transmit downlink control signaling and/or the selecting based at least in part on downlink measurements.

The contemplated techniques and/or WTRU configurations may include triggering a power headroom report (PHR) when a path loss estimate applicable to UTC may change by more than a threshold.

Embodiments contemplate techniques and/or WTRU configurations that may include determining an activation state of a UTC; and/or detecting a trigger for at least one of an activation or de-activation. The contemplated techniques and/or WTRU configurations may such that the trigger may be based on a received signal quality.

The contemplated techniques and/or WTRU configurations may include determining connectivity for a UTC based at least in part on one or more of: (i) measurements on point reference signal, (ii) RACH procedure success/failure and (iii) actions upon detection of loss of connectivity such as fallback to default UTC and/or a deactivation of UTC.

The contemplated techniques and/or WTRU configurations may include determining at least one characteristic of the following transmission characteristics: an uplink frequency and/or a bandwidth for the said transmission; a transmission power to apply to the said transmission; a timing advance (or timing alignment) to apply to the said transmission; and/or at least one property that may be specific to the transmitted channel or signal, such as: (i) a property of at least one demodulation reference signal (such as a cyclic shift, sequence group, antenna port); (ii) a transmission format and/or resource; and/or (iii) a property of at least one random access preamble.

The contemplated techniques and/or WTRU configurations may include receiving a Timing Advance Command (TAC) in a medium access channel (MAC) control element (CE) and/or in a random access response (RAR) message during the random access procedure; and/or determining to what UTC the TAC applies. The contemplated techniques and/or WTRU configurations may be such that the UTC may be determined according to at least one of the following methods: (i) explicitly signaled identifier in the message that contains the TAC (e.g. MAC TAC CE, RAR; (ii) explicitly signaled identifier in the control signaling that schedules the message with the TAC; (iii) association between an uplink transmission and the received TAC; and/or (iv) current activated UTC for a concerned serving cell or TA group.

The contemplated techniques and/or WTRU configurations may include triggering and/or initiating a transmission of a power headroom report (PHR) at a WTRU according to at least one of the following: (i) the path loss estimate for a given UTC changes by more than a threshold; and/or (ii) configuration, activation and/or change in activation state for a given UTC. The contemplated techniques and/or WTRU configurations may be such that the WTRU may trigger a power headroom (PHR) report when the activation state of a UTC changes including either upon activation of a UTC and/or upon activation from explicit signaling received by the WTRU or upon activation that changes the state from deactivated to activated.

The contemplated techniques and/or WTRU configurations may be such that the PHR may include at least one of the following: (i) a PHR value for one or more, or all, configured UTC; (ii) a PHR value for one or more, or all, activated UTC; (iii) a PHR value for the selected UTC in the subframe in which it performs an uplink transmission that may include one or more PHR(s).

The contemplated techniques and/or WTRU configurations may include receiving control signaling that may activate the use of carrier segments for one of more serving cells of the WTRU's configuration. The contemplated techniques and/or WTRU configurations may be such that the control signaling may include at least one of the following: layer 1 signaling; layer 2 signaling; layer 3 signaling; and/or a UE-autonomous activation. The contemplated techniques and/or WTRU configurations may be such that the Layer 1 signaling may include receiving a DCI format on physical downlink control channel (PDCCH) that may indicate activation of a UTC for one or more serving cells.

The contemplated techniques and/or WTRU configurations may be such that the indication may be according to at least one of the following: the WTRU successfully decodes the DCI format using a configured radio network temporary identifier (RNTI) including a UTC-RNTI; the WTRU may determine that a DCI format may be of a certain type and/or includes an explicit indication including a field and/or flag; and/or the WTRU may receive a DCI format that indicates a grant for an uplink transmission, a request for SRS transmission, or a TPC that may be applicable to a specific UTC.

The contemplated techniques and/or WTRU configurations may also include transmitting a hybrid automatic repeat request (HARM) acknowledgement (ACK) feedback to acknowledge the reception of the said DCI interpreted as the activation command. The contemplated techniques and/or WTRU configurations may be such that the Layer 2 signaling may include receiving a MAC Control Element (CE) that may indicate activation of at least one UTC for one or more serving cell(s) of the WTRU's configuration.

The contemplated techniques and/or WTRU configurations may include changing an activation state based on reception of a TAC at a UE. The contemplated techniques and/or WTRU configurations may include determining to what UTC the received TAC may be applicable, and/or changing the activation state of the concerned TAC to "activated". The contemplated techniques and/or WTRU configurations may also include deactivating one or more other UTC of the concerned channel, transmission type and/or serving cell. The contemplated techniques and/or WTRU configurations may be such that the Layer 3 signaling may include receiving a configuration for one or more UTC (s), upon which the default UTC may be in the activated state. The contemplated techniques and/or WTRU configurations may be such that the UE-autonomous activation includes measuring signal reception quality for a given UTC.

The contemplated techniques and/or WTRU configurations may include configuring a WTRU with a plurality of UTC for a given serving cell; and/or performing an additional selection process to determine what UTC to use for an uplink transmission on the concerned serving cell. The contemplated techniques and/or WTRU configurations may include selectively not using a UTC if the corresponding SCell may be in the deactivated state.

The contemplated techniques and/or WTRU configurations may include receiving control signaling at the WTRU that may deactivate the use of one or more UTC for a given serving cell of the WTRU's configuration. The contemplated techniques and/or WTRU configurations may be such that the control signaling may include at least one of the following: layer 1 signaling; layer 2 signaling; and/or layer 3 signaling.

The contemplated techniques and/or WTRU configurations may include receiving control signaling that may deactivate one or more UTC(s) for a given serving cell; performing at least one of the following: for a HARQ process for which a UTC may have been used, the WTRU may consider the first assignment for the corresponding HARQ buffer subsequent to the sub frame in which the activation state may change as a new (e.g., fresh or updated) transmission; and/or the WTRU may revert to the default UTC for other procedures such as channel quality indicator (CQI) reporting, SRS transmissions if applicable.

The contemplated techniques and/or WTRU configurations may include determining connectivity for a UTC by, at a WTRU monitoring the radio link conditions of a radio link associated to a UTC or according to the RACH procedure status, and/or according to a determined difference in path loss between this UTC and a second UTC may be higher than a threshold. The contemplated techniques and/or WTRU configurations may be such that the radio link monitoring of a UTC may be based at least in part on a downlink-specific reference signal that may be associated to the given UTC, such as the Point Reference Signal (PtRS). The contemplated techniques and/or WTRU configurations may be such that for one or more, or each, determined UTC, the WTRU may monitor and estimate the downlink radio link quality and/or compare it to thresholds Qout and Qin.

The contemplated techniques and/or WTRU configurations may include determining a loss of connectivity including a radio link failure (RLF), out-of-synch, RACH failure, or a certain path loss differential may be detected) in at least one UTC; performing one or a combination of the following actions stop UL transmission to the associated UTC; consider or set the activation state of the associated UTC to deactivated; consider the TAT as expired for the UTC; remove the configuration of the UTC; and/or the WTRU stops transmitting the corresponding channels using the failed UTC and waits for an explicit order or grant to start using a new (e.g., fresh or updated) UTC for the configured channel.

The contemplated techniques and/or WTRU configurations may include determining a UTC to fall back on using at least one of the following: choosing the default UTC; and/or choosing the next available or activated UTC. The contemplated techniques and/or WTRU configurations may be such that if more than one activated/configured sets may be available, the WTRU may choose one or more of: (i) the UTC that provides the best downlink channel quality, (ii) the first available UTC, wherein the order of UTC may be according to the order in which they were configured in the RRC message or according to an explicit index provided in the configuration message; and/or (iii) the UTC in which another channel may be configured to perform transmissions. The contemplated techniques and/or WTRU configurations may include using the new (e.g., fresh or updated) selected UTC by the WTRU to establish a radio link connection and communicate/transmit PUCCH or PUSCH to the eNB. The contemplated techniques and/or WTRU configurations may be such that the WTRU may perform one or more of the following actions on a new (e.g., fresh or updated) selected UTC:
starting a preamble transmission using the transmission characteristics/parameters of the new (e.g., fresh or updated) selected UTC; triggering a scheduling request on PUCCH using selected set of transmission parameters and resources; and/or indicating that RLF or that a loss of connectivity occurred for at least one transmission point to the network by sending a message to the network indicating at least one of, the reason for the message, the failure reason, the failed UTC identity, and/or UTC identity of the new (e.g., fresh or updated) selected set.

The contemplated techniques and/or WTRU configurations may include controlling power by one or more of the following: controlling the power of SRS in the absence of a PUSCH transmission; and/or controlling the power of a RACH preamble where a UTC may have a multiple point reference signals.

The contemplated techniques and/or WTRU configurations may include pre-compensating a correlation drift peak by applying a pre-compensation offset value on top of a planned cyclic shift setting when multiple UEs may be co-scheduled for uplink transmission. The contemplated techniques and/or WTRU configurations may be such that the pre-compensation offset value may be calculated in the reverse direction of the correlation peak drift. The contemplated techniques and/or WTRU configurations may be such that the WTRU may autonomously perform the CS compensation without involvement of the network operation. The contemplated techniques and/or WTRU configurations may be such that the additional dynamic signaling mechanism may be introduced to inform the WTRU of the pre-compensation offset value used by the other WTRUs under co-scheduling.

The contemplated techniques and/or WTRU configurations may be such that the pre-compensation offset value may be signaled as part of an uplink transmission context corresponding to properties of a certain potential destination point that may allow the network to indicate one of multiple pre-compensation offset values from an indicated uplink transmission context. The contemplated techniques and/or WTRU configurations may be such that the network may apply the pre-compensation offset value. The contemplated techniques and/or WTRU configurations may also include adding another layer of hopping that may be reference signal RS length dependent. The contemplated techniques and/or WTRU configurations may be such that the RS length dependent hopping may be combined into a group hopping pattern. The contemplated techniques and/or WTRU configurations may be such that the initial value for CS hopping may be decoupled and still cell-specific.

The contemplated techniques and/or WTRU configurations may be such that the CS hopping may be independently configured via higher layer signaling with a WTRU-specific adjustment. The contemplated techniques and/or WTRU configurations may be such that the WTRU-specific adjustment may be dynamically assigned in the most recent uplink-related downlink control information (DCI). The contemplated techniques and/or WTRU configurations may be such that the additional randomization may be performed over demodulation reference signal (DMRS) of different lengths. The contemplated techniques and/or WTRU configurations may include determining an initial value for cyclic shift hopping based on reinterpretation of cyclic shift field.

The contemplated techniques and/or WTRU configurations may include using different transmit power control (TPC) commands for aperiodic sounding reference signal (ASRS), periodic SRS (PSRS), and/or physical uplink shared channel (PUSCH). The contemplated techniques and/or WTRU configurations may be such that the PUSCH resource blocks (RBs) may be modified in view of dynamic PUSCH RB allocation. The contemplated techniques and/or WTRU configurations may be such that the one or more, or each, physical channel may have a TPC command chain.

The contemplated techniques and/or WTRU configurations may be such that the multiple TPC command chains may be used for one or more, or one or more, or each, configured physical channel. The contemplated techniques and/or WTRU configurations may be such that different UTC may share a subset of parameters for different SRS. The contemplated techniques and/or WTRU configurations may be such that some parameters linked to a physical channel or transmission type used by a UTC may be configured or transmitted by another UTC. The contemplated techniques and/or WTRU configurations may be such that an indication of UTC for which a configuration or parameter may apply may be in the transmission of the configuration or parameter. The contemplated techniques and/or WTRU configurations may be such that the ASRS, PSRS and/or PUSCH may maintain a TPC command chain. The contemplated techniques and/or WTRU configurations may be such that an ASRS trigger may include an information element which provides a TPC command.

The contemplated techniques and/or WTRU configurations may be such that the TPC command may be used for at least one of ASRS, PSRS, and/or PUSCH. The contemplated techniques and/or WTRU configurations may be such that a bitfield may be used to indicate which point the TPC command may be for. The contemplated techniques and/or WTRU configurations may be such that the bitfield may use a preconfigured mapping. The contemplated techniques and/or WTRU configurations may be such that a SRS Request Field may be used to indicate for what transmission type the TPC command may be to be used for. The contemplated techniques and/or WTRU configurations may be such that a PUSCH TPC command may include a bitfield which may indicate for which combination of transmission types a TPC command may be for. The contemplated techniques and/or WTRU configurations may be such that a DCI may be used to indicate TPC commands.

The contemplated techniques and/or WTRU configurations may be such that a linkage between different periods/offsets of the DCI and TPC command for different transmission types may be preconfigured at the WTRU. The contemplated techniques and/or WTRU configurations may be such that the multiple SRS for multiple UTC may serve different purposes. The contemplated techniques and/or WTRU configurations may be such that a frequency for which one or more, or one or more, or each, SRS is transmitted may be different. The contemplated techniques and/or WTRU configurations may be such that a linkage may exist between the frequency that TPC commands may be sent for an SRS and the frequency with which this SRS may be transmitted by the WTRU.

The contemplated techniques and/or WTRU configurations may be such that one or more, or one or more, or each, type of SRS or PUSCH may be preconfigured with a specific mapping of TPC command field value and correction value. The contemplated techniques and/or WTRU configurations may be such that the parameters used for the determination of the RBs used for PUSCH may be set to a first set of values in a first UTC and to a second set of values in a second UTC. The contemplated techniques and/or WTRU configurations may be such that an UTC, or at least one parameter associated with the UTC, may be determined based on a lowest control channel elements (CCE) index used to construct a physical downlink control channel (PDCCH) used for transmission of a corresponding downlink control indicator (DCI) assignment.

The contemplated techniques and/or WTRU configurations may be such that at least one of power settings parameters, TPC commands and/or SRS power control adjustment states for aperiodic SRS (ASRS) may correspond to the power settings parameters, TPC commands and/or SRS power control adjustment states of physical uplink control channel (PUCCH).

The contemplated techniques and/or WTRU configurations may be such that a power control adjustment state for SRS may be modified by reception of a TPC command in a downlink assignment. The contemplated techniques and/or WTRU configurations may be such that a value of an offset may be a function of a value of a SRS request field. The contemplated techniques and/or WTRU configurations may be such that a TPC command may be kept separate between the ASRS, periodic SRS (PSRS) and/or PUSCH, and on a value of the SRS request field used to trigger ASRS. The contemplated techniques and/or WTRU configurations may be such that a TPC field may be reinterpreted to indicate both a power control adjustment and an indication of whether the power control adjustment applies to at least one of ASRS, PSRS and/or PUSCH.

The contemplated techniques and/or WTRU configurations may be such that the TPC command may apply to PUSCH on a condition that the TPC command may be received as part of downlink control information (DCI) that may include an uplink grant, wherein a SRS request field indicates that ASRS may not be triggered. The contemplated techniques and/or WTRU configurations may be such that the TPC command may apply to ASRS on a condition that the TPC command may be received as part of a DCI that may include an uplink grant, wherein a SRS request field indicates that ASRS may be triggered. The contemplated techniques and/or WTRU configurations may be such that the TPC command may apply to PUSCH on a condition that the TPC command may be received as part of downlink control information (DCI) that may include an uplink grant, wherein a SRS request field may indicate that ASRS may not be triggered. The contemplated techniques and/or WTRU configurations may be such that the ASRS may be triggered with different values of the SRS request field that may maintain separate power control adjustment states.

The contemplated techniques and/or WTRU configurations may be such that a TPC command received as part of a DCI containing an uplink grant may apply to the ASRS triggered with the value of the SRS request field in the same DCI. The contemplated techniques and/or WTRU configurations may be such that the TPC command may apply to ASRS on a condition that the DCI may be such that the transmission of a transport block (in uplink) may be disabled. The contemplated techniques and/or WTRU configurations may be such that the applicability of the TPC command may depend on the DCI format in which it may be received. The contemplated techniques and/or WTRU configurations may be such that a TPC command received in DCI format 3 may apply to one or more of PUSCH, ASRS, and/or PSRS. The contemplated techniques and/or WTRU configurations may be such that a TPC command received in DCI format 4 may apply to ASRS.

The contemplated techniques and/or WTRU configurations may be such that the applicability of the TPC command may depend on the value of a radio network temporary identifier used to mask a cyclic redundancy check (CRC) of the DCI. The contemplated techniques and/or WTRU configurations may be such that on a condition that a CRC may be used in the encoding of the DCI for an uplink grant may be masked with a first RNTI, the UTC for the PUSCH transmission and associated DM-RS may correspond to a first UTC.

The contemplated techniques and/or WTRU configurations may be such that on a condition that a CRC used in the encoding of the DCI may be masked with a second RNTI, the UTC for the PUSCH transmission and associated DM-RS may correspond to a second UTC. The contemplated techniques and/or WTRU configurations may be such that the UTC used for a PUCCH transmission may be selected based on a physical resource block (PRB) in which the PUCCH transmission takes place. The contemplated techniques and/or WTRU configurations may be such that the UTC used for a PUCCH transmission may be set to a first UTC on a condition that the PRB belongs to a first set of PRB's, and to a second UTC on a condition that the PRB belongs to a second set of PRB's. The contemplated techniques and/or WTRU configurations may be such that the at least one of the physical cell identity, and power control parameters and variables may be selected based on the PRB used for the PUCCH.

The contemplated techniques and/or WTRU configurations may be such that the UTC used for a PUCCH transmission may be selected based on a specific set of uplink transmission properties of PUCCH as indicated by a PUCCH resource index for a certain PUCCH format. The contemplated techniques and/or WTRU configurations may be such that the UTC used for a PUCCH transmission may be set to a first UTC on a condition that a resource index may be within a first range (or set) of values, and to a second UTC on a condition that the resource index may be within a second range (or set) of values. The contemplated techniques and/or WTRU configurations may be such that a power control parameter may be tied to a subframe.

The contemplated techniques and/or WTRU configurations may be such that one or more, or one or more, or each, of periodic SRS and multiple aperiodic SRS may be configured with different UTCs. The contemplated techniques and/or WTRU configurations may be such that the different TPC command loops may be maintained for one or more, or one or more, or each, of PSRS, multiple ASRS, PUSCH and/or PUCCH. The contemplated techniques and/or WTRU configurations may be such that the combinations of SRS types and PUSCH and PUCCH may use the same TPC command values in power control formulas. The contemplated techniques and/or WTRU configurations may be such that the TPC commands may be applied to a group of UTC may be cumulative.

The contemplated techniques and/or WTRU configurations may be such that the TPC commands used for single UTC may be valid for one instance of UL transmission on the UTC. The contemplated techniques and/or WTRU configurations may be such that the groups of physical channels or transmission types may be updated with the same TPC command. The contemplated techniques and/or WTRU configurations may be such that the WTRU may maintain separate power control adjustment states for one or more, or one or more, or each, group. The contemplated techniques and/or WTRU configurations may be such that a power control loop for which a TPC command may be intended may depend on a subframe number within which the TPC command is transmitted.

The contemplated techniques and/or WTRU configurations may be such that a subgroup of physical channels and/or transmission types may be preconfigured to be tied to a subset of subframes. The contemplated techniques and/or WTRU configurations may be such that on a condition that a group of physical channels and/or transmission types share a TPC command, one or more, or one or more, or each, individual physical channel and/or transmission type may be configured to apply a different offset to an over-all TPC command chain. The contemplated techniques and/or WTRU configurations may be such that when a group of physical channels and/or transmission types share a TPC command, one or more, or one or more, or each, individual physical channel and/or transmission type may interpret a TPC command codepoint differently. The contemplated techniques and/or WTRU configurations may be such that a choice of UTC may depend on a subframe number.

The contemplated techniques and/or WTRU configurations may be such that a subset of subframes may be determined from at least one of frame number, subframe number, offset and/or periodicity. The contemplated techniques and/or WTRU configurations may be such that a TPC command may be applicable for physical channels or transmission types whose UTCs may be used in the subframe in which the TPC command was transmitted. The contemplated techniques and/or WTRU configurations may be such that on a condition that a TPC command is transmitted in a subframe subset, UTCs and/or physical channels and/or transmission types configured to be used for that subset of subframes may use the TPC command. The contemplated techniques and/or WTRU configurations may be such that a TPC command may be tied to a specific physical channel and/or transmission type, independent of the UTC. The contemplated techniques and/or WTRU configurations may be such that TPC commands transmitted in DCI Format 3 may be used for one or more, or all, subframes and any other TPC command may be valid for a subset of subframes.

The contemplated techniques and/or WTRU configurations may be such that the a network may configure the UE with a subset of subframes for which it may use regular uplink transmission and another subset of subframes for which it may use limited transmission. The contemplated techniques and/or WTRU configurations may be such that a WTRU may be configured with one set of UTCs, one or more, or one or more, or each, configured with a specific transmission power offset. The contemplated techniques and/or WTRU configurations may be such that in another subset of subframes, the WTRU may be configured with another set of UTCs which may be near a replica of a first set of UTCs except for differences in some transmission parameters.

The contemplated techniques and/or WTRU configurations may be such that a WTRU may be configured with subsets of subframes where for different subsets it may use different UTCs. The contemplated techniques and/or WTRU configurations may be such that for one or more, or each, subset of subframes and one or more, or each, UTC, a different PCMAX,c may be configured. The contemplated techniques and/or WTRU configurations may be such that a WTRU may maintain separate HARQ processes based on a subframe subset of an original transmission. The contemplated techniques and/or WTRU configurations may be such that a WTRU may be configured with multiple subframe subsets.

The contemplated techniques and/or WTRU configurations may be such that for one or more, or each, subframe subset, the WTRU may use different transmission powers. The contemplated techniques and/or WTRU configurations may be such that different subframe subsets may be configured with different PCMAX,c. The contemplated techniques and/or WTRU configurations may be such that a WTRU may be configured with different UTCs for one or more, or each, of the subframe subsets. The contemplated techniques and/or WTRU configurations may be such that for one or more, or each, UTC, the WTRU may report PHR based on UTC-specific power control parameters. The contemplated techniques and/or WTRU configurations may be such that a same UTC may be used for a specific physical channel and/or transmission type over one or more, or all, different subframe subsets.

The contemplated techniques and/or WTRU configurations may be such that a WTRY may have multiple power control parameters for one or more, or each, UTC, where one or more, or each, subframe subset may have a preconfigured set of power control parameters. The contemplated techniques and/or WTRU configurations may be such that a WTRU may report multiple power headroom report (PHR) values for one or more, or each, UTC. The contemplated techniques and/or WTRU configurations may be such that one or more, or each, PHR value may correspond to a subframe subset. The contemplated techniques and/or WTRU configurations may be such that a WTRU may include a subframe subset identifier in the PHR. The contemplated techniques and/or WTRU configurations may be such that a PHR report may be valid for a subset of subframes within which it may be transmitted.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU), comprising:
   a receiver configured to receive downlink control information (DCI) and a configuration having at least two sets of power control parameters, each set of power control parameters having at least information of a desired received power and a partial path-loss compensation;
   a processor configured, at least in part, to:
   select a set of power control parameters, based on the DCI, from the at least two sets of power control parameters for an uplink transmission; and
   determine a desired received power and a partial path-loss compensation associated with the uplink transmission based on the set of power control parameters and the DCI;
   derive a path-loss estimate from a set of path-loss references based on the DCI; and
   identify a power control adjustment state associated with the uplink transmission based on the DCI; and
   a transmitter configured to transmit the uplink transmission using a power based on at least the desired received power, the partial path-loss compensation, the path-loss estimate, and the power control adjustment state.

2. The WTRU of claim 1, wherein the DCI includes at least an index associated with the set of power control parameters.

3. The WTRU of claim 1, wherein the uplink transmission is transmitted via a Physical Uplink Shared Channel (PUSCH).

4. A method performed by a wireless transmit/receive unit (WTRU), the method comprising:
   receiving downlink control information (DCI) and a configuration having at least two sets of power control parameters, each set of power control parameters having at least information of a desired received power and a partial path-loss compensation;
   selecting a set of power control parameters, based on the DCI, from the at least two sets of power control parameters for an uplink transmission;
   determining a desired received power and a partial path-loss compensation associated with the uplink transmission, based on the set of power control parameters and the DCI;
   maintaining a set of power control adjustment states;
   selecting, from the set of power control adjustment states, a power control adjustment state associated with the uplink transmission based on the DCI; and
   transmitting the uplink transmission using a power based on at least the desired received power, the partial path-loss compensation, and the power control adjustment state.

5. The method of claim 4, wherein the DCI includes at least an index associated with the set of power control parameters.

6. The method of claim 4, wherein the uplink transmission is transmitted via a Physical Uplink Shared Channel (PUSCH).

7. The WTRU of claim 1, wherein the DCI is associated with one or more Transmit Power Control (TPC) commands.

8. The WTRU of claim 1, wherein when identifying the power control adjustment state, the processor is configured to maintain a TPC command chain.

9. The WTRU of claim 1, wherein the configuration is a Radio Resource Control (RRC) configuration, and the at least two sets of power control parameters are configured by the RRC configuration.

10. The WTRU of claim 1, wherein the DCI includes a DCI format.

11. The WTRU of claim 1, wherein the processor is configured to determine a maximum transmit power per carrier associated with the uplink transmission.

12. The method of claim 4, wherein the DCI is associated with one or more TPC commands.

13. The method of claim 4, wherein maintaining the set of power control adjustment states comprises maintaining a TPC command chain.

14. The method of claim 4, wherein the configuration is a Radio Resource Control (RRC) configuration, and the at least two sets of power control parameters are configured by the RRC configuration.

15. The method of claim 4, wherein the DCI includes a DCI format.

16. The method of claim 4, further comprising determining a maximum transmit power per carrier associated with the uplink transmission.

17. The WTRU of claim 1, wherein the processor is configured to:
maintain a set of power control adjustment states, and select the power control adjustment state from the set of power control adjustment states.

18. The method of claim 4, further comprising:
deriving a path-loss estimate from a set of path-loss references based on the DCI, and wherein the power used for transmitting the uplink transmission is further based on the path-loss estimate.

19. A wireless transmit/receive unit (WTRU), comprising:
a receiver configured to receive downlink control information (DCI) and a configuration having at least two sets of power control parameters, each set of power control parameters having at least information of a desired received power and a partial path-loss compensation;
a processor configured, at least in part, to:
select a set of power control parameters, based on the DCI, from the at least two sets of power control parameters for an uplink transmission; and
determine a desired received power[and a partial path-loss compensation associated with the uplink transmission based on the set of power control parameters and the DCI;
maintain a set of power control adjustment states; and
select, from the set of power control adjustment states, a power control adjustment state associated with the uplink transmission based on the DCI; and
a transmitter configured to transmit the uplink transmission using a power based on at least the desired received power, the partial path-loss compensation, and the power control adjustment state.

20. The WTRU of claim 19, wherein the processor is configured to:
derive a path-loss estimate from a set of path-loss references based on the DCI, and wherein the power used by the transmitter for transmitting the uplink transmission is further based on the path-loss estimate.

* * * * *

UNITED STATES PATENT AND TRADEMARK OFFICE
CERTIFICATE OF CORRECTION

PATENT NO. : 10,798,684 B2
APPLICATION NO. : 14/348866
DATED : October 6, 2020
INVENTOR(S) : Marinier et al.

It is certified that error appears in the above-identified patent and that said Letters Patent is hereby corrected as shown below:

In the Claims

Column 66, Line 5, cancel the text beginning with "1. A wireless transmit/receive unit" to and ending "control adjustment state." in Line 28, and insert the following claim:
--1. A wireless transmit/receive unit (WTRU), comprising:
 a receiver configured to receive downlink control information (DCI) and a configuration having at least two sets of power control parameters, each set of power control parameters having at least information of a partial path-loss compensation;
 a processor configured to:
 select a set of power control parameters, based on the DCI, from the at least two sets of power control parameters, for an uplink transmission;
 determine a partial path-loss compensation for the uplink transmission, based on the selected set of power control parameters and the DCI;
 derive a path-loss estimate, based on the DCI, from a set of path-loss references; and
 identify a power control adjustment state, based on the DCI, for the uplink transmission; and
 a transmitter configured to transmit the uplink transmission using a power based on at least the partial path-loss compensation, the path-loss estimate, and the power control adjustment state.--

Column 66, Line 35, cancel the text beginning with "4. A method performed by a wireless" to and ending with "control adjustment state." in Lines 55-56, and insert the following claim:
--4. A method performed by a wireless transmit/receive unit (WTRU), the method comprising:
 receiving downlink control information (DCI) and a configuration having at least two sets of power control parameters, each set of power control parameters having at least information of a partial path-loss compensation;
 selecting a set of power control parameters, based on the DCI, from the at least two sets of power control parameters, for an uplink transmission;
 determining a partial path-loss compensation for the uplink transmission, based on the selected set of power control parameters and the DCI;

Signed and Sealed this
Ninth Day of August, 2022

Katherine Kelly Vidal
*Director of the United States Patent and Trademark Office* maintaining a set of power control adjustment states;
selecting, from the set of power control adjustment states, a power control adjustment state for the uplink transmission, based on the DCI; and
transmitting the uplink transmission using a power based on at least the partial path-loss compensation and the selected power control adjustment state.--

Column 66, Line 65, cancel the text beginning with "8. The WTRU of claim 1" to and ending with "TPC command chain." in Line 67, and insert the following claim:
--8. The WTRU of claim 1, wherein when identifying the power control adjustment state, the processor is configured to maintain at least a TPC command chain.--

Column 67, Line 15, cancel the text beginning with "14. The method of claim 4" to and ending with "RRC configuration." in Line 18, and insert the following claim:
--14. The method of claim 4, wherein the configuration is a Radio Resource Control (RRC) configuration, and the at least two sets of power control parameters are configured by the RRC configuration.--

Columns 67, Line 29, cancel the text beginning with "18. The method of claim 4," to and ending with "path-loss estimate." in Column 68, Line 2, and insert the following claim:
--18. The method of claim 4, further comprising:
deriving a path-loss estimate, based on the DCI, from a set of path-loss references, wherein the power used for transmitting the uplink transmission is further based on the derived path-loss estimate.--

Column 68, Line 3, cancel the text beginning with "19. A wireless transmit/receive unit" to and ending with "control adjustment state." in Line 25, and insert the following claim:
--19. A wireless transmit/receive unit (WTRU), comprising:
a receiver configured to receive downlink control information (DCI) and a configuration having at least two sets of power control parameters, each set of power control parameters having at least information of a partial path-loss compensation;
a processor configured, at least in part, to:
select a set of power control parameters, based on the DCI, from the at least two sets of power control parameters, for an uplink transmission;
determine a partial path-loss compensation for the uplink transmission, based on the selected set of power control parameters and the DCI;
maintain a set of power control adjustment states; and
select, from the set of power control adjustment states, a power control adjustment state for the uplink transmission, based on the DCI; and
a transmitter configured to transmit the uplink transmission using a power based on at least the partial path-loss compensation and the selected power control adjustment state.--

Column 68, Line 26, cancel the text beginning with "20. The WTRU of claim 19" to and ending with "path-loss estimate." in Line 31, and insert the following claim:
--20. The WTRU of claim 19, wherein the processor is configured to:
derive a path-loss estimate, based on the DCI, from a set of path-loss references, wherein the power used by the transmitter for transmitting the uplink transmission is further based on the derived path-loss estimate.--